US011422367B2

(12) United States Patent
Sugiyama et al.

(10) Patent No.: US 11,422,367 B2
(45) Date of Patent: Aug. 23, 2022

(54) LIGHT SOURCE APPARATUS AND HEAD UP DISPLAY APPARATUS

(71) Applicant: MAXELL, LTD., Kyoto (JP)

(72) Inventors: Toshinori Sugiyama, Kyoto (JP); Koji Hirata, Kyoto (JP); Masahiko Yatsu, Kyoto (JP); Yasuhiko Kunii, Kyoto (JP); Kazuomi Kaneko, Kyoto (JP)

(73) Assignee: MAXELL, LTD., Kyoto (JP)

( * ) Notice: Subject to any disclaimer, the term of this patent is extended or adjusted under 35 U.S.C. 154(b) by 297 days.

(21) Appl. No.: 16/622,362

(22) PCT Filed: Jun. 16, 2017

(86) PCT No.: PCT/JP2017/022240
§ 371 (c)(1),
(2) Date: Dec. 13, 2019

(87) PCT Pub. No.: WO2018/229961
PCT Pub. Date: Dec. 20, 2018

(65) Prior Publication Data
US 2020/0201043 A1    Jun. 25, 2020

(51) Int. Cl.
*G02B 27/01* (2006.01)
*F21V 8/00* (2006.01)
*G02B 27/28* (2006.01)

(52) U.S. Cl.
CPC ......... *G02B 27/0149* (2013.01); *G02B 6/003* (2013.01); *G02B 6/0068* (2013.01);
(Continued)

(58) Field of Classification Search
CPC ...... F21S 2/00; F21V 5/00; G02B 2027/0118; G02B 2027/015; G02B 2027/0152;
(Continued)

(56) References Cited

U.S. PATENT DOCUMENTS 6,803,972 B1   10/2004   Budd et al.
7,618,160 B2 *  11/2009  Chinniah ........... G02B 19/0028
                                         362/326
(Continued)

FOREIGN PATENT DOCUMENTS

JP    11-224518 A    8/1999
JP    2004-516684 A  6/2004
(Continued)

OTHER PUBLICATIONS

International Search Report of PCT/JP2017/022240 dated Aug. 29, 2017.
(Continued)

*Primary Examiner* — Joseph P Martinez
*Assistant Examiner* — Vipin Patel
(74) *Attorney, Agent, or Firm* — Mattingly & Malur, PC

(57) ABSTRACT

The light source apparatus has: a light source unit including a plurality of semiconductor light source elements; a collimator including a plurality of collimator elements, each of the plural collimator elements being disposed on a light emission axis of each of the plural semiconductor light source elements; a polarization conversion element disposed on an emission side of the collimator; and a light guide disposed on an emission side of the polarization conversion element, the plural semiconductor light source elements and the plural collimator elements are arranged in a first direction orthogonal to the light emission axis, and the polarization conversion element extends in the first direction, and includes a polarizing beam splitter and a phase plate, which are arranged at symmetrical positions with respect to a plane formed by the first direction and a second direction corresponding to the light emission axis.

12 Claims, 47 Drawing Sheets

(52) U.S. Cl.
CPC ....... *G02B 27/0101* (2013.01); *G02B 27/283*
(2013.01); *G02B 2027/015* (2013.01); *G02B
2027/0118* (2013.01); *G02B 2027/0152*
(2013.01)

(58) Field of Classification Search
CPC ............ G02B 27/0101; G02B 27/0149; G02B
27/283; G02B 27/286; G02B 6/0021;
G02B 6/0028; G02B 6/003; G02B
6/0068; G09F 9/00
See application file for complete search history.

(56) References Cited

U.S. PATENT DOCUMENTS

| | | | |
|---|---|---|---|
| 9,759,914 | B2 | 9/2017 | Shigeno et al. |
| 2002/0080615 | A1 | 6/2002 | Marshall et al. |
| 2005/0041165 | A1* | 2/2005 | Abe ................... G02B 27/283 |
| | | | 349/5 |
| 2008/0043466 | A1 | 2/2008 | Chakmakjian et al. |
| 2011/0116010 | A1 | 5/2011 | Nagata et al. |
| 2012/0002137 | A1 | 1/2012 | Saito et al. |
| 2016/0139408 | A1 | 5/2016 | Yagi |
| 2016/0209649 | A1 | 7/2016 | Shigeno et al. |
| 2018/0259773 | A1 | 9/2018 | Asai |

FOREIGN PATENT DOCUMENTS

| | | |
|---|---|---|
| JP | 3148911 U | 3/2009 |
| JP | 2010-500735 A | 1/2010 |
| JP | 2010-072137 A | 4/2010 |
| JP | 2012-013969 A | 1/2012 |
| JP | 2015-045735 A | 3/2015 |
| JP | 2016-033668 A | 3/2016 |
| JP | 2016-139050 A | 8/2016 |
| WO | 2010/137263 A1 | 12/2010 |
| WO | 2016/136407 A1 | 9/2016 |
| WO | 2017/061016 A1 | 4/2017 |
| WO | 2017/094209 A1 | 6/2017 |

OTHER PUBLICATIONS

Japanese Office Action received in corresponding Japanese Application No. 2019-524684 dated Dec. 15, 2020.

* cited by examiner (EMBODIMENT 1)

FIG. 2
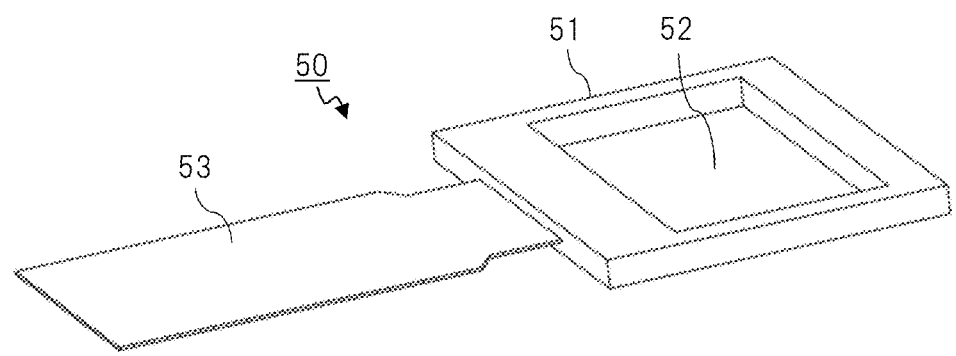
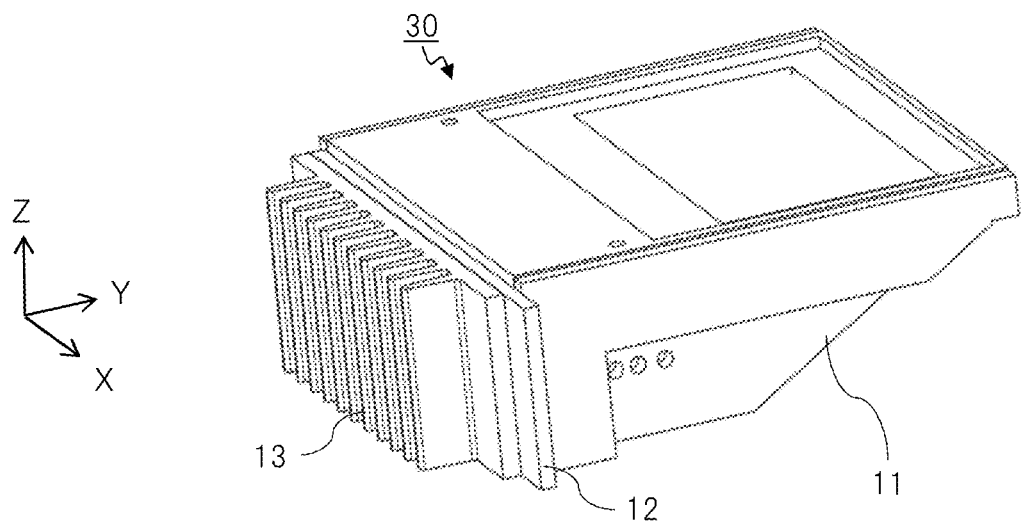

FIG. 6
(a)
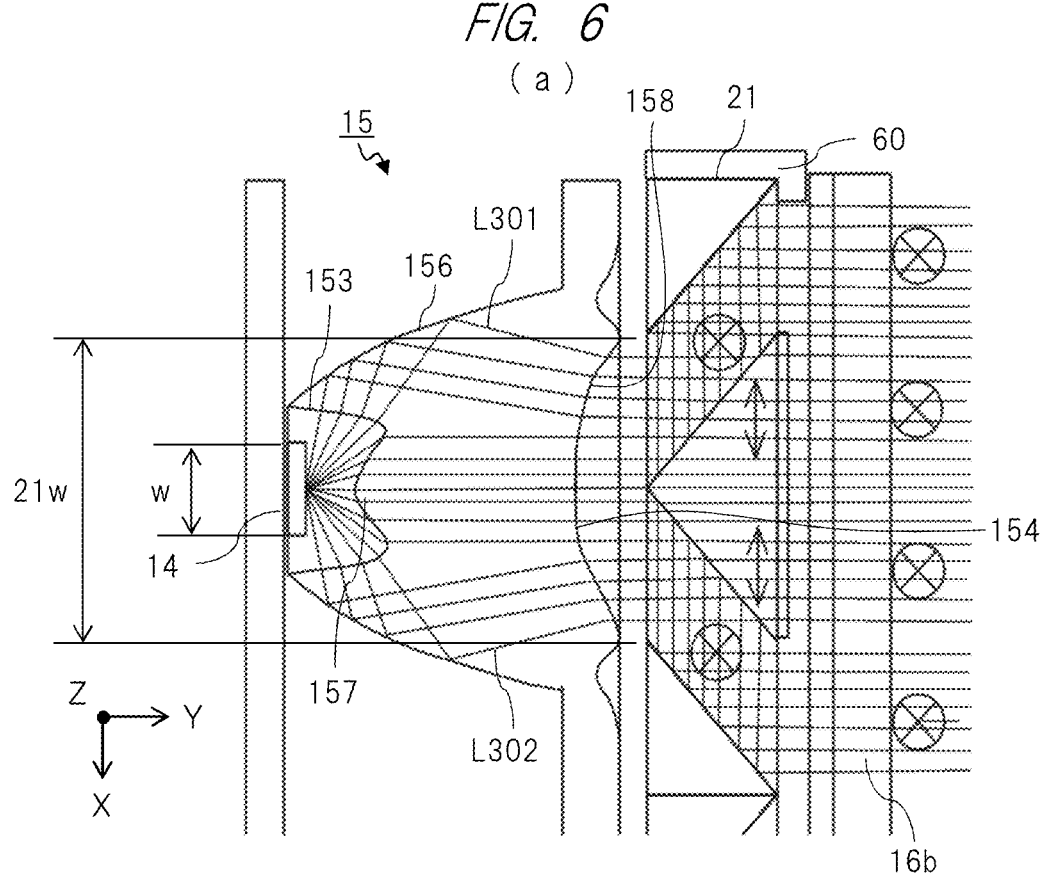
(b)
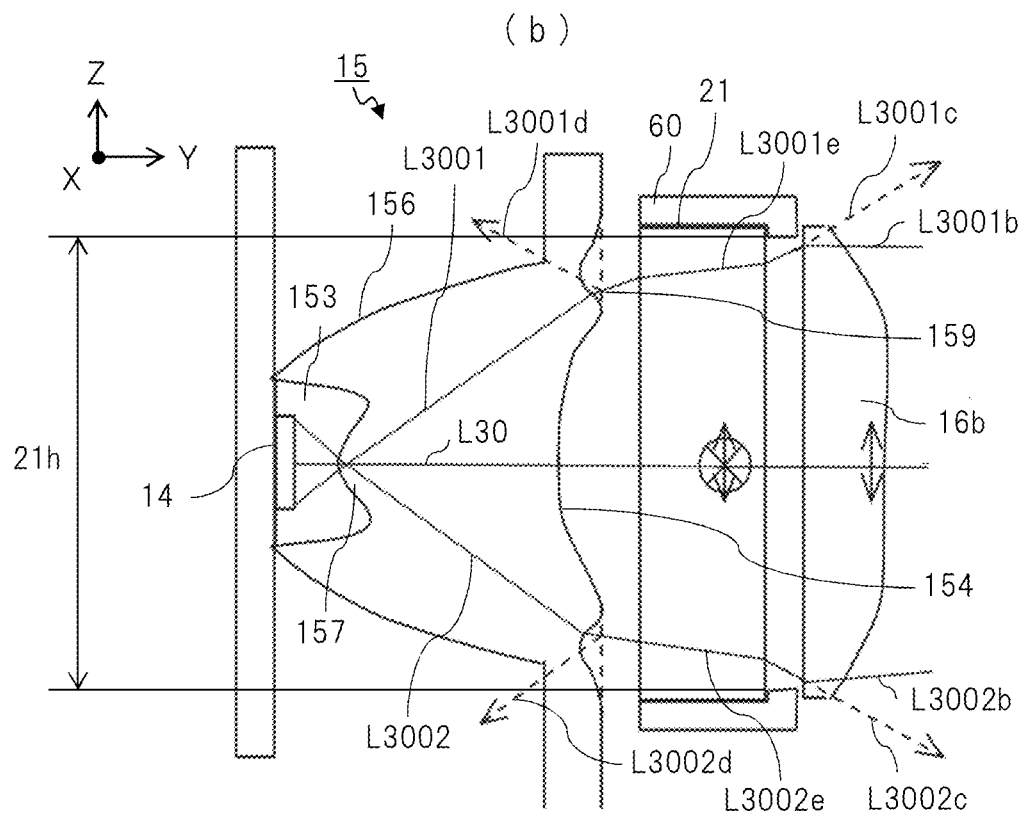

FIG. 7
(a)
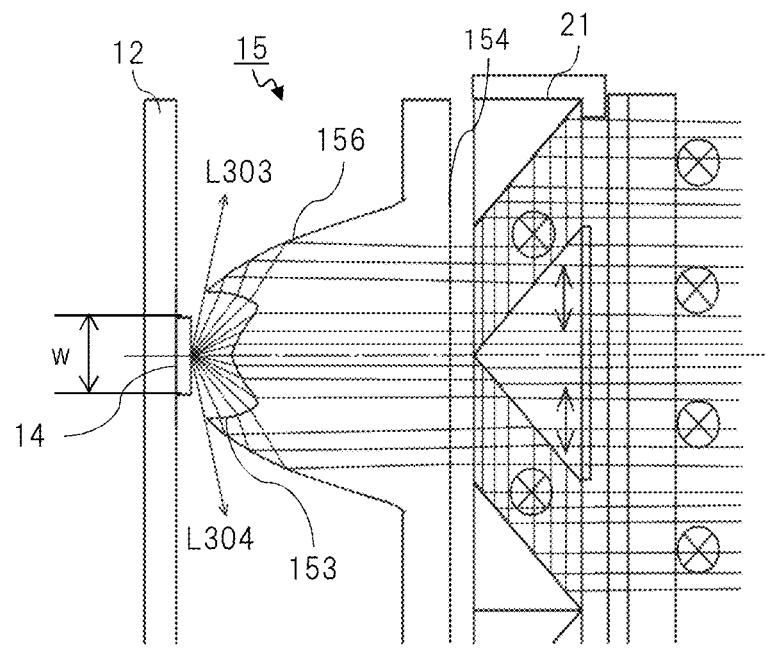
(b)
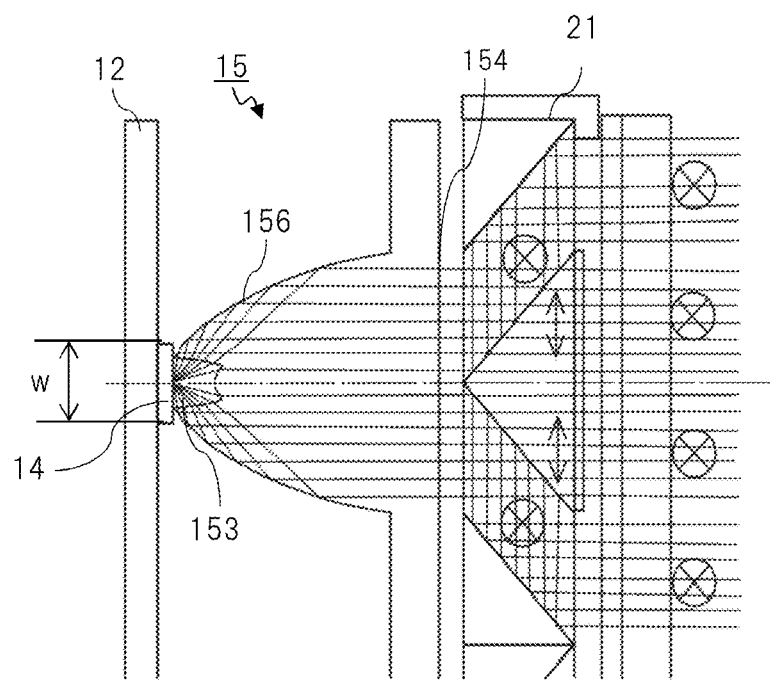

FIG. 9
(a)
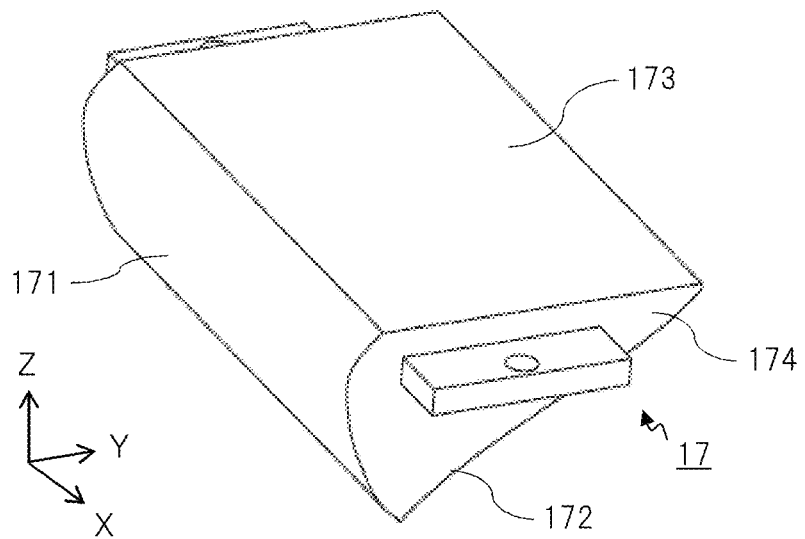
(b)
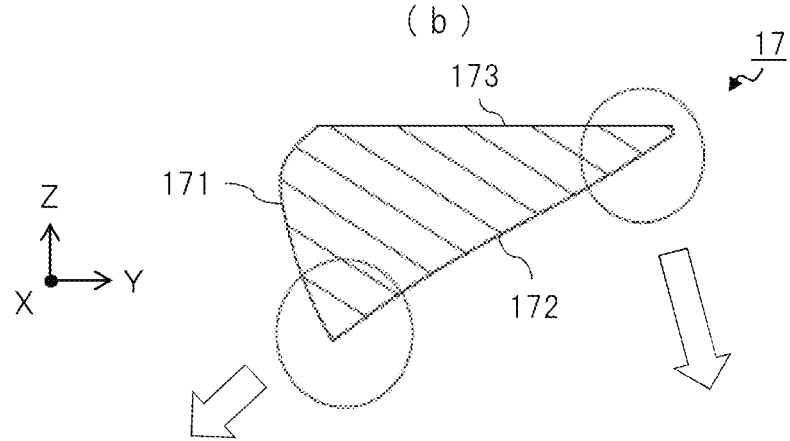
(c)
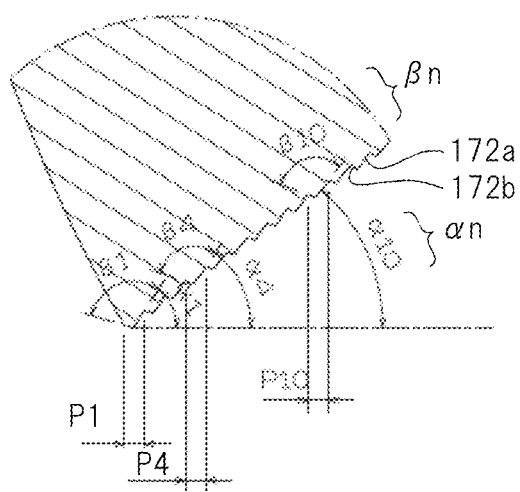
(d)
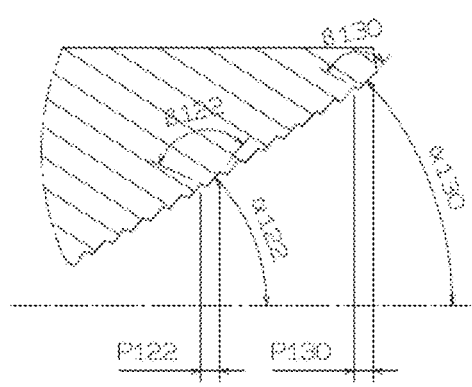

FIG. 12
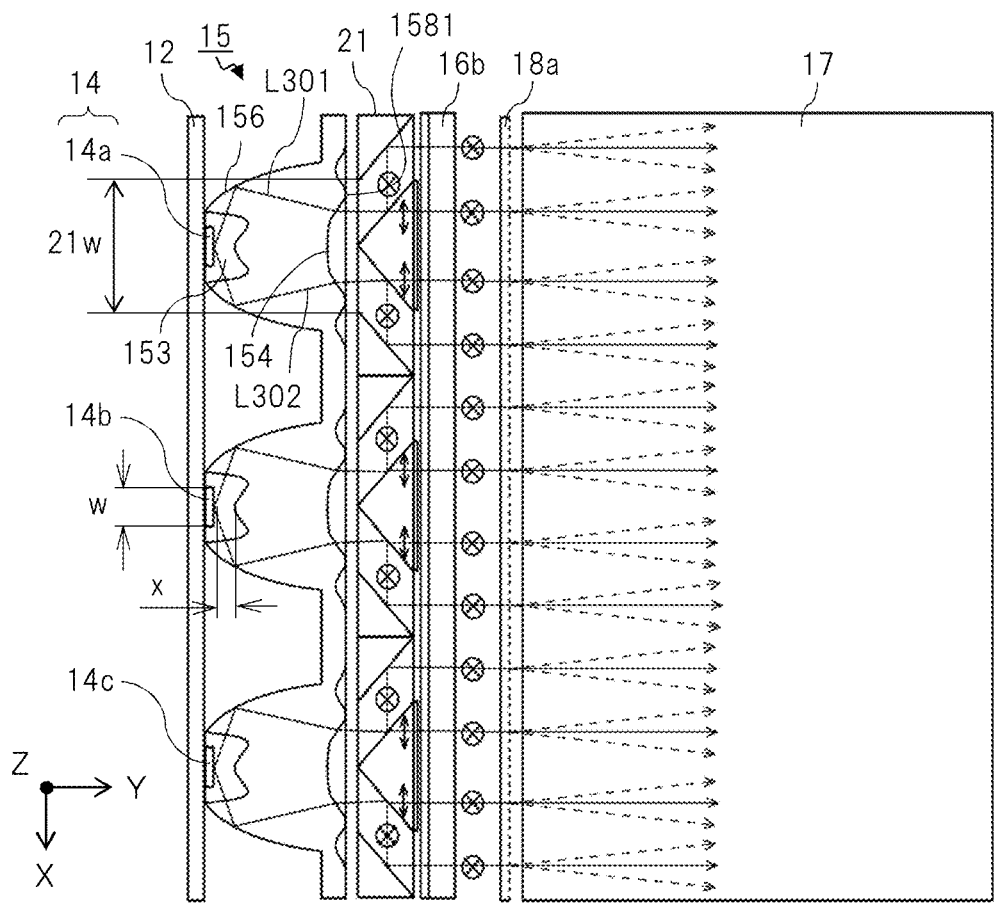
(a)
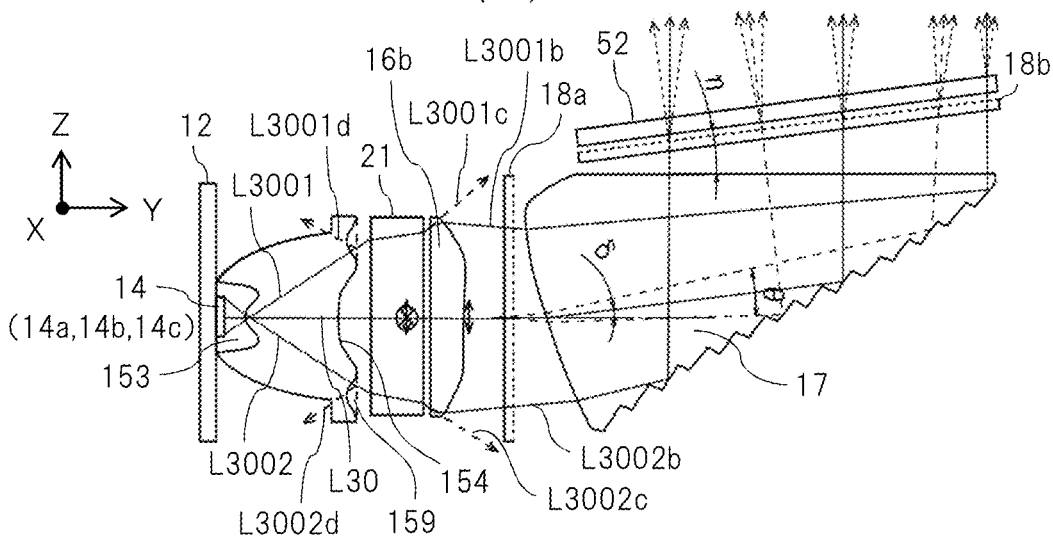
(b)

FIG. 14
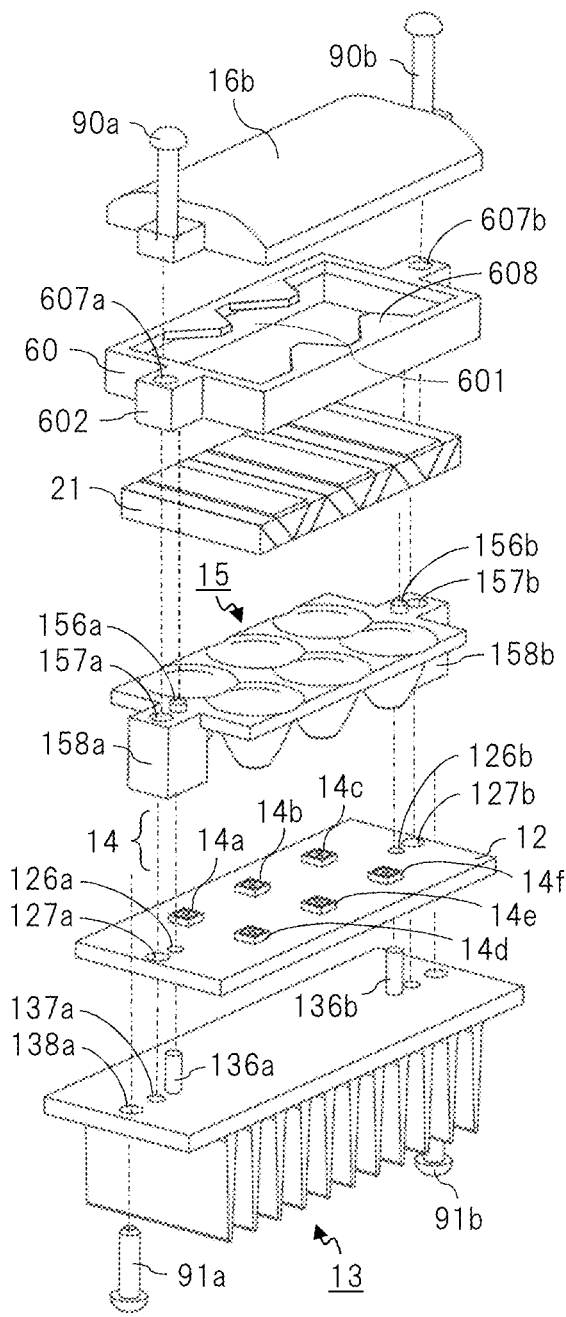
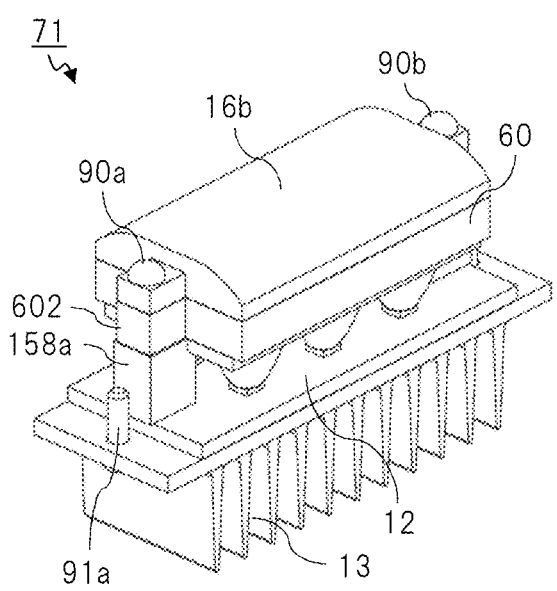
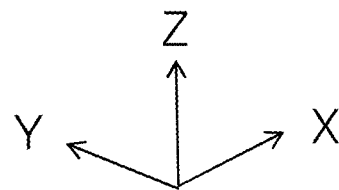

FIG. 15
(a)
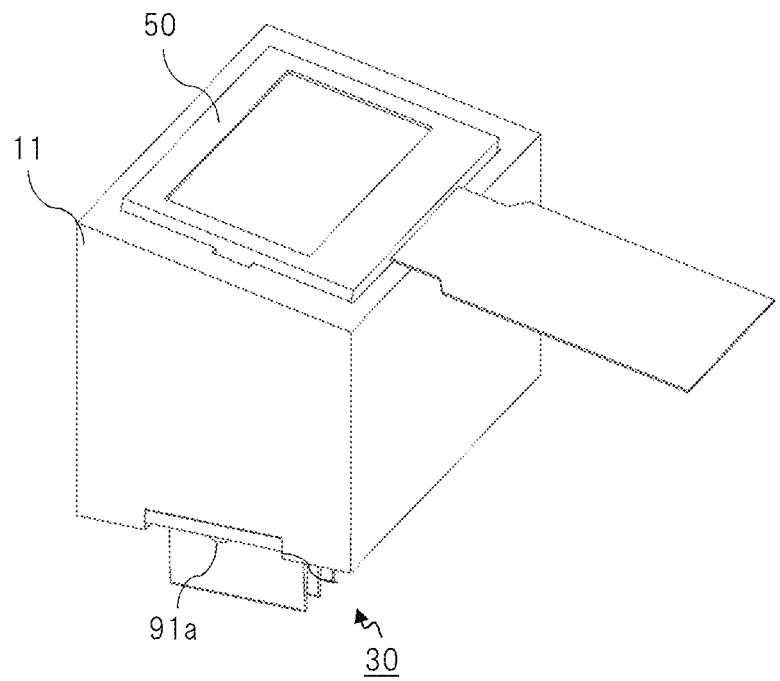
(b)
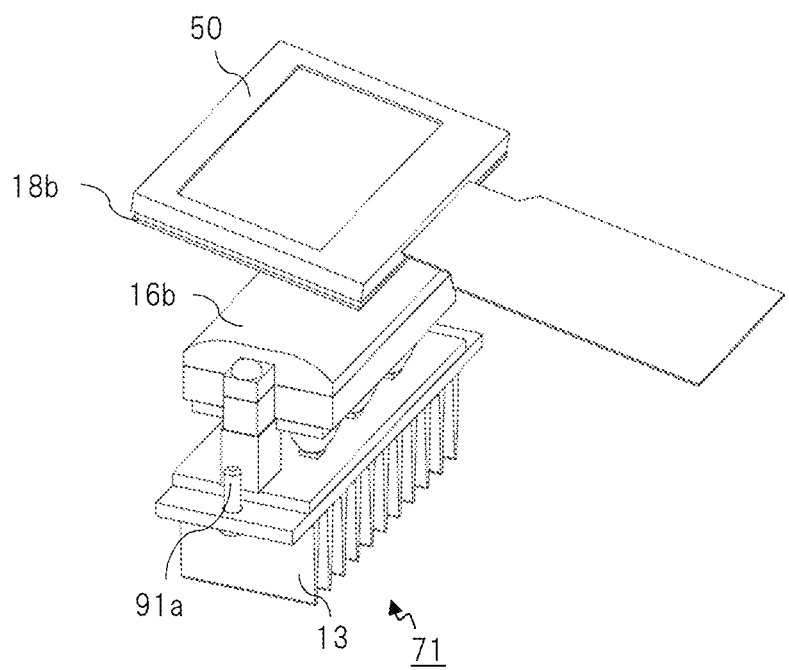

(EMBODIMENT 2)

FIG. 24
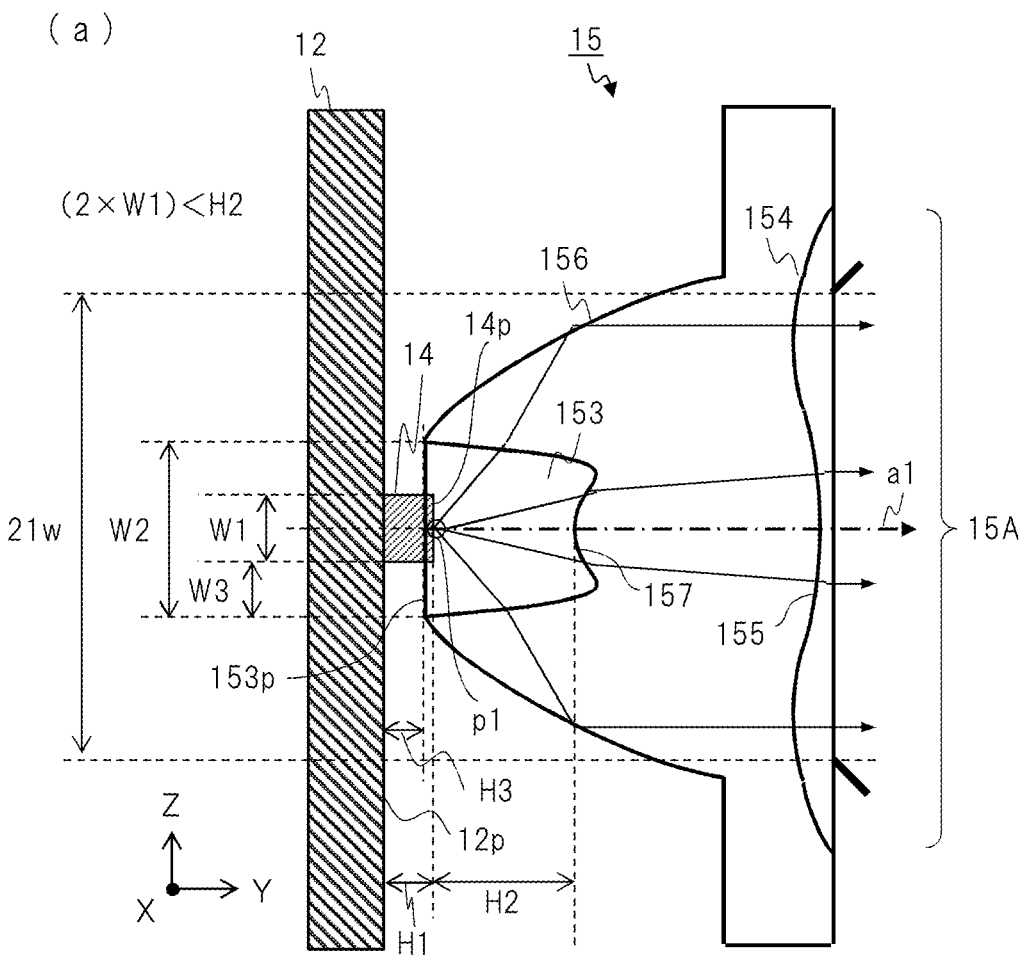
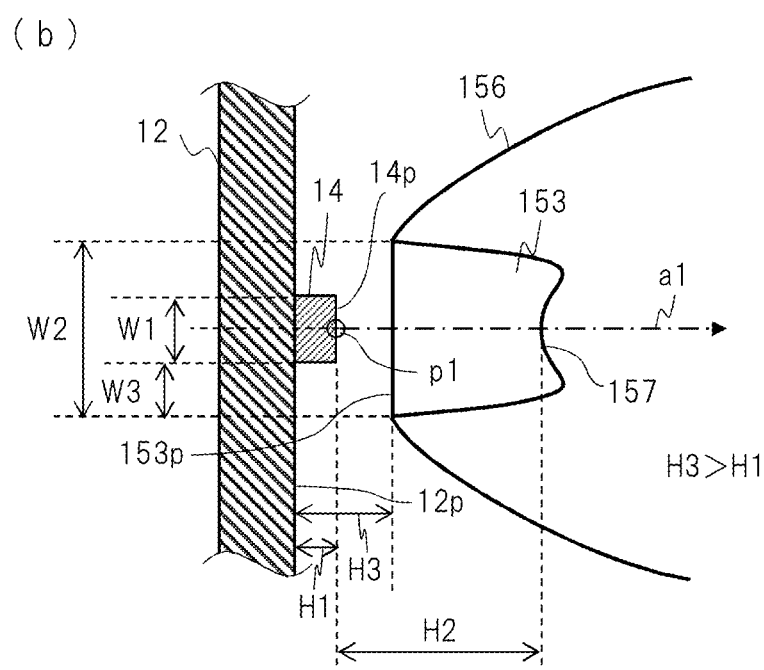

FIG. 25
(a)
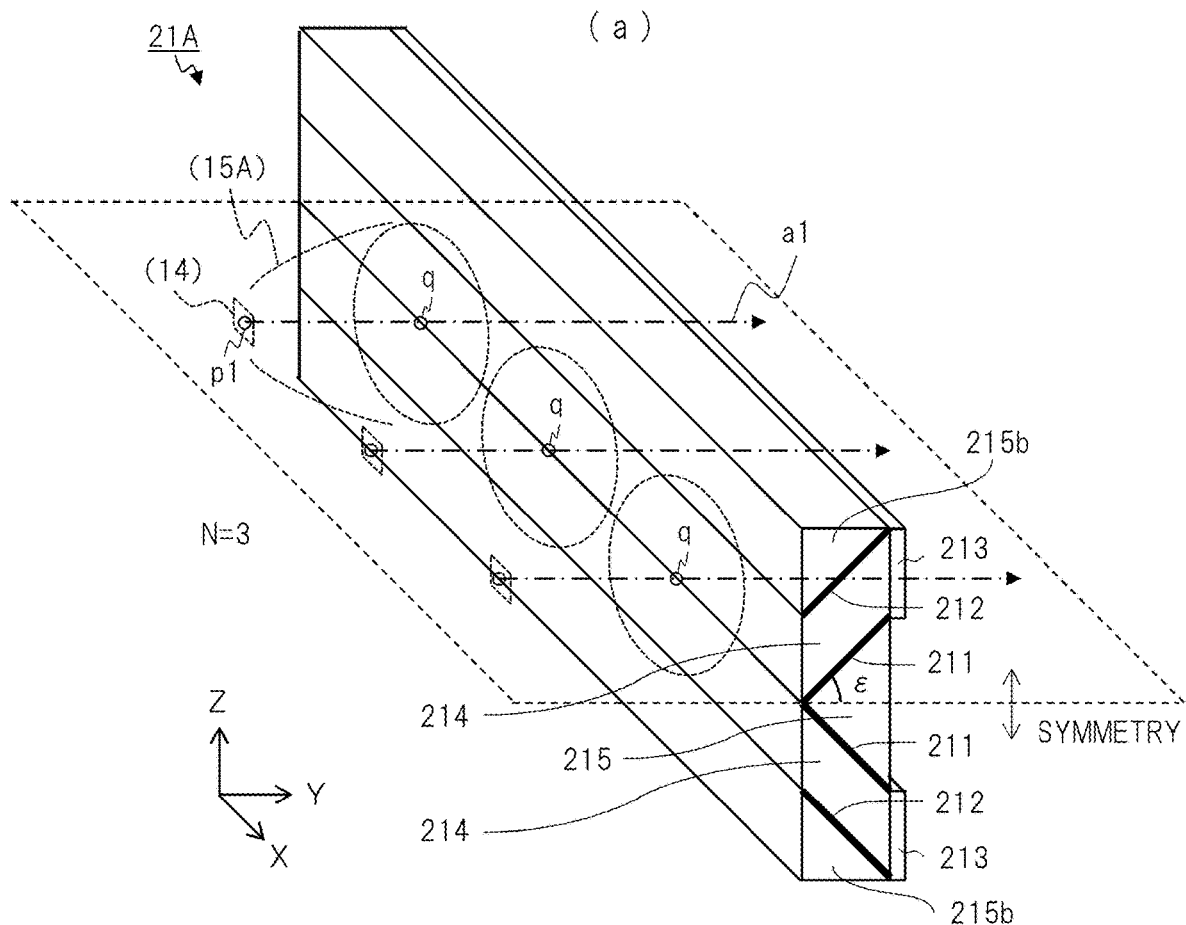
(b)
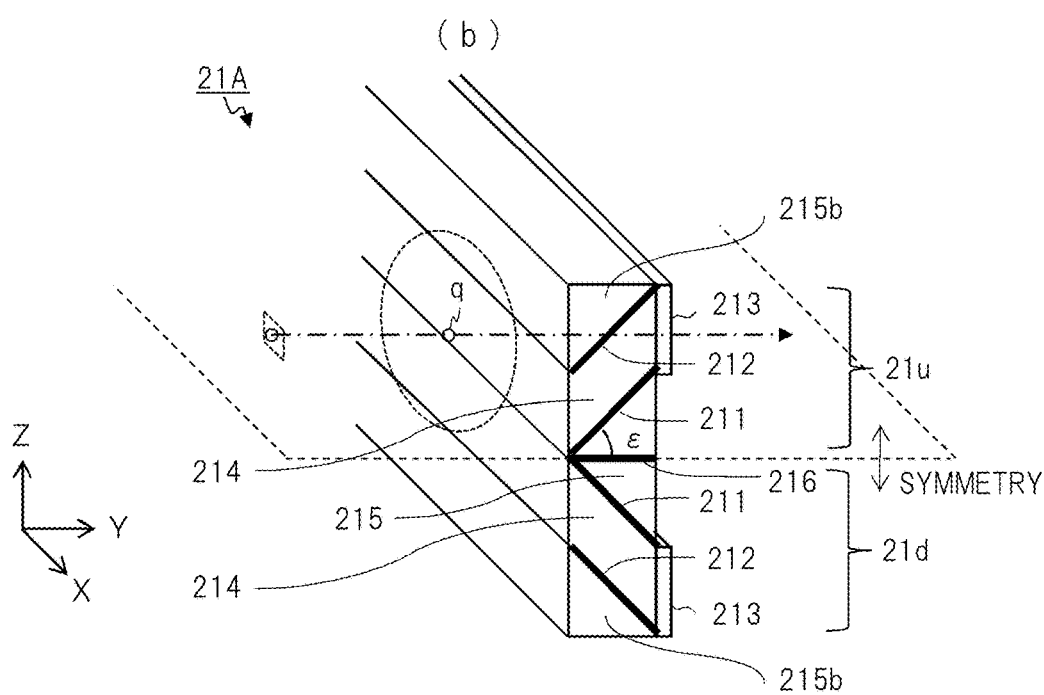

FIG. 26
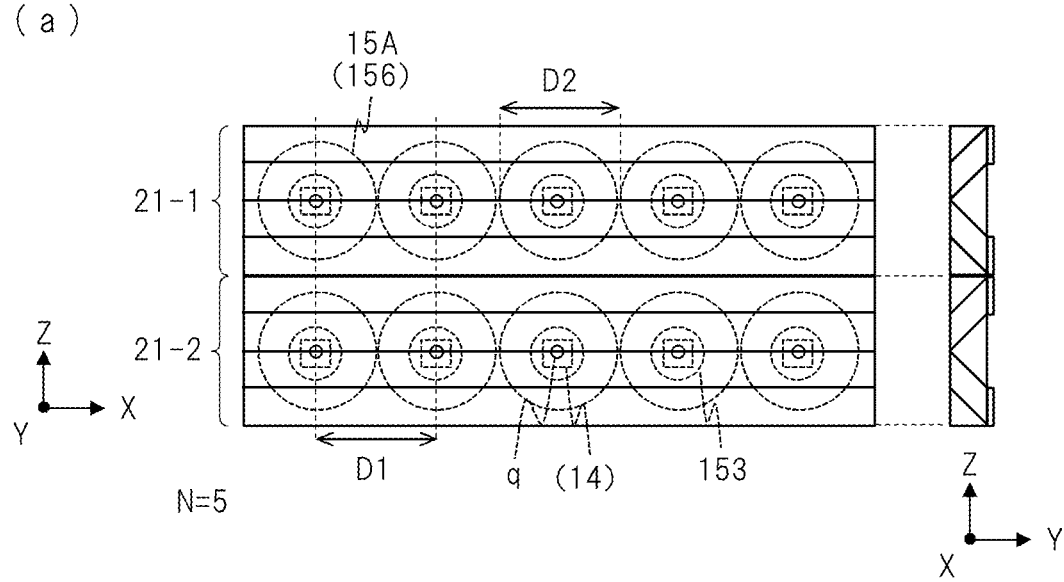
(a)
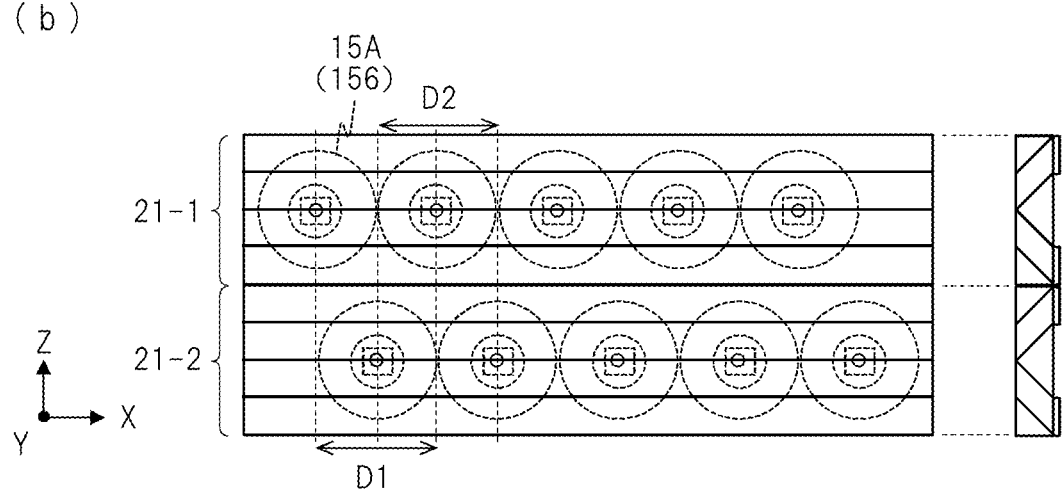
(b)

(COMPARATIVE EXAMPLE)

FIG. 29
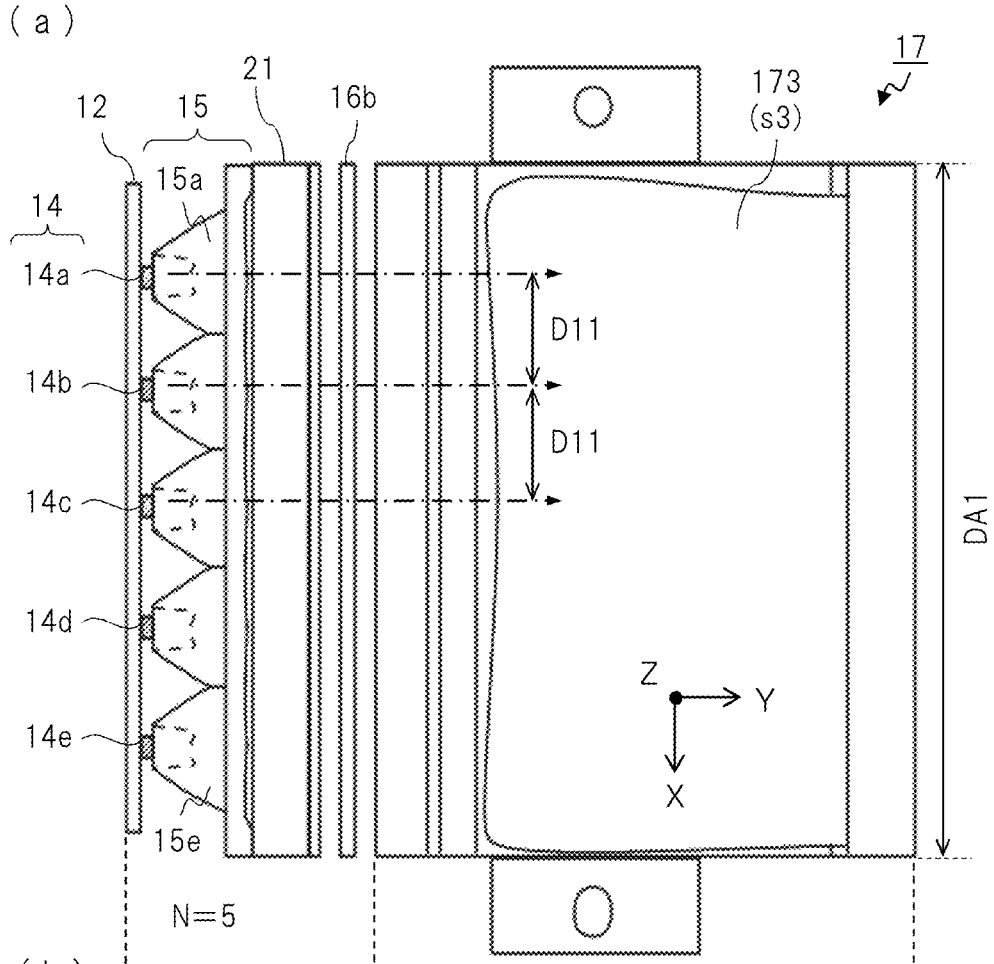
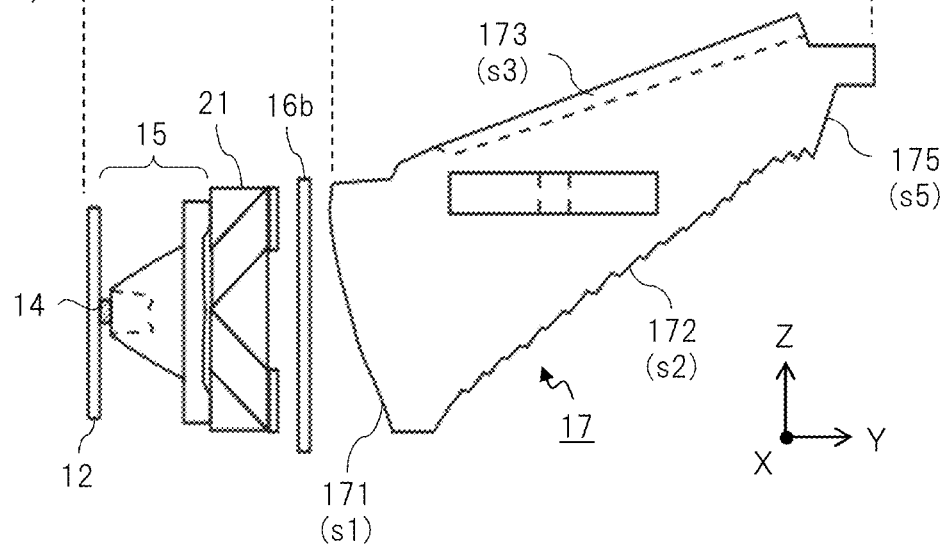

FIG. 30
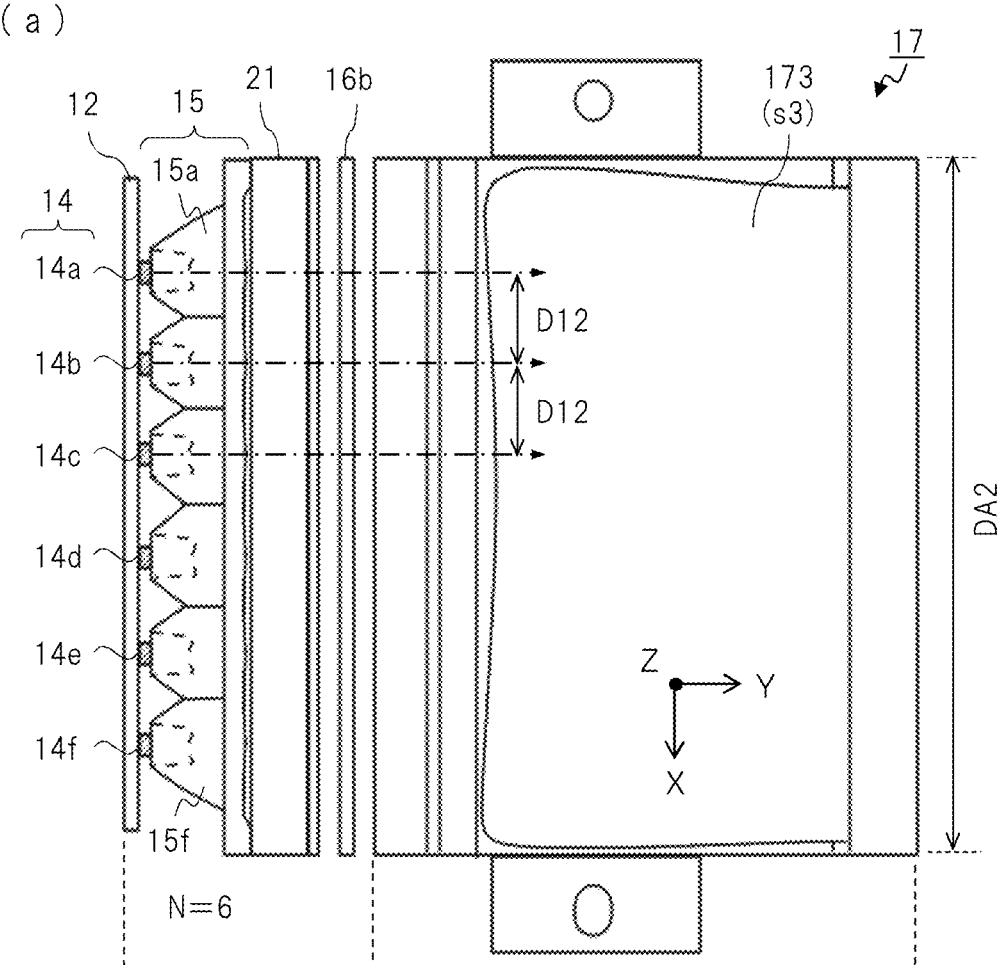
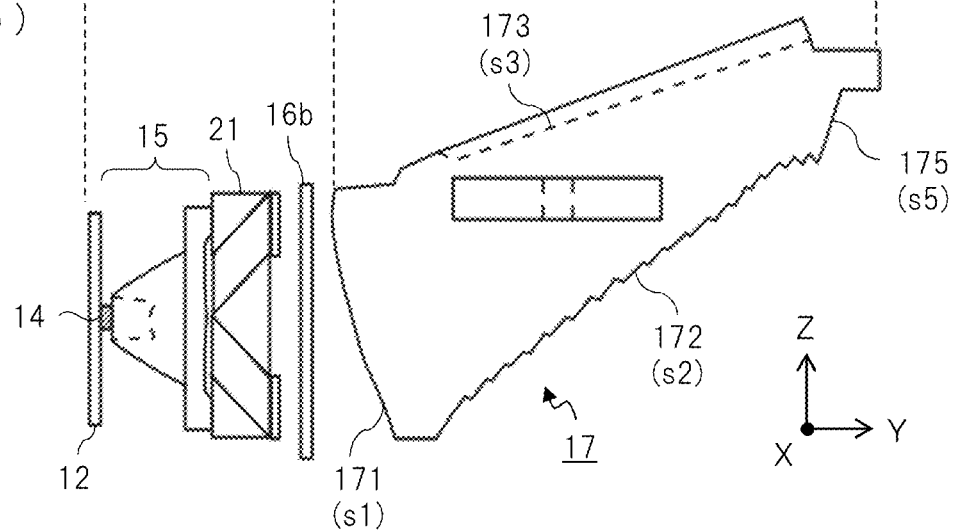

FIG. 32
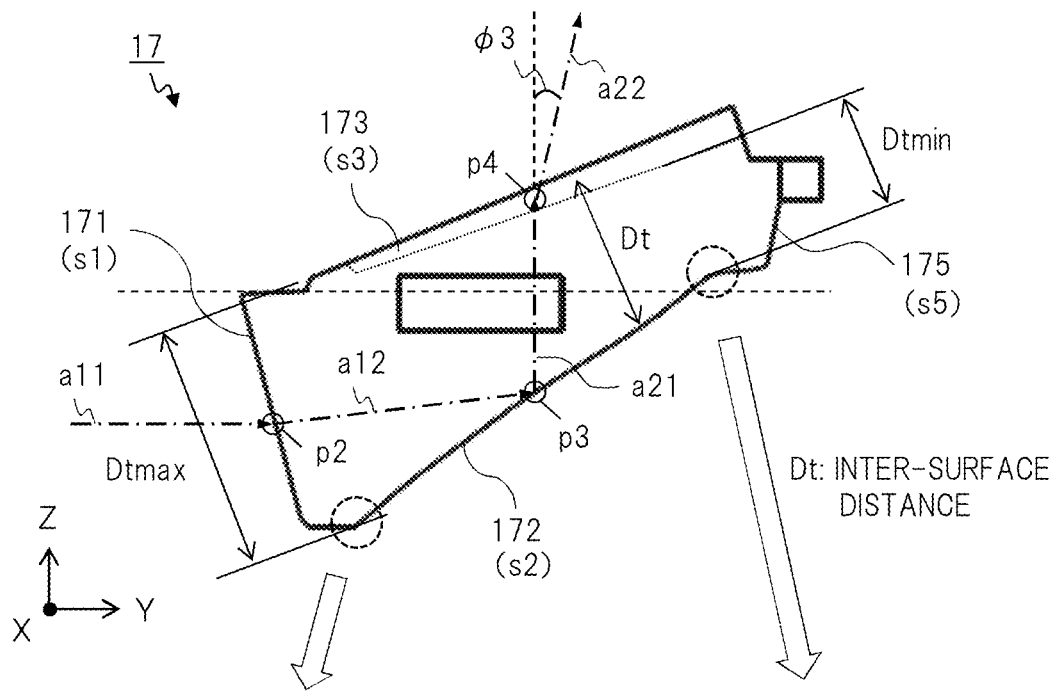
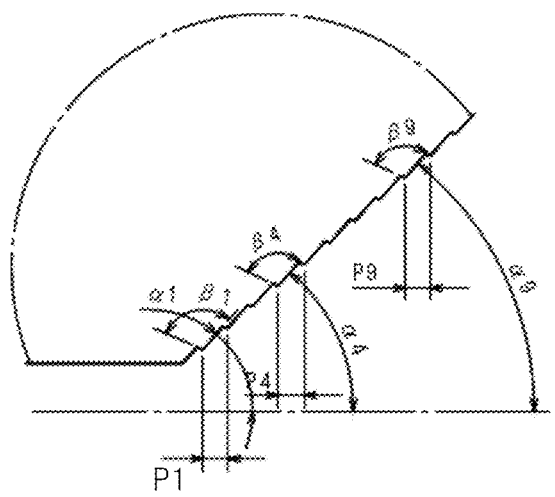
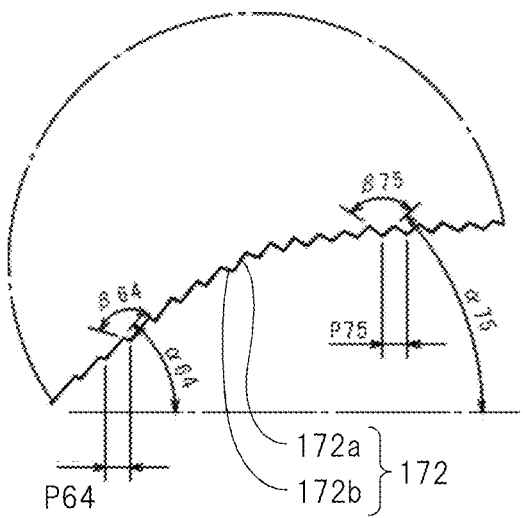
Pn: PITCH
αn: ANGLE
βn: ANGLE

FIG. 35
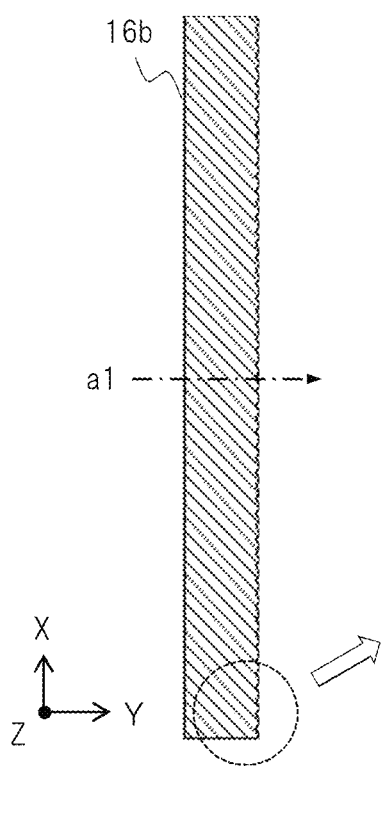
(a)
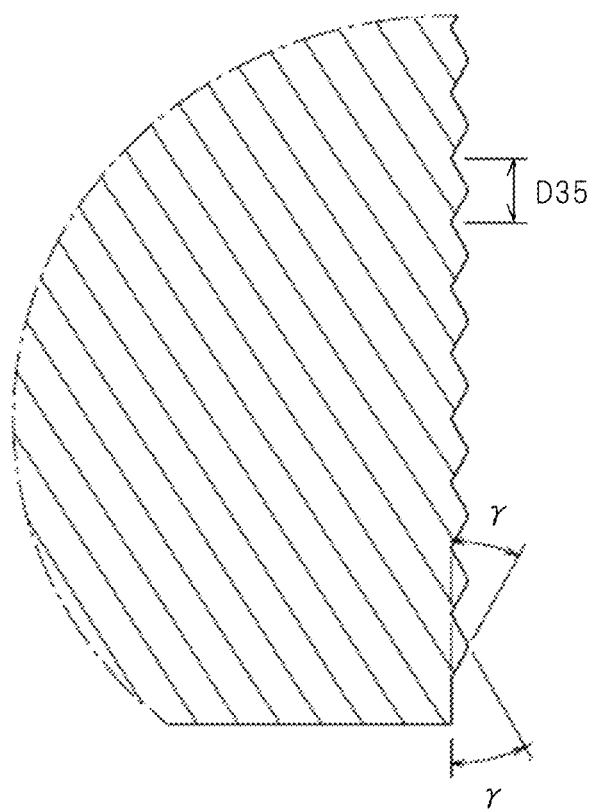
(b)

FIG. 36
(a)
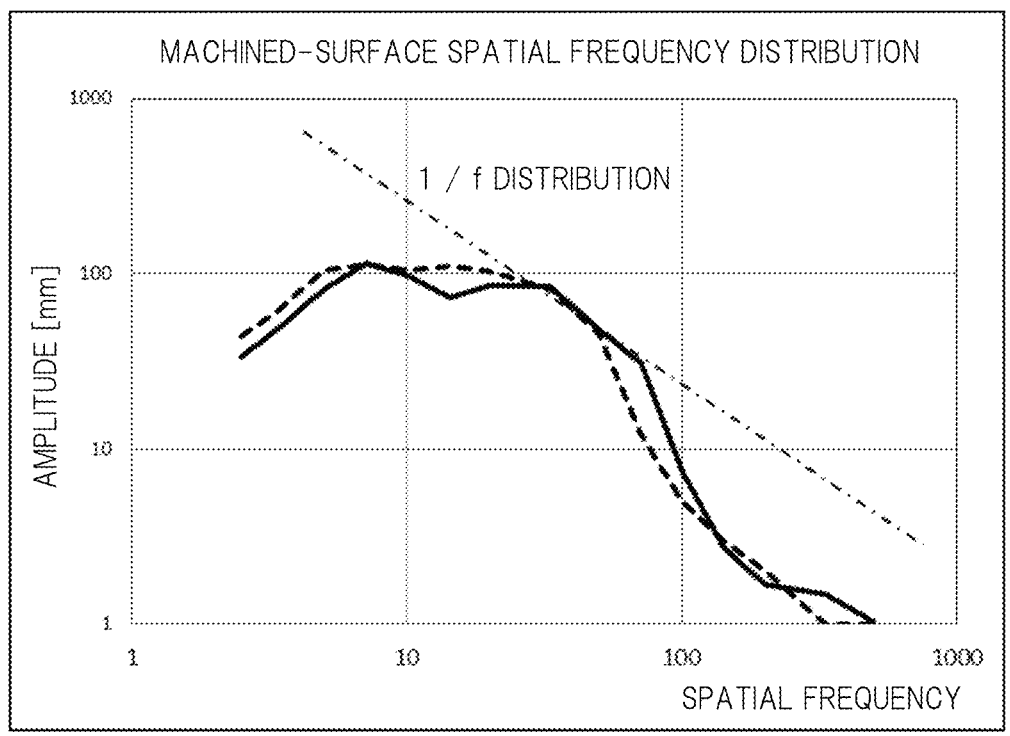
(b)
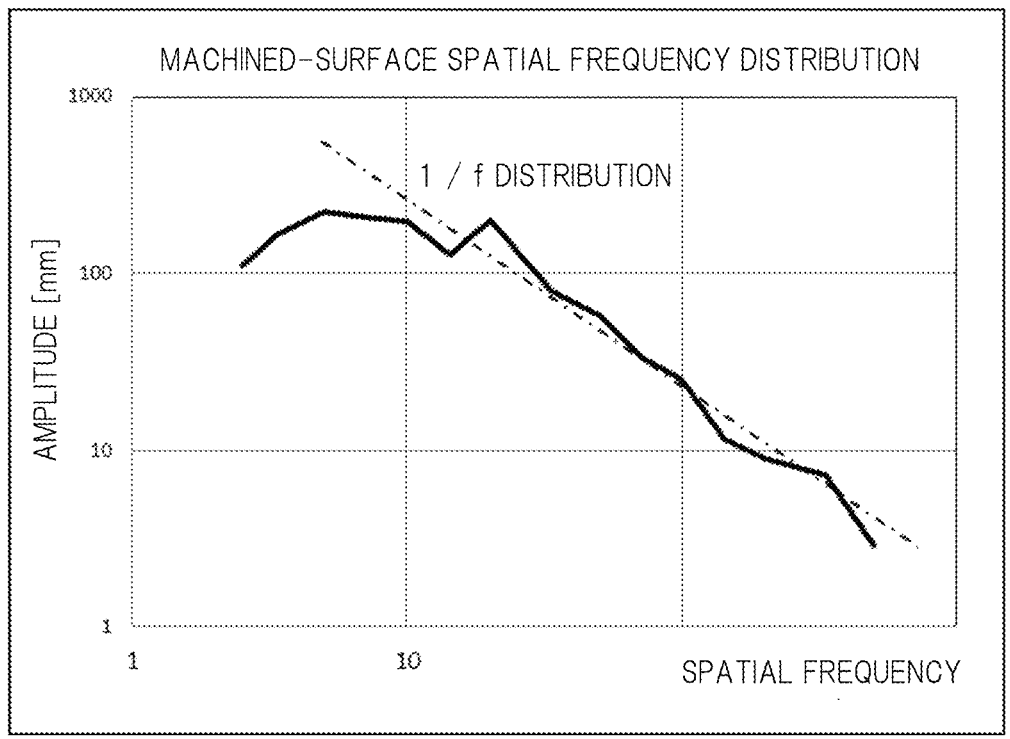

(COMPARATIVE EXAMPLE)

FIG. 39

(a) FREE-FORM SURFACE EQUATION $$z(x,y) = \sum_{14}^{i=0} \{a_i \cdot b_i(x,y)\} \quad \cdots \text{EQUATION 1}$$

(b) FREE-FORM SURFACE EQUATION    COEFFICIENT

| i | $b_i$ | $a_i$ |
|---|---|---|
| 0 | 1 | 1.02693079 |
| 1 | $x$ | −0.0015583 |
| 2 | $y$ | −0.0032924 |
| 3 | $x^2$ | 0.00527757 |
| 4 | $xy$ | −0.0010518 |
| 5 | $y^2$ | −5.607E−05 |
| 6 | $x^3$ | 9.1022E−06 |
| 7 | $x^2y$ | −0.0002461 |
| 8 | $xy^2$ | 6.1728E−05 |
| 9 | $y^3$ | 3.7869E−05 |
| 10 | $x^4$ | 1.2904E−06 |
| 11 | $x^3y$ | 6.0056E−07 |
| 12 | $x^2y^2$ | 2.3931E−07 |
| 13 | $xy^3$ | 7.4948E−07 |
| 14 | $y^4$ | 5.3049E−06 |

(FIRST MODIFICATION EXAMPLE)

(SECOND MODIFICATION EXAMPLE)

FIG. 42
(THIRD MODIFICATION EXAMPLE)
(a)
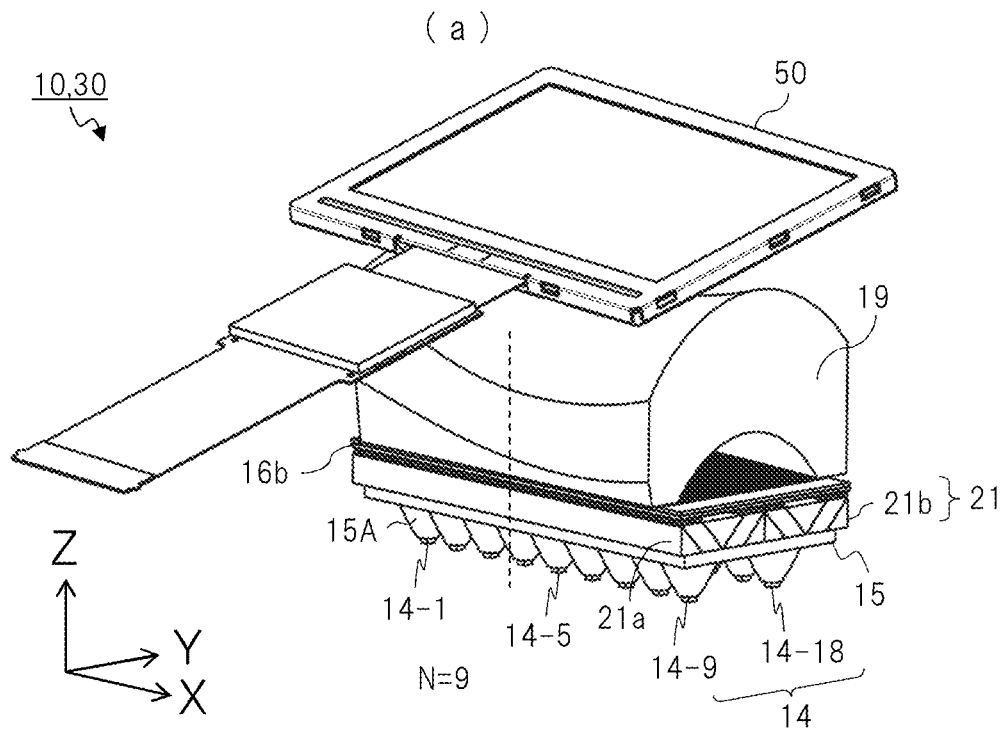
(b)
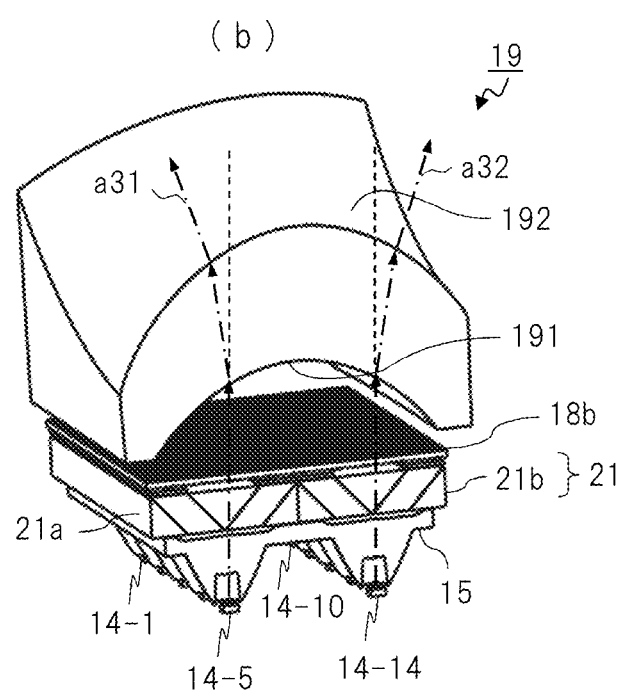

FIG. 44

(a) FREE-FORM SURFACE EQUATION $$z(x,y) = \sum_{14}^{i=0} \{a_i \cdot b_i(x,y)\} \quad \cdots \text{EQUATION 1}$$

(b) <u>EMISSION SURFACE</u>

| i | $b_i$ | $a_i$ |
|---|---|---|
| 0 | 1 | 15.6804159 |
| 1 | x | −0.0023643 |
| 2 | y | 0.01861185 |
| 3 | $x^2$ | 0.00275081 |
| 4 | xy | −0.0005721 |
| 5 | $y^2$ | −0.0252656 |
| 6 | $x^3$ | 2.2912E−05 |
| 7 | $x^2y$ | −6.431E−05 |
| 8 | $xy^2$ | 0.00037308 |
| 9 | $y^3$ | −1.658E−05 |
| 10 | $x^4$ | 8.5303E−07 |
| 11 | $x^3y$ | −2.69E−07 |
| 12 | $x^2y^2$ | 1.0303E−05 |
| 13 | $xy^3$ | −1.202E−06 |
| 14 | $y^4$ | −1.898E−05 |
|  | $\theta y$ | 1° |
|  | $\delta y$ | −1.2 |

(c) <u>INCIDENCE SURFACE</u>

| i | $b_i$ | $a_i$ |
|---|---|---|
| 0 | 1 | 1.03304396 |
| 1 | x | 0.0044019 |
| 2 | y | −0.0075255 |
| 3 | $x^2$ | −0.001758 |
| 4 | xy | 0.00059955 |
| 5 | $y^2$ | −0.0204652 |
| 6 | $x^3$ | −2.482E−07 |
| 7 | $x^2y$ | 2.0185E−05 |
| 8 | $xy^2$ | 0.00020976 |
| 9 | $y^3$ | 1.7438E−05 |
| 10 | $x^4$ | −4.074E−09 |
| 11 | $x^3y$ | −3.675E−09 |
| 12 | $x^2y^2$ | 2.6495E−06 |
| 13 | $xy^3$ | 5.3343E−07 |
| 14 | $y^4$ | −2.185E−05 |
|  | $\theta y$ | 0° |
|  | $\delta y$ | 0 |

FIG. 45
(FOURTH MODIFICATION EXAMPLE)
(a)
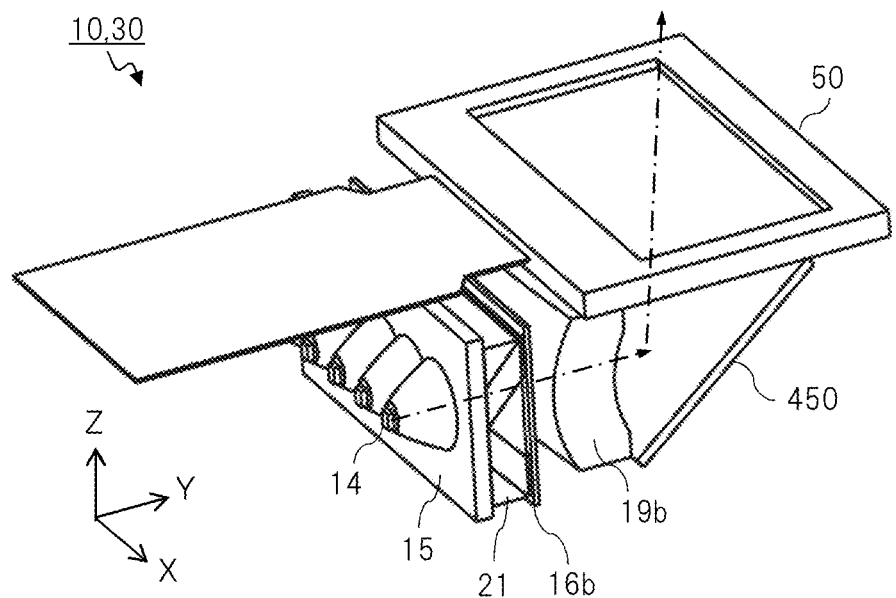
(b)
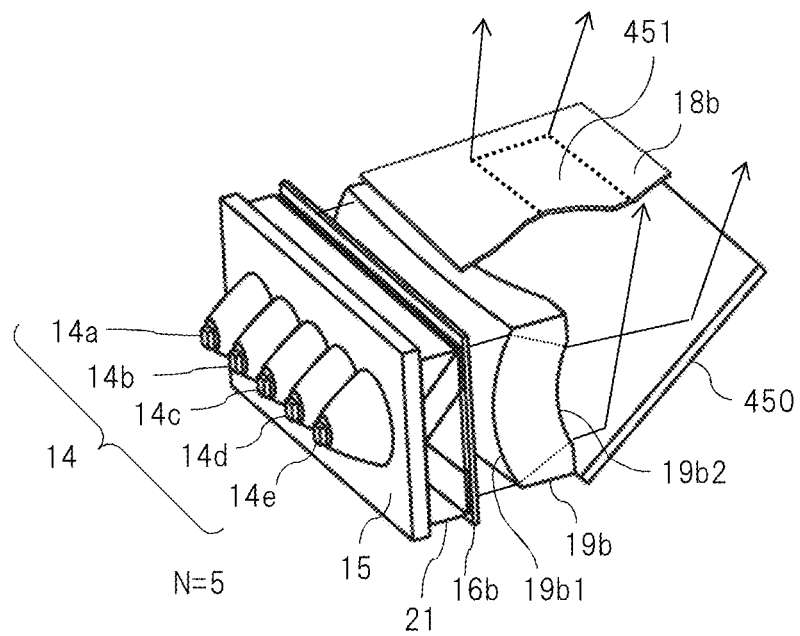

(FIFTH MODIFICATION EXAMPLE)

FIG. 47
(a)
(b)
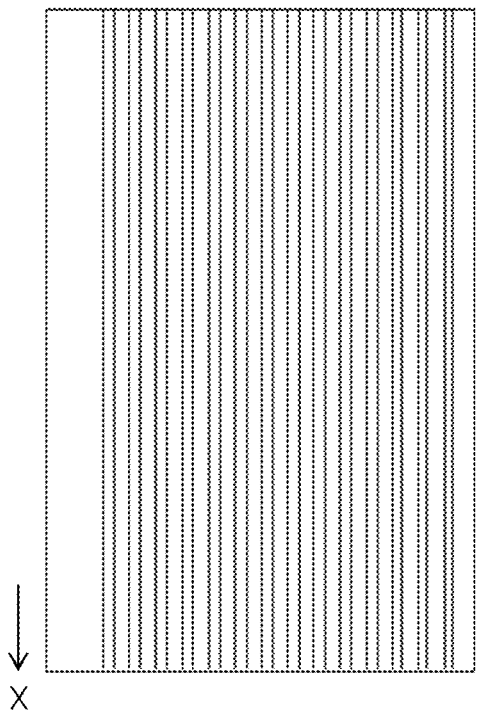
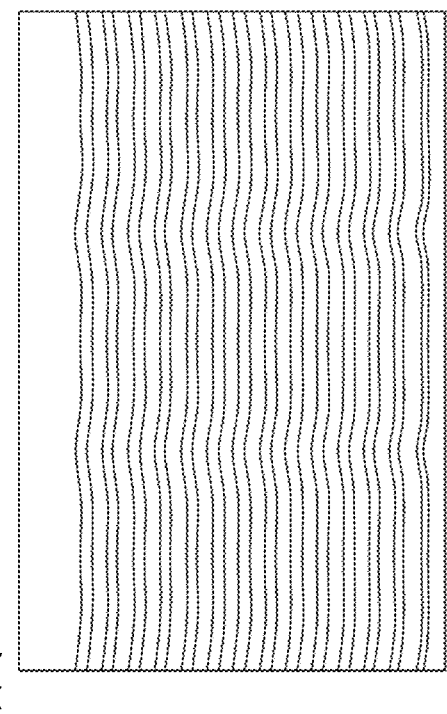
X
X

LIGHT SOURCE APPARATUS AND HEAD UP DISPLAY APPARATUS

TECHNICAL FIELD

The present invention relates to techniques such as a light source apparatus and an image display apparatus. The present invention also relates to a light source apparatus suitable as a light source for an image display apparatus such as an on-vehicle head up display (HUD) apparatus. The present invention also relates to a light source apparatus utilizable as a planar light source and planar lighting that use a solid light emitting element.

BACKGROUND ART

Along with remarkable development of solid light emitting elements such as light emitting diodes (LEDs) in recent years, lighting apparatuses that use these elements as light sources have been widely utilized, in various lighting fixtures, as long-life light sources which are small in size, light in weight, low in power consumption, and excellent also in environmental protection.

Conventionally, for example, according to Japanese Patent Application Laid-open No. 2016-33668 (Patent Document 1), already known as a light source apparatus for a projector (projection type display apparatus) has been a semiconductor element light source apparatus that is a semiconductor light source apparatus with a simple configuration and that efficiently cools a semiconductor light emitting element and emits bright light therefrom.

RELATED ART DOCUMENTS

Patent Documents

Patent Document 1: Japanese Patent Application Laid-open No. 2016-33668

SUMMARY OF THE INVENTION

Problems to be Solved by the Invention

However, in the semiconductor light source apparatus disclosed in the above-described conventional technique (Patent Document 1), efficiently cooling the semiconductor light emitting element mainly prevents the element from short-circuiting and not functioning, thereby providing a semiconductor element light source apparatus that emits light efficiently and brightly. Also, adopted has been a configuration in which the light emitted from the element is condensed by using single or a plurality of lenses provided opposite the element. This makes it possible in the conventional technique to improve light emission efficiency by a LED which is a semiconductor light source. However, it is difficult to sufficiently condense and use the emitted light. Particularly, in a projector requiring high light emission performance and further in a HUD apparatus and an on-vehicle headlamp apparatus, etc., there has been room for various improvements since their light utilization efficiency characteristics and/or uniform lighting characteristics have not been enough yet.

Accordingly, the present invention has an object of providing a light source apparatus that is small in size, light in weight, high in utilization efficiency of emitted light, and is modularized to be easily utilizable as a planar light source. More specifically, the present invention has an object of providing a light source apparatus suitable as a lighting light source in which the utilization efficiency and uniform illumination characteristics are further improved regarding the light from the LED light source and downsizing and modularization are achieved and that is manufacturable at low cost.

Means for Solving the Problems

A typical embodiment of the present invention is a light source apparatus etc., and is characterized by having the following configuration. A light source apparatus of one embodiment has: a light source unit including a plurality of semiconductor light source elements for generating light; a collimator including a plurality of collimator elements, each of the plural collimator elements being disposed on a light emission axis of each of the plural semiconductor light source elements; a polarization conversion element disposed on an emission side of the collimator; and a light guide disposed on an emission side of the polarization conversion element, in which the plural semiconductor light source elements and the plural collimator elements are arranged in a first direction orthogonal to the light emission axis, and the polarization conversion element extends in the first direction, and includes a polarizing beam splitter and a phase plate, which are arranged at symmetrical positions with respect to a plane, the plane being formed by the first direction and a second direction corresponding to the light emission axis.

Effects of the Invention

According to the typical embodiment of the present invention, provided can be a light source apparatus that is small in size and light in weight, has high utilization efficiency of emitted light, and is modularized to be easily utilizable as a planar light source. More specifically, provided can be a light source apparatus that further improves utilization efficiency and uniform lighting characteristics of light from a LED light source, achieves downsizing and modularization, and additionally is suitable as a lighting light source manufacturable at low cost. Further, provided can be a light source apparatus that have low power consumption and is excellent also in environmental protection. Additionally, provided can be a light source apparatus in which light from a LED light source is sufficiently condensed and is radiated to a display element such as a LCD. Moreover, provided can be a light source apparatus that has light distribution characteristics suitable as light sources of a HUD apparatus etc. Then, provided can be an apparatus as an HUD apparatus utilizing the light source apparatus, the apparatus being good in display characteristics of virtual image.

BRIEF DESCRIPTION OF THE DRAWINGS

FIG. 2 is a perspective view showing an overview of an internal configuration of the image display apparatus;

FIG. 6 is sectional view showing another example of the LED collimator which comprises the light source apparatus;

FIG. 7 is sectional view showing a comparative example with respect to the another example of the LED collimator which comprises the light source apparatus;

FIG. 9 is an overall perspective view for explanation about details of a light guide configuring the light source apparatus, and a sectional view including its partially enlarged cross-section;

FIG. 12 is a top view and a side view for explaining a light guide action of light in a configuration in which a light distribution control plate is disposed instead of an optical composite block;

FIG. 14 is a perspective view showing an internal configuration of yet another example which applies the light source apparatus of the present invention, and its developed perspective view;

FIG. 15 is a perspective view showing an overall overview of the yet another example which applies the light source apparatus of FIG. 14, and its developed perspective view;

FIG. 24 is a sectional view for explaining configurations of sizes etc. of the LED element and the LED collimator in the light source unit;

FIG. 25 is a perspective view showing a configuration of the polarization conversion element;

FIG. 26 is a plan view showing an arrangement configuration example of a plurality of LED elements etc. with respect to the polarization conversion element;

FIG. 29 is a top view and a side view which show a first example about a plurality of light source elements (when N=5) of a light source apparatus in Embodiment 2;

FIG. 30 is a top view and a side view which show a second example about the plural light source elements (when N=6) of the light source apparatus in Embodiment 2;

FIG. 32 is a side view showing a detail of a reflector of the light guide;

FIG. 35 is a view showing a configuration of a light distribution control board of the light source apparatus;

FIG. 36 is a view including a characteristic curve for explaining characteristics of a light scattering surface of a diffuser in the light source apparatus;

FIG. 39 is an explanatory diagram showing an equation and coefficients about a free-form surface in the light source apparatus of Embodiment 2;

FIG. 42 is a perspective view and a partially sectional view which show configurations of a light source apparatus and an image display apparatus of a third modification example of Embodiment 2;

FIG. 44 is an explanatory drawing showing an equation and coefficients about a free-form surface of the light guide;

FIG. 45 is a perspective view showing configurations of a light source apparatus and an image display apparatus of a fourth modification example of Embodiment 2;

FIG. 47 is a view showing a configuration of a texture for a light guide in a light source apparatus of a sixth modification example of Embodiment 2.

DETAILED DESCRIPTION OF PREFERRED EMBODIMENTS

Figure 1:
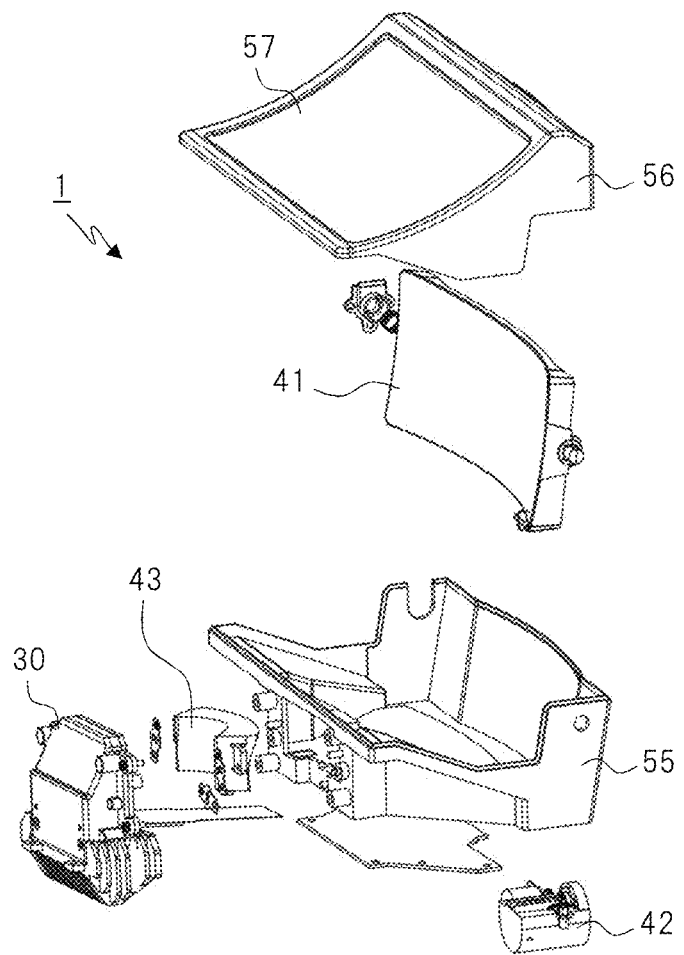
FIG. 1 is a developed perspective view showing, as an embodiment (Embodiment 1) which applies a light source apparatus of the present invention, an overall overview of a HUD apparatus configured by including the light source apparatus and an image display apparatus.

Hereinafter, embodiments of the present invention will be described in detail with reference to the accompanying drawings. Note that components having the same function are denoted by the same reference characters throughout the drawings for describing the embodiments, and the repetitive description thereof will be omitted. Additionally, portions explained by attaching the reference characters in a drawing may be mentioned with the same reference characters without drawing the portions in explaining other drawings.

Embodiment 1

A light source apparatus etc. according to one embodiment (referred to as Embodiment 1) of the present invention will be described with reference to FIGS. 1 to 5.

1-1: HUD Apparatus

FIG. 1 is a developed perspective view showing an overall appearance of a HUD apparatus that includes an image display apparatus applying a light source apparatus according to one embodiment of the present invention. FIG. 1 shows an example of applying, to a HUD apparatus 1, a light source apparatus as an example. Incidentally, in FIG. 1 etc., a transverse direction in the drawings corresponds to a horizontal direction, and a longitudinal direction in the drawings corresponds to a vertical direction. An image display apparatus 30 including a light source apparatus is attached to a part of an exterior case 55 that is a casing thereof. A concave mirror 41 and a distortion correction lens 43, etc. are accommodated inside the exterior case 55. Further, an opening for projecting image light toward a windshield (not shown) is formed on a top surface of an upper exterior case 56. The opening is covered with an antiglare plate 57 (glare trap). Also, a concave mirror driver 42 is configured by an electric motor etc. for adjusting a position of the concave mirror 41.

In the HUD apparatus 1 having such a configuration, image light emitted from the image display apparatus 30 is projected onto the windshield of a vehicle (not shown) via a display distance adjusting mechanism and a mirror driver etc. that are not shown here. Further, by adjusting a position(s) of projecting an image(s) onto the windshield through adjustment of an angle of the concave mirror 41, a display position(s) of a virtual image(s) viewed (seen) by a driver may be adjusted upward and downward. Incidentally, content displayed as the virtual image is not particularly limited and, for example, vehicle information, navigation information, a front scenery image(s) photographed with a not-illustrated camera image (a monitoring camera and an around viewer, etc.) may be displayed appropriately.

1-2: Image Display Apparatus

FIG. 2 is a perspective view showing an overview of an internal configuration of an image display apparatus according to one embodiment. Subsequently, the above-described image display apparatus 30 will be detailed below with reference to FIG. 2. Incidentally, in FIG. 2 etc., an X direction, a Y direction, and a Z direction are illustrated as directions for explanation.

The image display apparatus 30 is configured by accommodating, for example, an LED, a collimator, a polarization conversion element, and a light guide, etc., which will be detailed later, inside a light-source-apparatus case 11 formed of plastic etc. A liquid crystal display element 50 is attached to a top surface of the image display apparatus 30. Attached onto one side surface of the image display apparatus 30 are an LED element 12 that is a semiconductor light source and an LED substrate 12 on which a control circuit thereof is mounted. Further, a heat sink (radiation fin) 13 for cooling heat generated in the LED element and the control circuit is attached to an outer surface of the LED substrate 12.

Additionally, in the above-described image display apparatus 30, the liquid crystal display element 50 attached to a top surface of the light-source-apparatus case 11 is configured by: a liquid crystal display panel frame 51; a liquid crystal display panel 52 attached to the liquid crystal display panel frame 51; and an FPC (flexible wiring board) 53 electrically connected to the liquid crystal display panel 52.

Incidentally, as is clear from the above description, for example, where being used, the HUD apparatus requires particularly being small in size and high in efficiency for modularization and being suitably utilizable with respect to the image display apparatus 30 that includes a light source apparatus configuring the HUD apparatus 1 from a condition of incorporation into a narrow space called a dashboard of the vehicle.

1-3: Image Display Apparatus—Optical System

Figure 3:
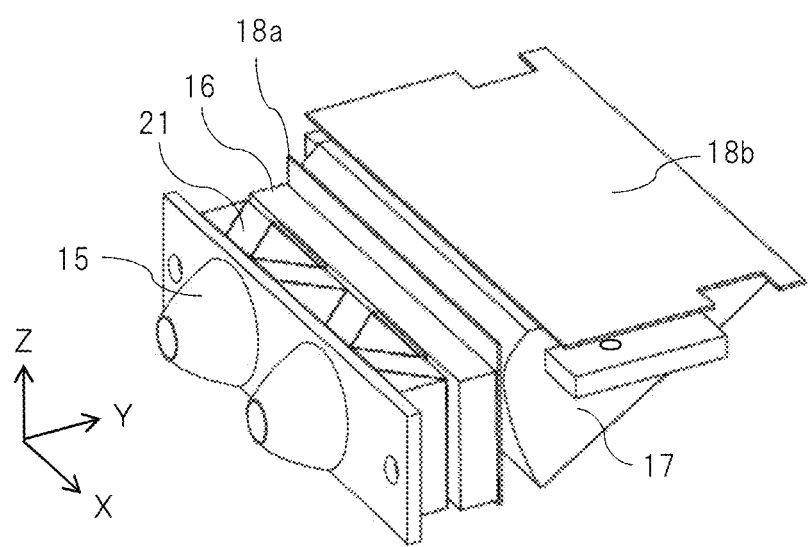
FIG. 3 is a perspective view showing an example of a configuration of an internal optical system etc. of the light source apparatus.

FIG. 3 is a perspective view showing an example of an internal configuration of the light source apparatus according to one embodiment. FIG. 3 shows an inside of the image display apparatus 30, i.e., a configuration of an optical system housed in the light-source-apparatus case 11. Namely, a plurality of (two in this example) LED elements 14a, 14b (not shown here) constituting a light source are attached to LED collimators 15 at predetermined positions.

Incidentally, although will be detailed later, an light emission side of each LED collimator 15 is provided with a polarization conversion element 21 that is composed of optical members such as a polarizing beam splitter and a phase plate disposed symmetrically with respect to a central axis of the LED collimator. Further, a rectangular optical composite block 16 is provided on an emission side of the polarization conversion element 21. Namely, the light emitted from the LED element 14a or 14b is converted into parallel light by action of the LED collimator 15 and is incident on the optical composite block 16.

Figure 8:
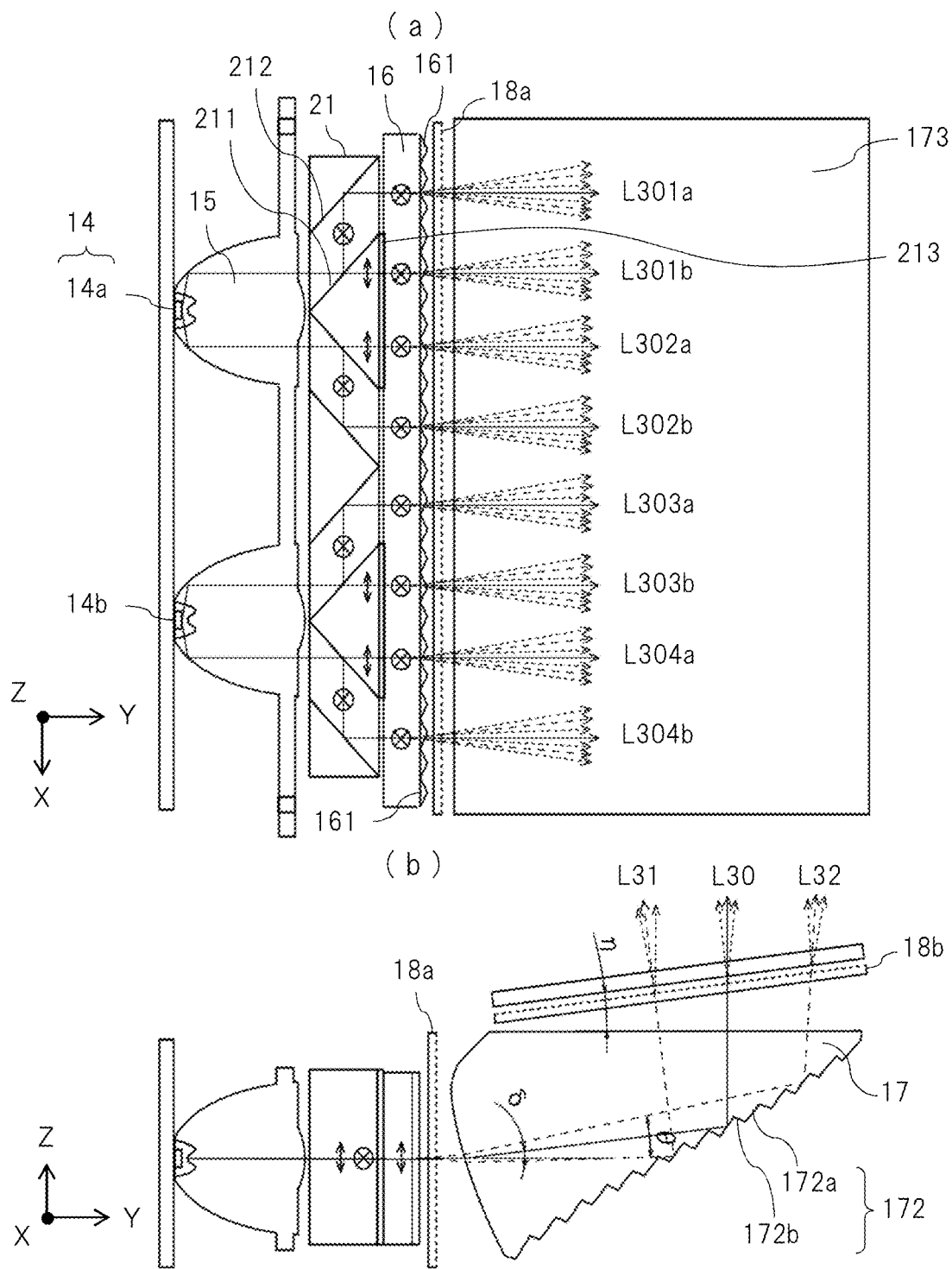
FIG. 8 is a top view and a side view for explaining a generating operation of polarized light in a light source apparatus provided with a polarization function.

Further, as shown in FIG. 8 to be later-described as one example, an emission surface side of the optical composite block 16 is provided via a first diffuser 18a with a pyramid-shaped light guide 17 that has a substantially triangular cross-section. A second diffuser 18b is attached to an upper surface of the light guide 17. By such a configuration, horizontal light of the LED collimator 15 is reflected upward (vertically upward, Z direction) in the drawing by action of the light guide 17, and is guided to an incidence surface of the liquid crystal display element 50. Incidentally, at that time, an intensity of its light is made uniform by the first diffuser 18a and the second diffuser 18b. Subsequently, main parts constituting the above-described light source apparatus will be described below including a detail of each part.

1-4: Light Source Apparatus—LED Collimator

Figure 4:
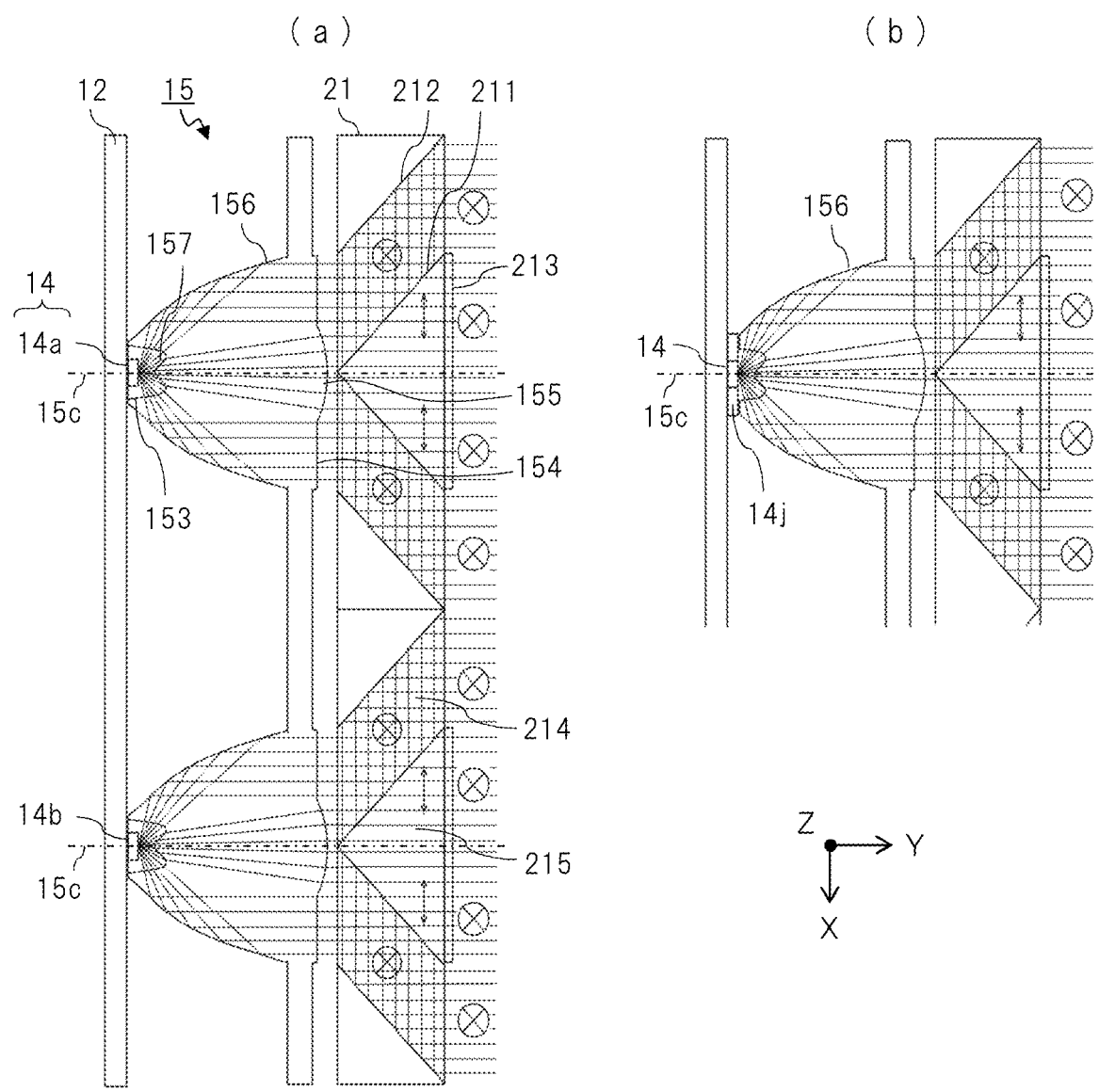
FIG. 4 is a sectional view showing a specific configuration of a LED collimator which comprises the light source apparatus.

FIG. 4 is a sectional view showing a specific configuration of the LED collimator that configures the light source apparatus according to one embodiment. Incidentally, in FIG. 4 etc., an optical axis is indicated by a dash-single-dot line. In FIG. 4, a Z direction corresponds to a direction perpendicular to the drawing. An X direction is a longitudinal direction in the drawing, and corresponds to a direction in which a plurality of parts such as a plurality of (two) LED elements 14, LED collimator units, and polarization conversion elements 21 are arranged. A Y direction is a transverse direction in the drawing, and corresponds to a direction of a light emission axis.

As shown also in FIG. 4, the light source apparatus according to one embodiment is configured by: LED elements 14 (14a, 14b) that are formed on the LED substrate 12 and are a plurality of (two) semiconductor light emitting elements (solid light source elements); and LED collimators 15 disposed opposite light emission surfaces of the LED elements 14. Incidentally, each LED collimator 15 is formed of a translucent resin such as polycarbonate. As shown in FIG. 4(a), the LED collimator 15 is formed on the LED substrate 12 so that the LED element 14 (14a, 14b) is centered and surrounded. More specifically, the LED collimator 15 has a conical outer peripheral surface 156 obtained by rotating a substantially parabolic cross-section, and a concave (recess) part 153 having a predetermined curved surface is formed at its apex portion that is a light incidence side. The LED element 14 is disposed at a substantially central portion of the concave part 153. Incidentally, a parabolic surface (reflector portion) forming the conical outer peripheral surface 156 of the LED collimator 15 is set together with a curved surface of the concave part 153 so that light, which is emitted toward a peripheral direction from the LED element 14 and is incident on an inside of the LED collimator 15 via air in the concave part 153, is incident on the parabolic surface (outer peripheral surface 156) within a range of totally reflected angles of the parabolic surface.

Additionally, as shown in FIG. 4(b), when a LED support 14j is provided outside a light emitting unit of the LED element 14 and the LED support 14j is larger than the concave part 153, the outer peripheral surface 156 of the LED collimator 15 may have such a shape as to cut its tip portion and to avoid interference with the LED support 14j. Thus, utilizing the total reflection on the parabolic surface needs no step (process) of forming etc. a metal reflection film on the outer peripheral surface 156 of the LED collimator 15, and so makes it possible to manufacture apparatuses at lower cost.

Additionally, an incidence surface (lens surface) 157 with a predetermined curved surface is formed at a central portion of the concave part 153 of the LED collimator 15, and forms a so-called convex lens having light condensing action together with a convex-shaped portion (lens surface) 155 that is formed on an opposite surface (emission surface) 154. Incidentally, this convex-shaped portion 155 may be formed in a plane or a convex-shaped lens surface whose inside is recessed. Namely, the LED collimator 15 has at a central portion of its conical profile: a light condensing lens function of collecting, on the emission surface side, the light emitted from the LED element 14; and a function of condensing the light emitted in the peripheral direction from the LED element 14 and guiding it to the emission surface side similarly also to the outer peripheral surface 156 (reflector portion).

Incidentally, as shown in FIG. 4, the above-described LED substrate 12 is disposed and fixed so that each of the LED elements 14 (14a, 14b) on a surface of the substrate is located (positioned) at the central portion of the concave part 153. According to this configuration, some light beams particularly emitted toward an emission optical axis (right-way in the drawing, Y direction) from the central portion among light beams emitted from the LED element 14 are condensed by two convex lens surfaces (incidence surface 157, convex-shaped portion 155) with the above-described LED collimator 15 and are made parallel light, the two convex lens surfaces forming a profile (outer shape) of the LED collimator 15. Additionally, light beams emitted from the other portions toward the peripheral direction are reflected by the parabolic surface forming the conical outer peripheral surface 156 (reflector portion) of the LED collimator 15, and are similarly condensed and collimated (made parallel light). In other words, the LED collimator 15, which configures a convex lens at its central portion and forms a parabolic surface at its peripheral portion, makes it possible to extract, as parallel light, almost all of the light beams generated by the LED element 14. Consequently, utilization efficiency of the generated light can be improved.

1-5: Light Source Apparatus—Polarization Conversion Element

Subsequently, described will be a polarization conversion element 21 effective for realizing a high-efficiency light source in the image display apparatus and the light source apparatus which use the liquid crystal display element. As shown in FIG. 4, the polarization conversion element 21 is disposed behind an emission surface 154 of the LED collimator 15. As described below, the polarization conversion element 21 is configured by a translucent member (prism), a polarizing beam splitter (abbreviated as "PBS"), and a phase plate, etc. The polarization conversion element 21 is configured by combining: a columnar (parallelogram pillar) translucent member 214 that extends along a direction (Z direction) perpendicular to the drawing and has a parallelogram cross-section; and a columnar (triangular prism) translucent member 215 that has a triangular cross-section. The polarization conversion element 21 is configured so that a plurality of parallelogram-pillar translucent members 214 and a plurality of triangular-prism translucent members 215 are arranged in parallel (in a direction along the drawing in this example) to a plane orthogonal to an optical axis of the parallel light emitted from the LED collimator 15 and in an array state and that the respective members are arranged symmetrically with respect to the central axis 15c of the LED collimator 15. Further, a PBS film 211 and a reflection film 212 are alternately provided at interfaces among the adjacent translucent members 214, 215 arranged in the array state. Additionally, a half wave plate 213 that is a phase plate is provided on an emission surface, the light that is incident on the polarization conversion element 21 and is transmitted through the PBS film 211 being emitted from the emission surface.

In this manner, the polarization conversion element 21 has such a configuration that optical members such as PBSs and phase plates are arranged symmetrically with respect to a plane (a perpendicular surface perpendicularly extending in the drawing, Y-Z surface) formed by the optical axis (Y direction) of the parallel light emitted from the LED collimator 15 and by an extension direction (Z direction) of the parallelogram-pillar translucent member 214, i.e., with respect to a so-called optical axis surface of the LED collimator. Then, the polarization conversion element 21 in FIG. 4(a) is divided into two sets in the vertical direction (X direction) with respect to the parallel light emitted from the two LED collimators 15 (collimator units), thereby configuring two sets of polarization conversion elements 21.

According to the polarization conversion element 21 configured as described above, as is clear from FIG. 4, for example, S-polarized waves (see symbols (x) in the figure, waves perpendicular to an incidence surface) among incident light beams that are emitted from the LED element 14 (14a, 14b) and are made parallel light by the LED collimator 15 are reflected by the PBS film 211, and then further reflected by the reflection film 212 to reach an incidence surface of the optical composite block 16. Meanwhile, P-polarized waves (see up and down arrows in the figure, waves parallel to the incidence surface) pass through the PBS film 211, are then made S-polarized waves by the half wave plate 213, and reach the incidence surface of the optical composite block 16. Consequently, according to the polarization conversion element 21, all of the light beams emitted from the plural LED elements 14 (14a, 14b) and made parallel light by the LED collimator 15 become S-polarized waves, and are incident on the incidence surface of the optical composite block 16. Further, as described above, arranging the optical members such as PBSs and phase plates so as to be symmetric with respect to the central axis of the LED collimator 15 brings accomplishment of miniaturization of the apparatuses.

1-6: Light Source Apparatus—Comparative Example

Figure 5:
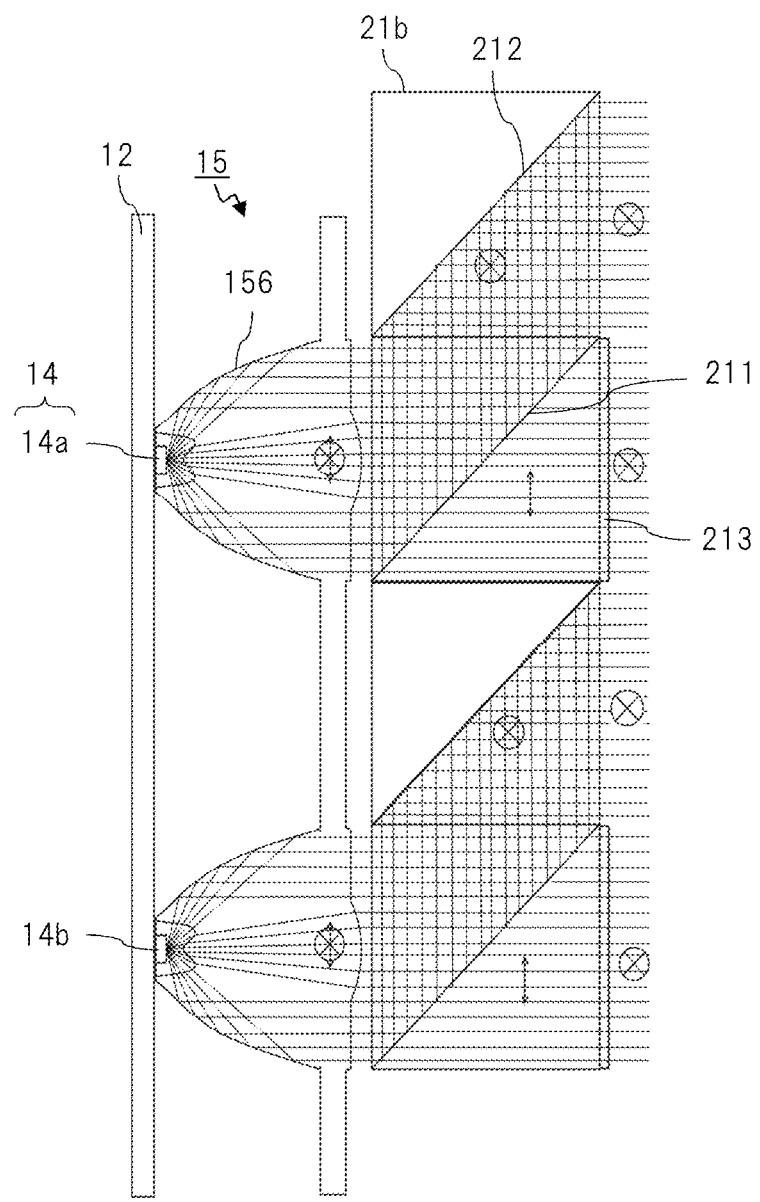
FIG. 5 is sectional view showing a comparative example of the LED collimator which comprises the light source apparatus.

FIG. 5 is a sectional view showing a comparative example of an LED collimator constituting the light source apparatus of one embodiment. As a comparative example, an arrangement example of general polarization conversion elements 21b is shown in FIG. 5. S-polarized waves among the incident light beams emitted from the LED element 14 (14a, 14b) and made parallel light by the LED collimator 15 are reflected by the PBS film 211, then further reflected by the reflection film 212, and reach the incidence surface of the optical composite block 16. Meanwhile, P-polarized waves pass through the PBS film 211, are then made S-polarized waves by the half wave plate 213, and reach the incidence surface of the optical composite block 16.

Consequently, according to the polarization conversion element 21b, the light beams emitted from the plural LED elements 14 and made the parallel light by the LED collimator 15 all become S-polarized waves, and lead to being incident on the incidence surface of the optical composite block 16. Thus, similarly to the configuration shown in FIG. 4, high efficiency can be realized in a light source that uses a liquid crystal display apparatus. However, thickness of the polarization conversion element 21b becomes thicker (larger) than that of the configuration shown in FIG. 4, and the light source apparatus cannot be reduced in size. Additionally, an increase in the thickness of the polarization conversion element brings an increase in amounts of used materials, which makes it impossible to realize lower cost reduction. Further, the increase of the thickness makes, larger, an optical path length difference between a light flux reflected by the PBS film and a light flux transmitted through the PBS film. Then, since the optical path length difference becomes large, a difference between the two light-flux shapes is more likely to occur. Particularly, in a system using the plural light sources and LED collimators, it becomes difficult to realize luminance distribution uniformity due to the difference in light-flux shape.

Therefore, in such a configuration that downsizing is required like the HUD apparatus and uniformity of luminance is necessary by using the plural LEDs, as shown in FIG. 4, adopting a configuration in which the plural optical members constituting the polarization conversion element 21 are arranged symmetrically with respect to the central axis of each LED element 14 is useful to make, smaller, the optical path length difference between the light flux reflected by the PBS film 211 of the polarization conversion element 21 and the light flux transmitting through the film.

1-7: Light Source Apparatus—LED Collimator (2)

Further, in order to achieve high luminance and a wide viewing angle of the HUD apparatus, an increase of output of the LED light source is desired. In order to increase the output of the LED light source, there are means for increasing the number of LEDs or increasing an area of the LED light source.

FIG. 6 is a sectional view showing another example of the LED collimator 15 constituting the light source apparatus of one embodiment. In using the liquid crystal display apparatus, the polarization conversion element 21 to be effective for achieving high efficiency of the light source has, as shown in FIG. 6, a limiting width 21w of an incident light flux. As a result of an examination, if a width w of the LED light source (LED element 14) in a direction of the limiting width 21w of the incident light flux becomes ¼ or more with respect to the limiting width 21w, occurrence of a problem as shown in FIG. 7 has been found when the emission surface 154 of the LED collimator 15 is flat.

FIG. 7 is a sectional view showing a comparative example with respect to another example of the LED collimator 15. Namely, as shown in FIG. 7(a), if a shape of the concave part 153 of the LED collimator 15 is made larger in dimension than the width w of the LED light source in order to secure a received amount of light emitted from the LED light source (LED element 14), rays L303, L304 emitted from the LED light source and having large divergence angles cannot be extracted for shape restriction of the outer peripheral surface 156 of the LED collimator 15, and its efficiency is lowered. Meanwhile, as shown in FIG. 7(b), if the concave part 153 of the LED collimator 15 is changed to such a shape that the rays L303, L304 having the large divergence angle can be extracted, a size of the concave part 153 becomes smaller in dimension than the width w of the LED light source and the concave part cannot extract rays (not shown) emitted from a peripheral edge of the LED, which brings a reduction in its efficiency.

As a result of intensive examinations, as shown in FIG. 6(a), by providing a concave surface 158 toward the LED element on the emission surface 154 of the LED collimator 15 and at an inside close to the limiting width 21w of the incident light flux, the shape of the outer peripheral surface 156 of the LED collimator 15 can be made larger than the shape shown in FIG. 7(a). Consequently, the problem as described above has been found to be solved. Namely, since the shape of the outer peripheral surface 156 of the LED collimator 15 is increased, the light reflected by the outer peripheral surface 156 becomes slightly converging light as indicated by the rays L301, L302 in FIG. 6(a), but is converted to substantially parallel light and emitted from the emission surface 154. Therefore, the light source apparatus with good efficiency and characteristics can be realized.

Further, regarding some rays emitted from the LED element 14 and refracted by a convex-shaped incidence surface (lens surface) 157 of the LED collimator 15, a shape of FIG. 6(a) will be described with reference to FIG. 6(b) that illustrates a shape viewed from the X direction. Since the incidence surface 157 of the LED collimator 15 becomes a convex-lens shape, light beams L30 emitted from a central portion of the LED element 14 are converted to substantially parallel light at the incidence surface and reach the emission surface 154. Meanwhile, considering rays L3001, L3002 emitted from an end portion of the LED element 14 in the Z direction and particularly intersecting at its central axis, each ray is incident on the convex-shaped incidence surface 157 of the LED collimator 15 at an angle approximately perpendicular to the convex-shaped incidence surface 157, so that its refraction angles is small and each ray travels to the outer peripheral portion of the emission surface 154 of the LED collimator 15.

Incidentally, in the direction (Z direction) shown in FIG. 6(b), the above-described limiting width of the incident light flux of the polarization conversion element 21 becomes an opening height 21h of a polarization-conversion-element holder 60. In this example, a convex lens-shaped portion 159 is formed on the outer peripheral portion of the emission surface 154 of the LED collimator 15, and the ray is transmitted through a surface of the convex lens-shaped portion 159 and is incident on the next optical element(s) (e.g., optical composite block and polarization conversion element 21, etc.). Incidentally, here, when the outer peripheral portion of the emission surface 154 of the LED collimator 15 is flat instead of the convex lens-shaped portion 159 (see dashed portions in the vicinity of the convex lens-shaped portion 159 in FIG. 6(b)), the rays L3001d, L3002d may be largely refracted on the surface (not shown) or totally reflected as indicated by dashed arrows. Namely, when it is flat, the rays cannot be effectively used, which leads to lowering utilization efficiency of light.

Consequently, according to the above-described LED collimator 15, the light emitted by the LED element 14 is condensed including not only the light emitted along an emission optical axis but also the light emitted in its peripheral direction, and can be guided to an emission surface side. This makes it possible to provide the light source apparatus that has high utilization efficiency of emitted light and is modularized to be easily utilizable as a planar light source. More specifically, can be provided the light source apparatus that: further improves the light utilization efficiency of the light emitted from the LED light source and the uniform lighting characteristics; simultaneously achieves the downsizing and modularization of the light source apparatus; and additionally is suitable as a lightening light source manufacturable at lower cost. Incidentally, the polarization conversion element 21, the polarization-conversion-element holder 60, and the light distribution control plate 16b in FIG. 6 will be described later. Additionally, respective propagation directions of light beams L3001c, L3002c, L3001d, L3002d inside them are indicated by arrows.

1-8: Light Source Apparatus—Optical Composite Block and Diffuser

FIG. 8 is a top view and a side view for explaining a generating operation of polarized light in a light source apparatus, which has a polarization function, according to one embodiment. Subsequently, the optical composite block 16 etc., which are other components of the above-described image display apparatus 30, will be described with reference to FIG. 8.

In the optical composite block 16 formed in a prismatic shape and made of a translucent resin such as acrylic, as is clear from FIG. 8(a), a large number of textures 161 each having a substantially triangular cross-section are formed on its emission surface. Due to action of the textures 161, the light emitted from the LED collimator 15 is diffused in the X direction of an incidence part (surface) 171 of the light guide 17 described below. Then, even if the LED collimators 15 are discretely arranged due to an interaction between each of the above-described substantially triangular textures 161 and each of the diffusers 18a, 18b described below, the light emitted from the emission part 173 of the light guide 17 can be uniformized in its intensity distribution.

Particularly, the above-described textures 161 make it possible to limit a diffusion direction to a side direction (X direction) of the light guide 17 and further perform control of diffusibility in the side direction. This makes it possible to weaken isotropic diffusivity of the above-described first diffuser 18a and second diffuser 18b. As a result, the light utilization efficiency is improved, and the light source apparatus with good characteristics can be realized. Incidentally, in this example, shown as an example of the substantially triangular texture 161 is an example in which an angle of a slope of its triangle is 30 degrees and its formation pitch is 0.5 mm.

1-9: Light Source Apparatus—Light Guide

FIG. 9 is an overall perspective view for explaining details of a light guide constituting a light source apparatus of one embodiment, and a sectional view including a partially enlarged cross-section thereof. Subsequently, details of the light guide 17 constituting the image display apparatus 30 will be described below with reference to FIG. 9. Incidentally, the light guide 17 has such a function that light extracted as parallel light from the above-described light source apparatus is guided in a desired direction and is extracted as planar light having a desired area. FIG. 9(a) is a perspective view showing the entire light guide 17, FIG. 9(b) is a cross-section thereof (Y-Z plane), and FIGS. 9(c) and 9(d) are partially enlarged sectional views each showing details of the cross-section.

The light guide 17 is a member formed in a rod shape that has a substantially triangular cross-section (see FIG. 9(b)) and is made of, for example, a translucent resin such as acrylic. Then, as is clear from FIG. 9(a), the light guide 17 includes on the emission surface of the optical composite block 16 (FIG. 8): a light-guide light incidence part (surface) 171 opposing (facing) 50 via a first diffuser 18a; a light-guide light reflection part (surface) 172 forming a slop; and a light-guide light emission part (surface) 173 opposing (facing) a liquid crystal display panel 52 of the above-described liquid crystal display element 50 via a second diffuser 18b. Incidentally, the above respective members may be described as an incidence unit (incidence surface), a reflection unit (reflection surface), and an emission unit (emission surface), etc.

The light-guide light reflection part (surface) 172 of the light guide 17 is formed in a serrate shape that alternately has a large number of reflection surfaces 172a and connection surfaces 172b as shown in FIGS. 9(c) and 9(d). Then, each reflection surface 172a (a line segment rising to right in FIG. 9) forms an angle αn (n is a natural number, 1 to 130 in this example) with respect to a horizontal plane indicated by a dash-single-dot line in FIG. 9. As its example, here, the angle αn is set to 43 degrees or less (however, 0 degrees or more).

Meanwhile, each connection surface 172b (a line segment falling to right in FIG. 9) forms an angle βn (n is a natural number, 1 to 130 in this example) with respect to the horizontal plane. Namely, the connection surface 172b of the light-guide light reflection part (surface) 172 is inclined with respect to the incident light at such an angle as to become a shadow within a range of a half-value angle of a scatterer described later. As will be detailed later, each of α1, α2, α3, α4, . . . that are the angles αn forms a reflection-surface elevation angle, and each of β1, β2, β3, β4, . . . that are the angles βn forms a relative angle between the reflection surface 172a and the connection surface 172b and, as its example, the relative angle is set to 90 degrees or more (however, 180 degrees or less). Incidentally, in this example, β1=β2=β3=β4= . . . =β122= . . . =β130.

Figure 10:
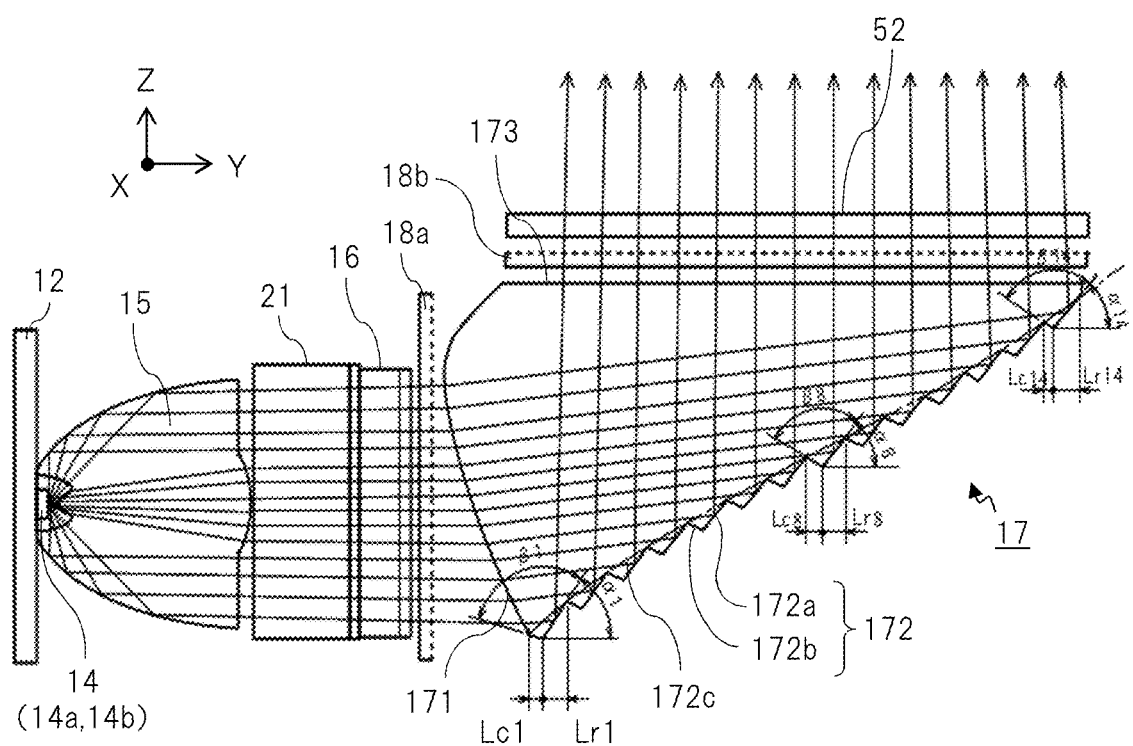
FIG. 10 is a side view explaining a light guide action of light by the light guide.

FIG. 10 is a side view for explaining a light guiding action of light due to the light guide 17. For the sake of explanation, FIG. 10 shows a schematic diagram in which sizes of the reflection surface 172a and the connection surface 172b are made relatively large with respect to the light guide 17. On the light-guide light incidence part (surface) 171 of the light guide 17, a main light beam is deflected only by an angle δ in a direction in which the incidence angle increases with respect to the reflection surface 172a (see FIGS. 8(b) and 12(b)). Namely, the light-guide light incidence part (surface) 171 is formed in a curved convex shape that is inclined on a side of the light source. According to this, the parallel light from the emission surface of the optical composite block 16 is diffused and incident via the first diffuser 18a and reaches, as is clear from FIG. 10, the light-guide light reflection part (surface) 172 while slightly bending (deflecting) upward (Z direction) due to the light-guide light incidence part (surface) 171.

Incidentally, on this light-guide light reflection part (surface) 172, a large number of reflection surfaces 172a and connection surfaces 172b are alternately formed in a serrate shape. Diffused light beams are totally reflected on the respective reflection surfaces 172a, go upward, are further paralleled via the light-guide light emission part (surface) 173 and the second diffuser 18b, and are incident, as parallel diffused light beams, on the liquid crystal display panel 52. Consequently, the angle αn (α1, α2, . . . ) that is the reflection-surface elevation angle is set so that each reflection surface 172a has an angle equal to or greater than a critical angle with respect to each of the above-described diffused light beams. Meanwhile, the angle βn (β1, β2, . . . ), which is the relative angle between the reflection surface 172a and the connection surface 172b, is set to a constant angle as described above, more preferably, an angle of 90 degrees or more (βn≥90°).

By the above-described configuration, each reflection surface 172a is configured to always have an angle equal to or greater than the critical angle with respect to the above-described diffused light beam. This makes it possible to achieve a light source apparatus having the light guide 17, in which total reflection becomes possible even if a reflection film such as a metal film is not formed on the light-guide light reflection part (surface) 172 and which has a function of, at lower cost, guiding light in a desired direction(s) and extracting, as planar light beams having a desired area, some light beams from the totally reflected light beams.

The shape of the light-guide light reflection part (surface) 172 of the above-described light guide 17 makes it possible to: meet a total reflection condition(s) of the main light; efficiently reflect the light without providing a reflection film such as aluminum on the light-guide light reflection part (surface) 172; and realize a bright light source at lower cost without needing to do deposition work of an aluminum thin film with an increase in manufacturing cost. Additionally, the angles βn, each of which is a relative angle, have been set to such an angle that the connection surface 172b becomes a shadow with respect to the light diffused by the optical composite block 16 and the diffuser 18a. This suppresses the incidence of unnecessary light on the connection surface 172b, and such suppression makes it possible to reduce the reflection of the unnecessary light and to realize a light source apparatus with good characteristics.

Additionally, the above-described light guide 17, particularly, appropriate set of a ratio of the reflection surface 172a and the connection surface 172b makes it possible to freely vary (change) a length of the light-guide light emission part (surface) 173 in an optical axis direction. Realized from this can be a light source apparatus that is able to change, with respect to the light-guide light incidence part (surface) 171, a size (surface size) of the light-guide light emission part (surface) 173 to an appropriately necessary size (surface size) fit for apparatuses such as the above-described liquid crystal display panel 52 etc. This also makes it possible to form the light-guide light emission part (surface) 173 into a desired shape without depending on an arrangement shape of the LED elements 14 (14a, 14b) constituting the light source. Consequently, a planar light emission source having a desired shape leads to being obtained. Further, such a light emission source brings securing a degree of freedom in design including the arrangement of the LED elements 14 (14a, 14b) constituting the light source, which is advantageous for downsizing of the entire apparatus.

1-10: Image Display Apparatus (Application Example 1)

FIGS. 2 and 3 as described above show an example in which the light source apparatus according to one embodiment of the present invention is applied to the HUD apparatus 1, but the followings will show still another example (embodiment).

Figure 11:
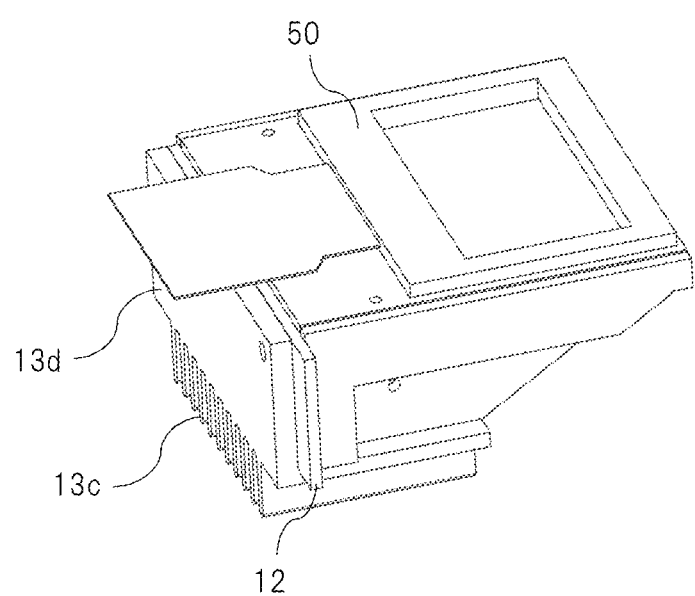
FIG. 11 is a perspective view showing an overall overview of yet another example of an image display apparatus which applies the light source apparatus of the present invention.

FIG. 11 is a perspective view showing an overall overview of an image display apparatus of another example which applies a light source apparatus of one embodiment of the present invention. Additionally, in an example shown in FIG. 11, its details are not shown, but the example has a structure in which heat generated in the LED substrate 12 is cooled through a heat transfer plate 13d by a heat sink (radiation fin(s)) 13c disposed at the lower part of the apparatus. Incidentally, this configuration example makes it possible to realize a light source apparatus having a shorter overall length (particularly, a length in the Z direction).

1-11: Image Display Apparatus (Application Example 2)

FIG. 12 is a top view and a side view for explaining, as another example, a light guiding action in a configuration of arranging a light distribution control plate 16b instead of the optical composite block 16. Further, in FIG. 12, the light source in the above-described image display apparatus is configured by three LED elements 14 (14a, 14b, 14c) in number, and respective LED collimators 15 (collimator unit) thereof are connected thereto, thereby being set as an integral part (component). Simultaneously therewith, a polarization conversion element 21 is provided between the LED collimator 15 and the light distribution control plate 16b. Additionally, this configuration is characterized by a configuration of using a relatively large LED element 14 as shown in FIG. 6 with respect to a shape of the LED collimator 15. In accordance therewith, a shape of an incidence part (concave part) 153 of the LED collimator 15 is larger in size than those of the other examples.

As explained with reference to FIG. 12(a), light beams L301, L302 emitted in oblique directions from the LED element 14a: are incident from (on) an incidence part (concave part 153) of the LED collimator 15; are reflected in states of light beams that are slightly converged at an outer peripheral surface 156; and reach an emission surface 154 of the LED collimator 15. An emission surface 154 of the LED collimator 15, particularly, its slightly peripheral edge 1581 has a concave shape. Consequently, the light beams L301, L302 are refracted at the peripheral edge 1581, are converted into substantially parallel light, and are incident on the light incidence part of the polarization conversion element 21. Adopting this configuration makes it possible to cause the light from the LED element 14 to be efficiently incident on the polarization conversion element 21 even when the limiting width 21w of the light incidence part of the polarization conversion element 21 is narrow as shown in FIG. 12(a), thereby being capable of realizing a highly efficient light source.

Subsequently, described with reference to FIG. 12(b) will be rays that are emitted from the LED element 14 (14a, 14b, 14c) and refracted by a convex-shaped incidence surface (concave part 153) on an incidence side of the LED collimator 15. Since the incidence surface (concave part 153) of the LED collimator 15 is convex on its incidence side, a light beam L30 emitted from a central portion of the LED element 14 (14a, 14b, 14c) is converted into substantially parallel light thereat, passes through the polarization conversion element 21, passes through the diffuser 18a, light guide 17, and diffuser 18b, and then is incident on the liquid crystal display panel 52. Meanwhile, considering rays L3001, L3002 that are emitted from an end portion of the LED element 14 (14a, 14b, 14c) and particularly intersect at its central axis, the rays are incident on the incidence surface (concave part 153) of the LED collimator 15 at an almost vertical angle, and so travels an outer peripheral portion of the emission surface 154 of the LED collimator 15 since its refraction angle is small.

Convex lens-shaped portions 159 are formed on the outer peripheral portion of the emission surface 154 of the LED collimator 15 as illustrated. The ray: passes through a surface of the convex lens-shaped portion 159; passes through the polarization conversion element 21; then passes through the light distribution control plate 16b; passes through the diffuser 18a, light guide 17, and diffuser 18b as illustrated by the light beams L3001b, L3002b; and is incident on the liquid crystal display panel 52.

Here, when the outer peripheral portion 159 of the emission surface 154 of the LED collimator 15 is not convex but flat, rays L3001d, L3002d as illustrated are largely refracted (not shown) on or totally reflected by the surface as illustrated, which brings a deterioration in efficiency accordingly. Additionally, when the apparatus has no light distribution control plate 16b, rays L3001c, L3002c as illustrated deviate from the light incidence part of the light guide 17 and so cannot be used effectively, which brings a deterioration in efficiency similarly thereto.

1-12: Image Display Apparatus (Application Example 3)

Figure 13:
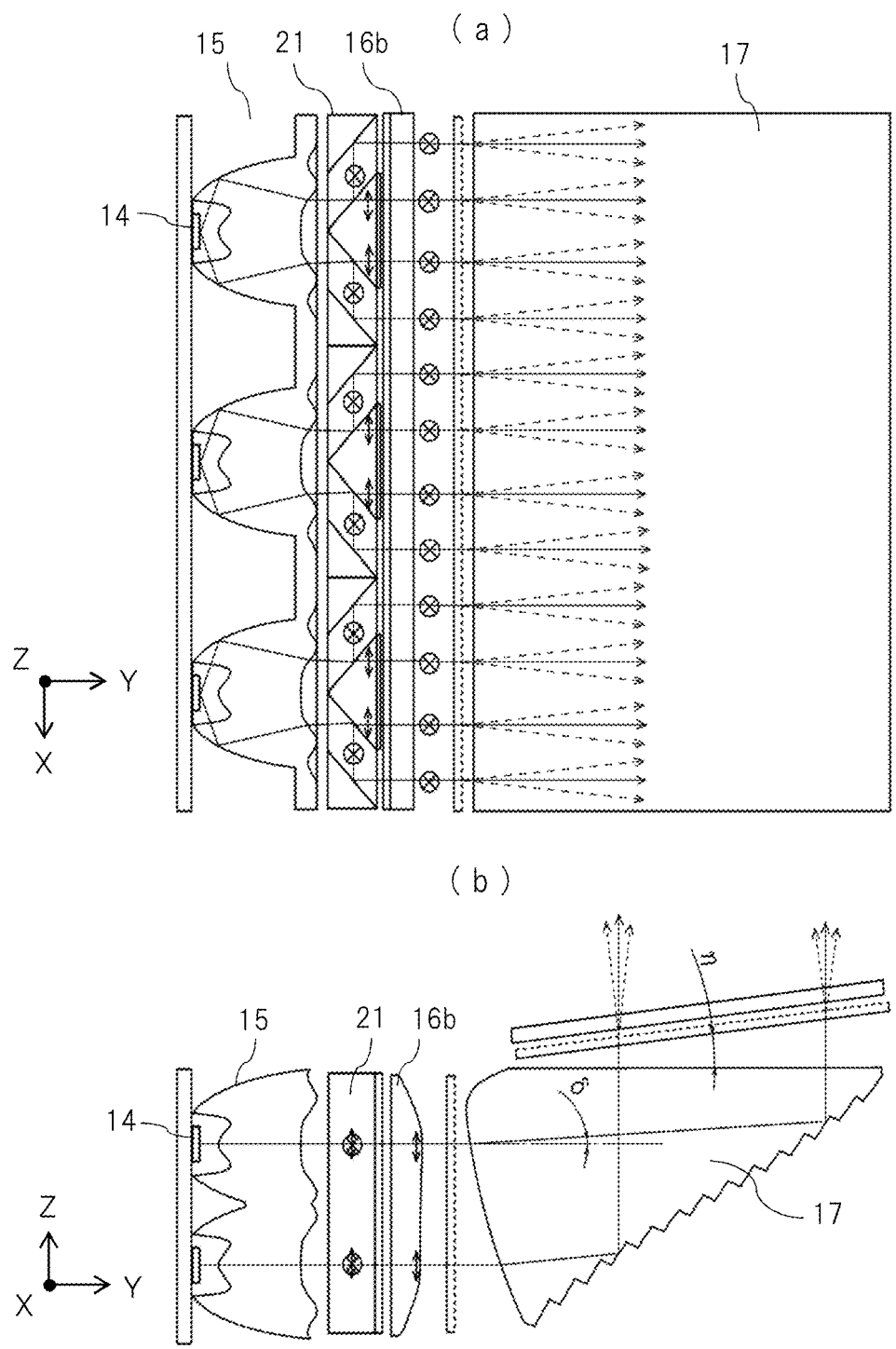
FIG. 13 is a top view and a side view for explaining another example of the light source apparatus in the image display apparatus shown in FIG. 12.

FIG. 13 is a top view and a side view for explaining another example of the light source apparatus of the image display apparatus shown in FIG. 12. FIG. 13 shows an example in which a row of three LED elements 14 are further added to the configuration shown in FIG. 12, i.e., the respective 3×2=6 (three in the X direction and two in the Z direction) LED elements 14 and LED collimators 15 are arranged. Incidentally, the six LED collimators 15 (collimator unit) corresponding to the six LED elements 14 are connected and formed integrally similarly to the above. Incidentally, considering easiness etc. of manufacturing the polarization conversion element 21, it is desirable that these plural LED elements 14 and LED collimators 15 (collimator unit) are arranged in a square shape.

In this example, an increase in the number of LED elements 14 that are light sources makes it possible to realize a brighter light source apparatus or a light source with a wider irradiation area. Incidentally, the number of rows of the LED elements 14 in the Z direction is not limited to two, and the further increase in its number makes it possible to obtain a light source apparatus that is brighter and/or has a wider irradiation area. Additionally, according to the above configuration, for example, realization of so-called local dimming etc. may become easy by controlling light emission amounts of plural LED elements 14 arranged.

1-13: Light Source Apparatus—Direct Optical System

Additionally, the light source apparatus of the present invention is not limited to an apparatus having a lighting optical system that uses the light guide described above in various ways, but is utilizable even in a directly irradiated optical system. Namely, as its example, FIGS. 14 and 15 show an example of a light source apparatus that uses, without using a light guide, light condensed by an LED collimator and emitted from an LED element.

FIG. 14 is a perspective view showing an internal configuration of another example, which applies the light source apparatus according to one embodiment, and a developed perspective view thereof. FIGS. 14(a) and 14(b) show a perspective view of the entire configuration of a light source apparatus, which has a plurality of (3×2=6 in this example) LED elements 14 (14a, 14b, 14c, 14d, 14e, 14f), an LED collimator 15, a light distribution (orientation) control plate 16b, and a polarization conversion element 21 and is unitized with them, and shows its developed view. Incidentally, in FIG. 14, the Z direction (longitudinal direction in the drawing) corresponds to a direction of an optical axis, and corresponds to a direction in which emitted light is incident on a display element without passing through a light guide. The X direction corresponds to a direction in which the three LED elements 14 are arranged and a plurality of parts of the polarization conversion element 21 are arranged. The Y direction corresponds to a direction in which the two LED elements 14 are arranged and the parts of the polarization conversion element 21 extend.

As is clear from FIG. 14, a plurality of LED collimators 15 are connected and formed integrally similarly to the above. The LED collimator 15 and the LED substrate 12 on which the LED elements 14 (14a to 14f) are mounted are fixed by: positioning pins 136a, 136b formed on the heat sink (radiation fin) 13; positioning holes (not shown) formed in the LED collimator 15; and positioning holes 126a, 126b formed in the LED substrate 12, thereby being positioned (located) in the X and Y directions. Simultaneously therewith, mounting portions 158a, 158b of the LED collimator 15 and the LED substrate 12 are bumped on each other, thereby being positioned in the Z direction.

The polarization conversion element 21 is accommodated in a polarization-conversion-element holder 60 and is positioned by a step portion 601 formed inside the polarization-conversion-element holder 60. Also, the polarization conversion element 21 is simultaneously positioned by fitting convex parts 156a, 156b formed on the LED collimator 15 and a concave part (not shown) formed on a back surface of the polarization-conversion-element holder 60. Further, an emission side of the polarization-conversion-element holder 60 is preferably provided with a light shielding portion 608 that shields a part of the light flux reflected by the PBS film 211 (FIG. 4) of the polarization conversion element 21. Since an optical path becomes relatively long due to a structure of the element, the reflected light flux has a tendency to be further spread with respect to the light flux transmitted through the PBS film 211, so that the part of the light flux may be desirably shielded for achieving uniformity of luminance.

Then, bolts 90a, 90b are passed through holes (not shown) formed in the light distribution control plate 16b, and the polarization-conversion-element holder 60, LED collimator 15, and LED substrate 12 are fixed on the heat sink 13 together, so that a light source unit 71 which is the unitized light source apparatus is completed. Incidentally, in the light source unit 71, the positioning of the LED substrate 12 and the LED collimator 15 that require the most relative positioning accuracy is performed by fitting the positioning pins 136a, 136b and the positioning holes (not shown) and by bumping the mounting portions 158a, 158b of the LED collimator and the LED substrate 12 on one another, so that the above positioning can be performed with high accuracy. Incidentally, it is apparent to those skilled in the art that the unitized configuration shown in FIG. 14 is applicable also to the light source which uses the light guide(s) as shown in FIGS. 1 to 13 before FIG. 14.

Incidentally, in the above-described light source apparatus, as is clear from the drawings, the light beams radiated from the LED element 14 (14a to 14f) as a light source(s): are condensed by the LED collimator 15 to become parallel light; are converted into predetermined S-polarized light or P-polarized light by the polarization conversion element 21; and then are emitted from the light distribution control plate 16b. Incidentally, if its polarization conversion is unnecessary, the polarization conversion element 21 may not be provided of course.

1-14: Light Source Apparatus—Direct Optical System (2)

FIG. 15 is a perspective view showing an overall overview of another example which applies the light source apparatus of FIG. 14, and shows a developed perspective view thereof. FIG. 15 shows, as one example, a form in which the above-described light source apparatus is used as a light source of an image display apparatus 30 constituting the HUD apparatus shown also in the above example. As is clear from FIG. 15(a), the image display apparatus 30 is housed in a light-source-apparatus case 11 with its heat sink (radiation fin) 13 exposed outside. Additionally, as is apparent from FIG. 15(b), in the light-source-apparatus case 11, a liquid crystal display element 50 is disposed above the light distribution control plate 16b constituting the light source apparatus. The light beams radiated from the plural LED elements as a light source(s) and condensed are converted into S-polarized light or P-polarized light as necessary, and are then irradiated to the liquid crystal display element 50 upward from the light distribution control plate 16b, so that image light of the image display apparatus 30 is obtained. Incidentally, in order to implement precise light distribution, an emission surface of the above-described light distribution control plate 16b is a surface close to a substantially cylindrical surface. However, in order to realize more precise light distribution, as shown in FIG. 15(b), a central portion of a ridge line portion thereof is set to a slightly concave shape and a peripheral portion thereof is set to a convex shape. Namely, at least one surface of the light distribution control plate 16b adopts a so-called aspherical surface or a free-form surface shape, thereby being capable of realizing more precise light distribution. Incidentally, FIG. 15(b) shows a structure in which the number of light distribution control plates is one. However, the present invention is not limited to this, and may be provided with a plurality of light distribution control plates, thereby being capable of realizing more precise and complicated light distribution.

Incidentally, such a configuration makes it possible to arrange many LED elements as a light source(s) and to realize a brighter light source apparatus accordingly. Additionally, a light source apparatus may further enlarge a light emission surface and have a liquid emission surface with a wide display area, or is suitable for combination and use with a liquid crystal display panel that has a wide display area. Further, according to such a configuration, the light emission surface is divided into a plurality of display areas corresponding to one or a plurality of LED elements, and the light source apparatus realizes so-called local dimming by independently controlling etc. a light emitting output (lighting) of the LED element(s), which makes further it possible to increase contrast of a displayed image(s) and reduce power consumption.

Then, in addition to the local dimming by the individual control of the LEDs described above, a control board (not shown) can perform control in combination with the liquid crystal display panel together with the individual control of the LED elements, thereby makes it possible to realize a more suitable light source apparatus with low power consumption and further realize an on-vehicle headlight apparatus that uses the same.

Further, the liquid crystal display panel has been described in the foregoing so as to have excellent transmittance with respect to S-polarized waves. However, even when transmittance with respect to P-polarized waves is excellent, it is apparent to those skilled in the art that a polarization conversion element, which has almost the same configuration as described above, can obtain almost the same action and effect.

Embodiment 2

Figure 22:
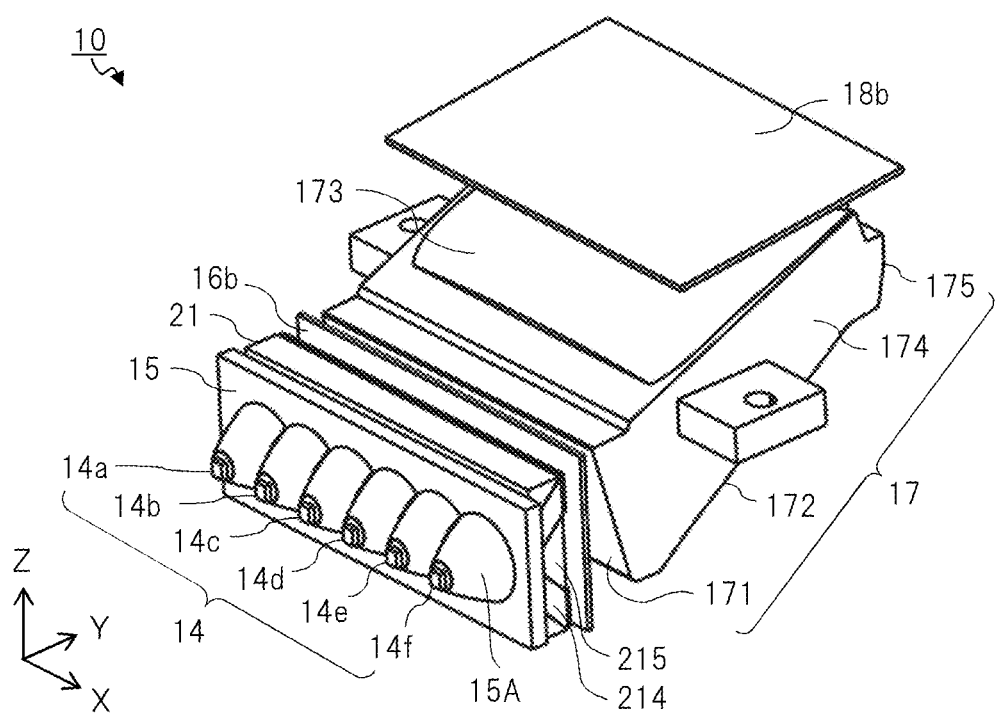
FIG. 22 is a perspective view showing one example of an internal configuration of the light source apparatus.
Figure 23:
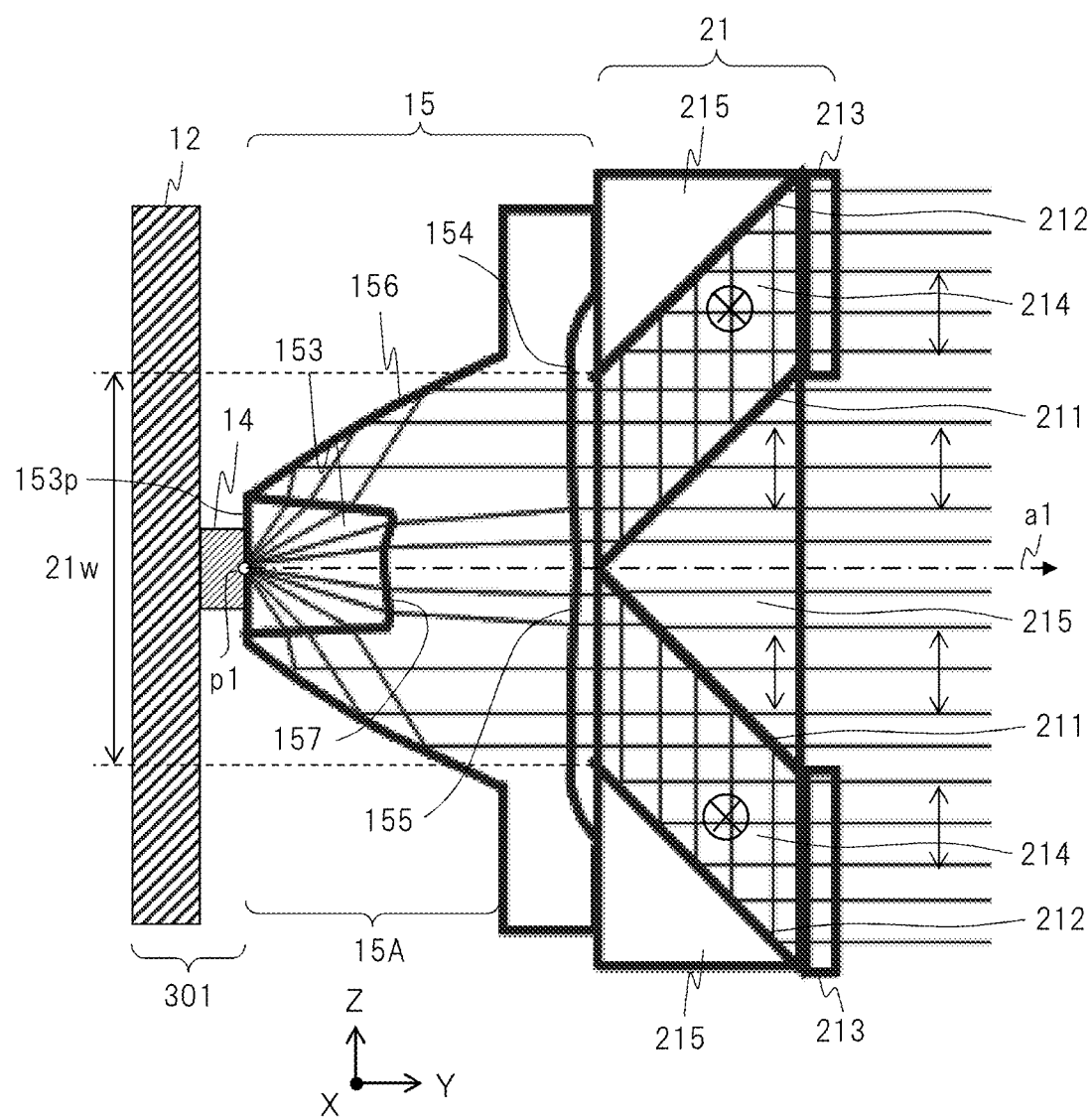
FIG. 23 is a partially enlarged sectional view showing configurations of a light source unit, a LED collimator, and a polarization conversion element, etc. in the light source apparatus, and showing light distribution thereof.

A light source apparatus etc. according to another embodiment (referred to as Embodiment 2) of the present invention will be described with reference to FIGS. 16 to 47. A light source apparatus of Embodiment 2 has a specific configuration of a light source(s) and includes the following configuration points. The light source apparatus of Embodiment 2 has a specific arrangement (layout) configuration of the polarization conversion element, the arrangement configuration being different from that of Embodiment 1 (FIGS. 22 and 23, etc. described later). This polarization conversion element is arranged in a state of being rotated 90 degrees in an X-Z plane with respect to the polarization conversion element 21 of Embodiment 1. Namely, in this polarization conversion element, an extension direction of parts like a PBS film etc. is the X direction (direction corresponding to a transverse direction of a display area), which is one of the horizontal directions, and an arrangement direction of a plurality of parts is the Z direction which is vertical. A plurality of parts configuring the polarization conversion element are arranged at symmetrical positions in the Z direction with respect to the optical axis. With respect to the configuration of the polarization conversion element, a plurality of LED elements and collimator elements are similarly arranged in the X direction. The light source apparatus of Embodiment 2 has a configuration of performing light distribution control by a light guide etc. in addition to the above-described specific configuration of the light source (LED element, LED collimator, and polarization conversion element, etc.). The configuration of these combinations realizes predetermined light distribution control characteristics of the light source apparatus.

2-1: HUD Apparatus

Figure 16:
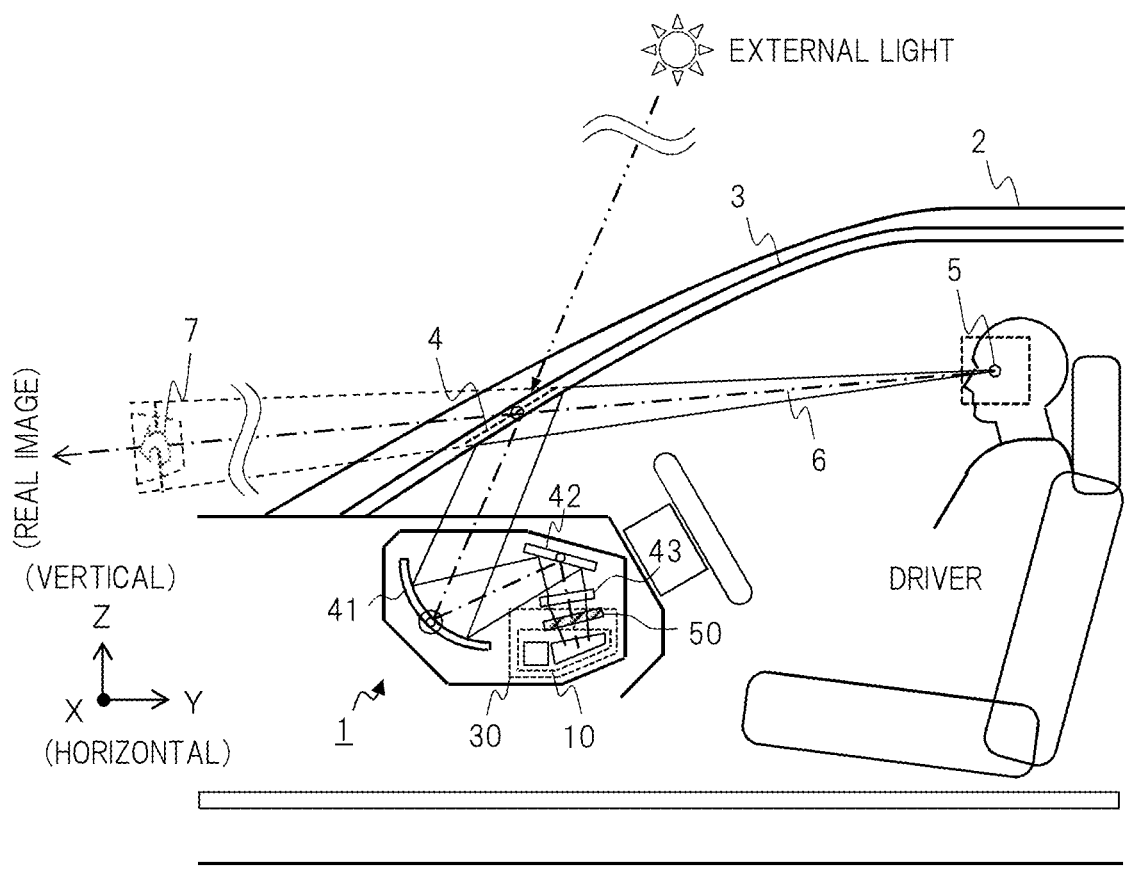
FIG. 16 is a view showing a schematic configuration at a time of viewing, from sideways, vicinity of a driver's seat in a vehicle that mounts a HUD apparatus, the HUS apparatus being configured by including a light source apparatus and an image display apparatus of Embodiment 2 of the present invention.

FIG. 16 shows a schematic configuration obtained by viewing, from transversely, vicinity of a driver's seat of a vehicle 2 under a conceptual configuration of the on-vehicle HUD apparatus 1 that is configured by utilization of the image display apparatus 30 having the light source apparatus 10 of Embodiment 2, the vehicle 2 being equipped with a HUD apparatus 1. It also shows a state of viewing: a real image (e.g., landscape of road etc.) transmitted through a display area 4 of a front windshield 3 from eyes 5 (also referred to as a viewpoint) of a driver sitting on the driver's seat; and a virtual image 7 (e.g., arrow image) overlapping with and displayed on the real image by the HUD apparatus 1. In FIG. 16, an X direction, a Y direction, and a Z direction are shown as directions for explanation. The X direction (direction perpendicular to the drawing) corresponds to a first horizontal direction, a right-left direction of the vehicle 2, and a transverse direction of the display area 4. The Y direction (transverse direction in the drawing) corresponds to a second horizontal direction, a front-back direction of the vehicle 2, and a front-back direction of the display area 4. The Z direction (longitudinal direction in the drawing) corresponds to a vertical direction, an up-down direction of the vehicle 2, and a longitudinal direction of the display area 4.

The windshield 3 is made of glass etc. and has a light-transmittable visible region. The visible region is a region where an image can be visually recognized when the image are viewed from the driver. The display area 4 of the HUD apparatus 1 is formed within the visible region of the windshield 3. The display area 4 is an area where image light is projected by the HUD apparatus 1, and corresponds to an area where the virtual image 7 can be displayed.

The HUD apparatus 1 is mounted on (in) the vehicle 2 and is provided as a part of an on-vehicle system, for example. The HUD apparatus 1 is installed on a part of a dashboard of the vehicle 2, for example. The HUD apparatus 1 is configured including an image display apparatus 30 and an optical system. In the HUD apparatus 1, component parts of the image display apparatus 30 and component parts of the optical system are arranged and accommodated in an exterior case that is a casing. A part of the casing, e.g., a part of its upper surface has an opening. The opening is covered with an antiglare plate (glare trap) etc. The component parts of the optical system include reflection mirrors 41, 42, and a refraction element 43, etc. as described later.

The image display apparatus 30 is configured including a light source apparatus (light source module) 10 and a liquid crystal display element 50 that is a display element. The image display apparatus 30 is a projector, which generates and emits image light based on image data and performs projection display onto the windshield 3 (or a not-shown combiner etc.). The combiner is a dedicated display board provided immediately before the windshield 3. The light source apparatus 10 includes an LED element and a lighting optical system as shown also in Embodiment 1, and generates and irradiates lighting light for the liquid crystal display element 50.

The liquid crystal display element 50 generates image light based on a display signal(s) and lighting light from the light source apparatus 10, and emits the image light to an optical system (particularly described as an adjustment optical system). The adjustment optical system has, as optical components, a refraction element 43 and reflection mirrors 42, 41. These optical components realize a function (display distance adjustment mechanism) of adjusting a projection position(s) and a display distance(s), etc. of the image light with respect to the windshield 3. The HUD apparatus 1 causes the image light emitted from the liquid crystal display element 50 of the image display apparatus 30 to be reflected and enlarged by the reflection mirrors 41, 42 via optical elements like the refraction element 43 etc., and projects it onto a part of the region of the windshield 3.

The refraction element 43 is configured by a lens etc. that refract the image light. The refraction element 43 may be connected to a driver such as a motor for changing (varying) an arrangement angle etc. so that directions of an optical axis and the refraction are adjustable. The reflection mirror 42 is, e.g., a plane mirror, and operates so that the light emitted, e.g., roughly in the vertical direction (Z direction) from the liquid crystal display element 50 is reflected toward the reflection mirror 41 which is placed roughly in front (left in the Y direction) thereof. The reflection mirror 41 is, e.g., a concave mirror, and operates so that the image light incident roughly from the Y direction is reflected toward the windshield 3 that is placed roughly above the vertical direction (Z direction). The reflection mirrors 41, 42 may be connected to a driver such as a motor for adjusting an arrangement angle etc. so that the direction of the optical axis is adjustable.

The image light emitted from the HUD apparatus 1 (reflection mirror 42) is substantially (roughly) reflected rightward in the Y direction by a surface of a partial region (display area 4) of the windshield 3, is incident on the driver's eyes 5, and forms an image on the driver's retina. Consequently, the driver views the image light, thereby visually recognizing, as a virtual image 7, a video image or an image overlapping with and displayed on the transmitted real image in the display area 4 of the windshield 3 that is placed in front of driver's eyesight.

An optical axis of the image light, and a sightline 6 in viewing the virtual image 7 from the driver's eyes 5 are indicated by dash-single-dot lines. Additionally, indicated by a dash-double-dot line is an optical axis of external light such as sunlight that is incident on the windshield 3 and an inside of the HUD apparatus 1 from outside the vehicle 2, e.g., from above.

2-2: HUD Apparatus—Functional Block

Figure 17:
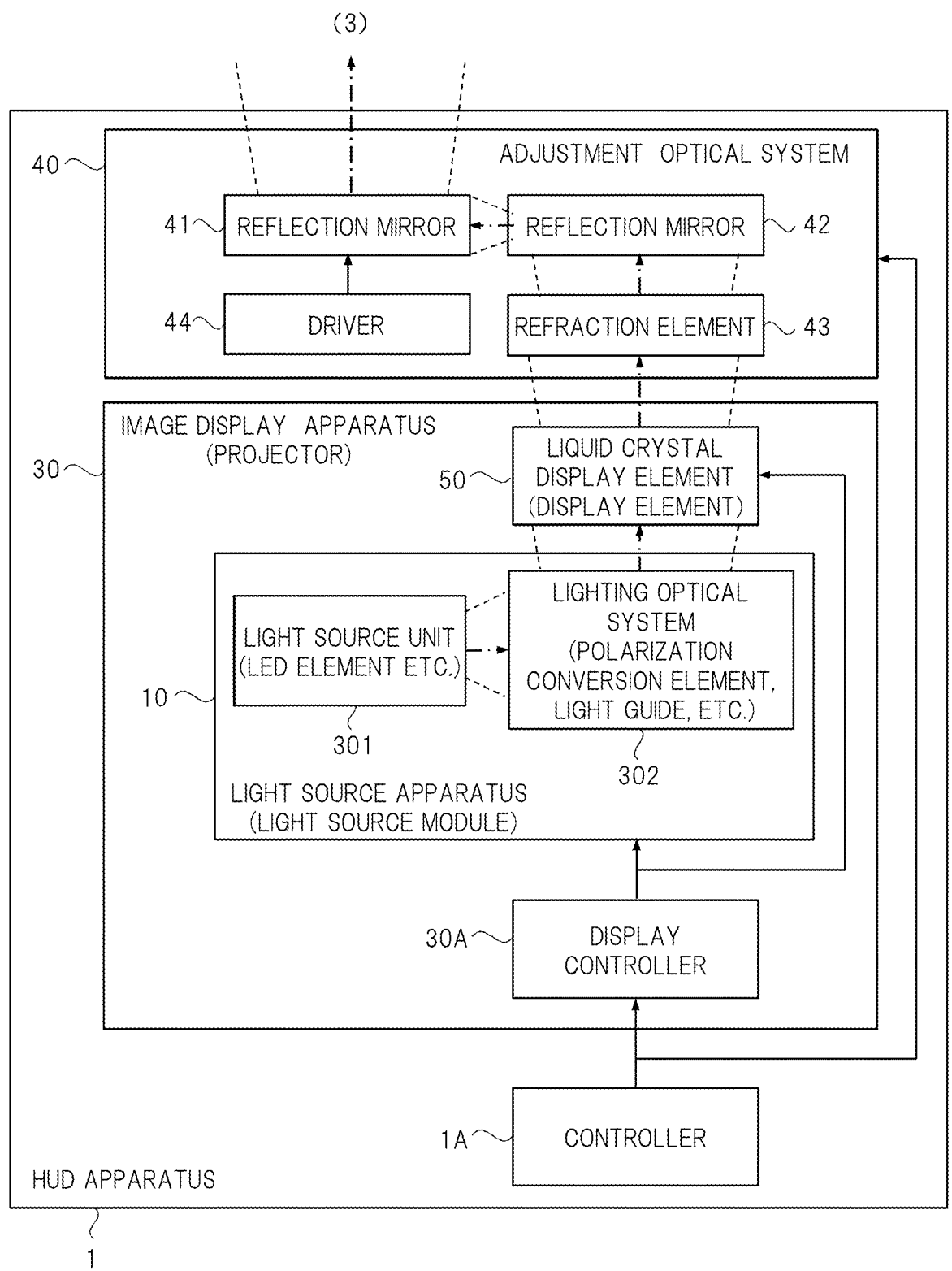
FIG. 17 is a view showing a functional block configuration of the HUD apparatus.

FIG. 17 shows a functional block configuration inside the HUD apparatus 1 of FIG. 16. The HUD apparatus 1 includes a controller 1A, an image display apparatus 30, and an adjustment optical system 40. The image display apparatus 30 includes a display controller 30A, a light source apparatus 10, and a liquid crystal display element 50 that is a display element. The liquid crystal display element 50 is a transmissive or reflective type liquid crystal display.

The light source apparatus 10 includes the light source unit 301 and the lighting optical system 302 as described above. The light source unit 301 is configured by the LED element 14 etc. as described in Embodiment 1. The lighting optical system 302 is configured by the LED collimator 15, the polarization conversion element 21, and the light guide 17, etc. as described in Embodiment 1. As described above, the polarization conversion element 21 is composed of a translucent member (prism), a PBS film, and a phase plate, etc. The adjustment optical system 40 is configured by the refraction element 43 and the reflection mirrors 42, 41, etc. Connected to at least the reflection mirror 43 is the driver 44 for variably adjusting an arrangement angle.

When being connected to an on-vehicle system, the HUD apparatus 1 is operable according to control from a not-shown engine control unit (ECU) etc. The controller 1A of the HUD apparatus 1 controls the display of the virtual image onto the display area 4 by controlling a display controller 30A of the image display apparatus 30, the driver 44 of the adjustment optical system 40, and the like. The display controller 31 generates image data for displaying the virtual image according to the control from the controller 1A, and gives a drive control signal and a display signal to the light source apparatus 10 and the liquid crystal display element 50. The light source apparatus 10 generates and emits lighting light by controlling on/off etc. of light emission of the LED element 14 according to the drive control signal. The light generated from the light source unit 301 is condensed and uniformized by the lighting optical system 302, and is irradiated onto a surface of the liquid crystal display element 50 as planar lighting light. The liquid crystal display element 50 includes a display drive circuit, and generates and emits image light according to the display signal and lighting light. In the lighting optical system 302, light distribution control with predetermined characteristics for generating lighting light suitable for the liquid crystal display element 50 and the HUD apparatus 1 is performed by the optical components.

Incidentally, as a display element, not only the liquid crystal display element 50 but also another kind of element is applicable. In that case, characteristics which include the light distribution control of the adjustment optical system 40 and the light source apparatus 10 are mounted so as to match with characteristics of the display element.

2-3: Comparative Example, Problem Etc.

Figure 18:
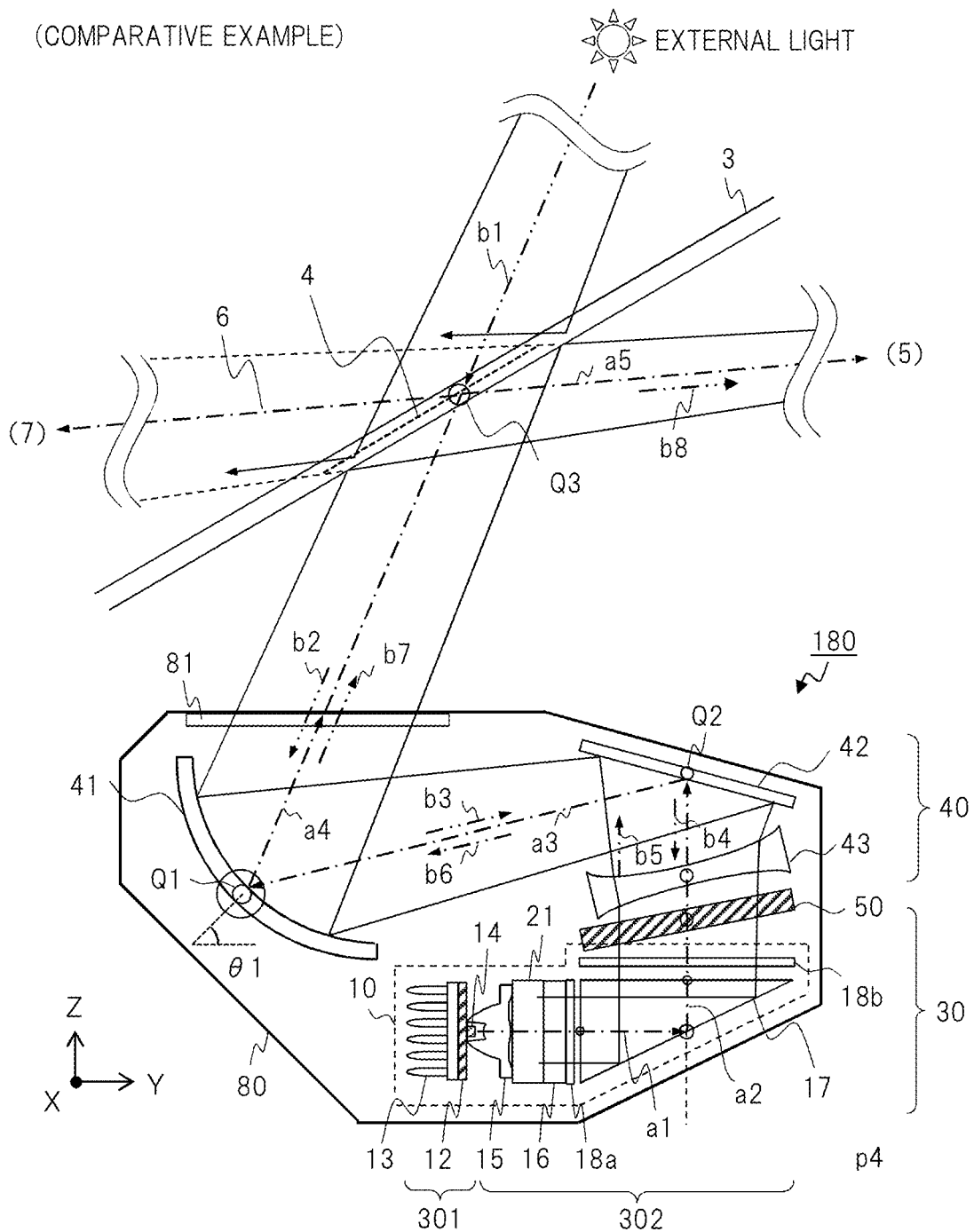
FIG. 18 is an explanatory drawing showing a configurational outline of a HUD apparatus of a comparative example, and showing its behavior and problem(s), etc. when external light is incident thereon.

FIG. 18 shows an explanatory drawing about a schematic configuration of a HUD apparatus 180 of a comparative example with respect to Embodiment 2, and about a problem(s) etc. due to an influence(s) of external light. A component arrangement outline of the HUD apparatus 180 of FIG. 18 is the same as that of FIG. 16. The HUD apparatus 180 of the comparative example has almost the same components as those of the above-described example. Arranged in the light source apparatus 180 in order from a front (left in the drawing) to a back (right in the drawing) in the Y direction are the heat sink 13, LED substrate 12, LED element 14, LED collimator 15, polarization conversion element 21, optical composite block 16, diffuser 18a, and light guide 17. A light emission axis of the LED element 14 is the Y direction, and is indicated by an optical axis a1. The light guide 17 has a columnar shape with a triangular cross-section. The diffuser 18b, liquid crystal display element 50, refraction element 43, and reflection mirror 42 are arranged in order upward in the Z direction from the light guide 17. The reflection mirror 41 is disposed frontward (leftward) in the Y direction from the reflection mirror 42. An opening 81 of a casing 80 is above the reflection mirror 41 in the Z direction.

A light emission axis extending in the Y direction from a light emission point of the LED element 14 is indicated by the optical axis a1. The optical axis a1 is converted into an optical axis a2 in the Z direction by a reflection part of the light guide 17. The incidence surface and reflection surface of the light guide 17 are flat (plane). The emission surface of the light guide 17 and the diffuser 18b are arranged on a horizontal X-Y plane. In the Z direction and above the emission surface of the light guide 17 and the diffuser 18b, a panel surface of the liquid crystal display element 50 is disposed on the horizontal X-Y plane. The refraction element 43 is disposed above the liquid crystal display element 50 and on the optical axis a2.

On the optical axis a2, image light that is the emitted light from the liquid crystal display element 50 is incident on a point Q2 of the reflection mirror 42 via the refraction element 43. The optical axis a2 becomes an optical axis a3 pointing roughly leftward in the Y direction by the reflection at the point Q2 of the reflection mirror 42. The optical axis a3 is incident on the point Q1 of the reflection mirror 41. The optical axis a3 becomes an optical axis α4 pointing roughly (substantially) upward in the Z direction by the reflection at the point Q1 of the reflection mirror 41. The optical axis a4 is incident on a point Q3 of the display area 4 of the windshield 3, is reflected thereat, becomes an optical axis a5 pointing rightward in the Y direction, and is incident on the driver's eyes 5.

An angle of the reflection mirror 41 is indicated by an angle θ1. This angle θ1 corresponds to, e.g., a rotation angle (in this example, an angle from the horizontal plane in which 0 degree is regarded as a reference) centered about an X-directional rotation axis, and is changeable (variable) through the driver 44.

If it is desired to reduce a size of the HUD apparatus 180 in a height direction (Z direction), the apparatus is formed, similarly to this comparative example, so that the optical axis is bent in the Y and Z directions by using the light guide 17 and the component parts such as the heat sink 13, LED substrate 12, LED collimator 15, and polarization conversion element 21 are arranged in the Y direction. Consequently, the size in the Z direction can be kept small, but the size in the Y direction becomes relatively large. Particularly, when the plural LED elements 14 are used to increase an amount of light or when the large heat sink 13 etc. are used to increase radiation (heat dissipation) performance, the size in the Y direction increases. This brings disadvantageousness for downsizing (size reduction) of the HUD apparatus 1.

When it is desired to reduce the size of the HUD apparatus 1 in a depth direction (Y direction), for example, the apparatus is formed, as in the above-described example (FIG. 14 etc.), so as to have the optical axis in the Z direction and a linear optical system, and the respective component parts are arranged in the Z direction. Consequently, the size in the Y direction can be kept small, but the size in the Z direction becomes relatively large.

Since the HUD apparatus is installed in, for example, a limited space such as a dashboard of the vehicle, the apparatus needs a smaller size and higher efficiency. The image display apparatus 30 and the light source apparatus 10 are desirably realized as smaller and more efficient modules so as to be suitable for mounting a HUD apparatus etc.

Further, they need generation etc. of image light suitable for a virtual image(s) while the HUD apparatus is downsized. In order to generate the suitable image light, suitable lighting light from the light source apparatus 10 is required. Additionally, they also need cooling performance etc. of the light source unit. The light source apparatus 10 needs to generate suitable planar lighting light that matches characteristics of the HUD apparatus 180 and the liquid crystal display element 50, etc. The lighting light is required to have, for example, a predetermined amount of light, a surface size, uniformity of an in-plane light intensity distribution, and the like. The apparatus is also required to reduce its size while ensuring these characteristics.

The image light from the image display apparatus 30 is subjected to action such as refraction, reflection, or enlargement via the adjustment optical system 40, is projected onto the display area 4 of the windshield 3, and is incident on the driver's eyes 5 at a predetermined convergence angle 5. When viewed from the driver, a virtual image 7 corresponding to the predetermined convergence angle is observed through the display area 4. The predetermined convergence angle varies depending on a HUD optical system, but is generally about 4 to 10° in the horizontal direction (horizontal light) and about 1.5 to 5° in the vertical direction (vertical light) with respect to the driver. In order to obtain a predetermined convergence angle suitable as image light of the HUD, the image light requires being sufficiently expanded before incidence on the reflection mirror 41. Particularly, in order to realize an angle of 4° to 10° as the convergence angle of horizontal light, the image light requires being enlarged (expanded) approximately 200 mm or more. For this expansion, required are measures such as enlargement of the emitted light by the light source apparatus 10, and enlargement of the emitted light by the refraction element 43 or/and the reflection mirror 42 of the adjustment optical system 40. Particularly, in order to enlarge the emitted light by the refraction element 43, its surface shape needs to be made a concave-shaped curved surface (concave surface).

Additionally, in a configuration including an optical system of the comparative example of FIG. 18, the Z-directional optical axis a2 of the emitted light from the light source apparatus 10 (light guide 17) and the axes (in normal direction) of the liquid crystal display element 50 and the refraction element 43 are each arranged at a predetermined angle. In such a configuration, a problem due to an influence of external light arises as follows. In FIG. 18, optical paths when external light is incident on the HUD apparatus 180 are indicated by optical axes b1 to b4 etc. that have dash-double-dot lines. The optical axes b1 to b4 travel in directions reverse to the optical paths (optical axes α1 to a5) of the emission of the image light. Incidentally, since the optical axis b2 etc. overlap with the optical axis a4 etc., each of them is illustrated with a slight shift.

When external light is incident on an inside of the HUD apparatus 180, the external light is incident on the refraction element 43 and the liquid crystal display element 50 through the reflection mirrors 41, 42 of the adjustment optical system 40. Further, the exterior light is reflected by the refraction element 43 etc. and returns in a reverse direction of the optical path, and a part of the exterior light travels outside the HUD apparatus 180. Then, the external light may be reflected by the windshield 3 and be incident on the driver's eyes 5. Consequently, the driver visually recognizes the virtual image 7 in a state where the external light is reflected as noise with respect to the image light that forms the virtual image 7 in the display area 4. Therefore, the driver may have difficulty in visually recognizing the virtual image 7. Namely, display quality of the virtual image 7 is degraded.

First, an optical axis b1 of external light from above the vehicle 2 is incident on the point Q3 in the display area 4 of the windshield 3. A part of the exterior light is reflected etc. by the surface of the windshield 3. An optical axis b2 of the external light that has been incident onto the inside of the windshield 3 is incident on the point Q1 of the reflection mirror 41 through the opening 81. The optical axis b3 of the external light reflected at the point Q1 is incident on the point Q2 of the reflection mirror 42. An optical axis b4 of the external light reflected at the point Q2 is incident on the refraction element 43 and the liquid crystal display element 50. The external light reflected by the refraction element 43 etc. returns in a direction reverse to a traveling direction at its incident time similarly to the optical axes b5, b6, b7. The exterior light travels outside from inside the HUD apparatus 180, is reflected at the point Q3 in the display area 4 of the windshield 3, and is incident on the driver's eye 5 as indicated by the optical axis b8.

In the light source apparatus 10 and the adjustment optical system 40 of the HUD apparatus 180, light distribution control that realizes a predetermined convergence angle is necessary for obtaining image light suitable to form the virtual image 7 in the suitable display area 4. For the light distribution control, for example, a configuration as shown in FIG. 18 is adopted. In this configuration, as described above, an external light component (may be described as return external light) that returns outside the HUD apparatus 180 occurs due to the reflection etc. of external light that is incident on the inside of the HUD apparatus 180. Consequently, the display quality of the virtual image 7 is deteriorated when the return external light is incident on the driver's eyes 5. Namely, incident external light is excluded to some extent by reflection and absorption, etc. through the functions of the window shield 3 and the opening 81 of the HUD apparatus 1 by tilting the refraction element 43 and the liquid crystal display element 50 to some extent, but cannot be completely eliminated. This is because since the surface of the refraction element 43 is concave, a part of the reflected light travels in a direction reverse to the incidence optical path.

Figure 19:
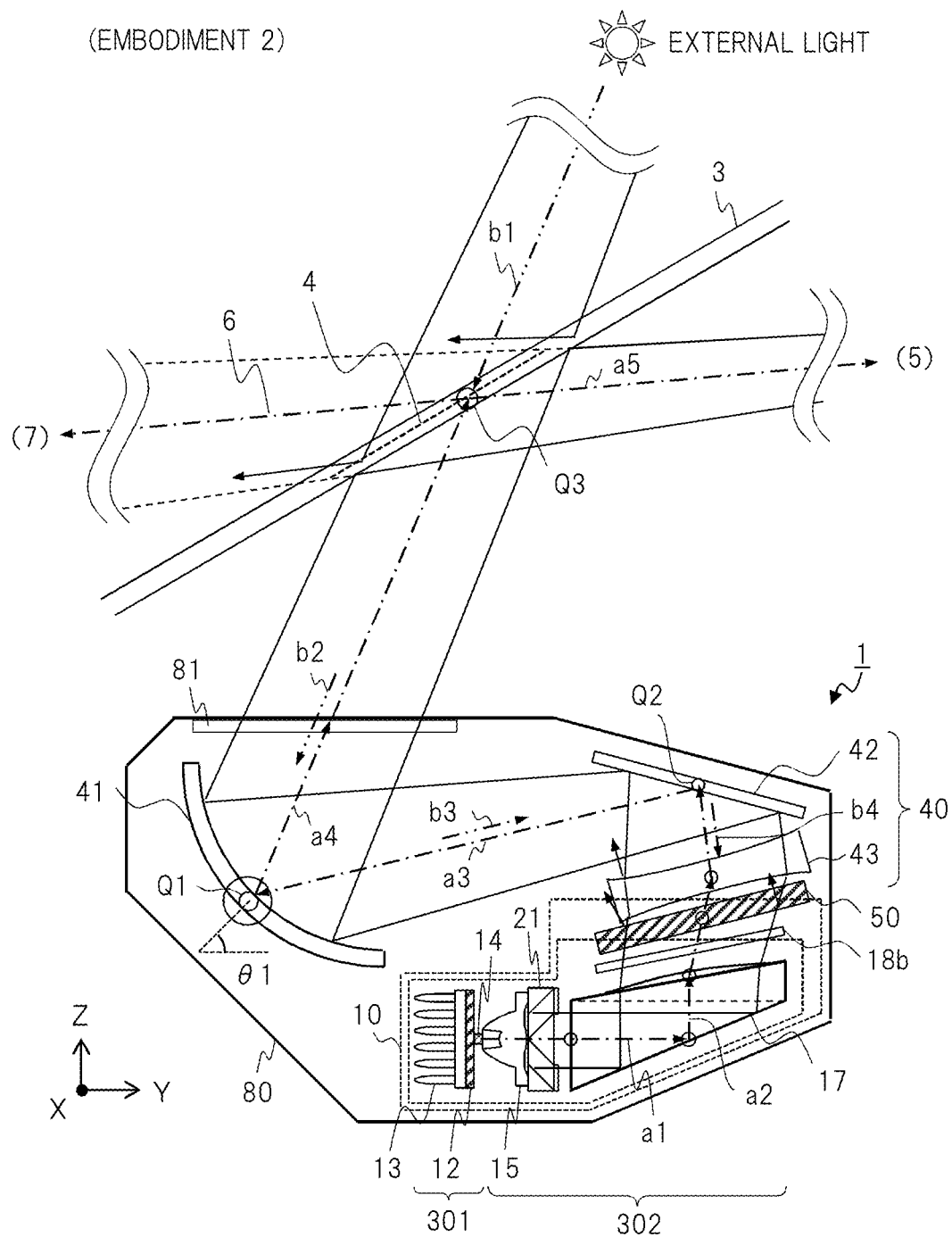
FIG. 19 is an explanatory drawing showing a configurational outline of a HUD apparatus of Embodiment 2, and showing its behavior etc. when external light is incident thereon.

Therefore, the light source apparatus etc. of Embodiment 2 provides a function capable of preventing or reducing the above-described influence due to the external light in order to enhance (improve) the display quality of the HUD. In the light source apparatus etc. of Embodiment 2, the direction of the optical axis with respect to the liquid crystal display element 50 and the refraction element 43, etc. is different from that in the configuration of the comparative example by devising structures of the light source unit 301 and the lighting optical system 302 (FIG. 19 etc. described later). According to some examinations, the inventors have found that it is effective that a normal inclination angle(s) of an effective surface (surface which the image light is transmitted through or reflected at) of each of the refraction element 43 etc. is at least 10° or more with respect to the optical axes of the lighting light and the image light. This contrivance brings realization of predetermined light distribution control characteristics so as to satisfy both of generation of the suitable image light and prevention of the return external light in the light source apparatus etc. of Embodiment 2. The lighting light that has been generated based on the predetermined light distribution control in the light source apparatus is supplied to the liquid crystal display element. Then, the image light having predetermined suitable characteristics for the display area of the HUD apparatus is generated and emitted. The image light is projected onto the display area of the windshield via the adjustment optical system including the refraction element 43 etc. Here, since the predetermined light distribution control is performed by the light source apparatus as described above, a distribution of refraction angles in the refraction element 43 does not need to be made as wide as that of the comparative example. Namely, a surface shape of the refraction element 43 does not need to be steeper in a concave surface than that in the comparative example. In the light source apparatus etc. of Embodiment 2 by such a configuration, when the external light is incident on the inside of the HUD apparatus, inclining the refraction element 43 and the liquid crystal display element 50 to some extent causes the exterior light to hardly return outside the HUD apparatus, i.e., the return external light to hardly occur even if the exterior light is reflected at the adjustment optical system or/and the liquid crystal display element. Therefore, prevented or reduced is the deterioration in the display quality of the virtual image by the return external light being incident on the driver's eyes. Namely, Embodiment 2 can obtain an effect of: preventing or reducing the return external light while securing the suitable image light; and suppressing a reduction in the visibility of the virtual image due to the influence of the external light.

Incidentally, in the comparative example, if the optical element etc. are installed so that the external light is deflected by the adjustment optical system 40 in the HUD apparatus 180 and is not reflected to the display area 4 in order to reduce the influence due to the external light, such installation may affect the characteristics of the image light. Therefore, the characteristics of the light distribution control need to be devised and controlled by the entirety of the light source apparatus 10, liquid crystal display element 50, and refraction element 43, etc. so as to ensure predetermined suitable image light characteristics while the influence due to the return external light is reduced.

By adopting the configuration in which the normal inclination angle of Embodiment 2 is provided, a direction of the light reflected by the refraction element 43 etc. out of the external light that regresses through the optical path of the image light and is incident is shifted with an angle (e.g., 20°) which is twice more than at least the above-described normal inclination angle (e.g., 10°) with respect to the incident light. Consequently, it can be prevented or reduced that the reflected light: travels outward from the HUD apparatus 1 (opening 81); is again reflected as return external light by the windshield 3; and is incident on the driver's eyes 5. However, in order to satisfy a condition (s) for avoiding such external light, the structure of the adjustment optical system 40 like the refraction element 43 and the reflection mirrors 41, 42, etc. is naturally limited.

Due to the above limitation, suitable image light (light sufficiently enlarged for the display area 4) cannot be realized only by a measure (s) for magnifying the light through the adjustment optical system 40 like the refraction element 43 etc. as described above. Therefore, in order to realize the suitable image light, it is necessary to devise a combination of a configuration in which emitted light is magnified by the adjustment optical system 40 and a configuration in which lighting light is expanded by the light source apparatus 10. As a result of various examinations, the inventors have found that, as a configuration capable of simultaneously realizing downsizing, thinning, and high efficiency of the light source apparatus and enlargement control of the lighting light, a configuration in which at least one of the incidence or emission surface of the light guide has a free-form surface shape and the light distribution control is performed is effective.

2-4: HUD Apparatus—Light Distribution Control

FIG. 19 shows a schematic configuration and light distribution control, etc. of the HUD apparatus 1 including the light source apparatus 10 and the image display apparatus 30 according to Embodiment 2 with respect to the comparative example of FIG. 18. It also shows optical paths etc. when external light is incident on the inside of the HUD apparatus 1. The light source apparatus 10 and the image display apparatus 30 of Embodiment 2 have light distribution control characteristics different from those of the comparative example. Incidentally, FIG. 19 etc. are schematic configurations, and mounting sizes etc. are not limited to those in FIG. 19 etc.

In FIG. 19, the light source unit 301 includes the plurality of LED elements 14, and the LED substrate 12 on which a control circuit(s) is mounted. The heat sink 13 is provided on the back side of the LED substrate 12. The lighting optical system 302 includes: the LED collimator 15, polarization conversion element 21, and light guide 17 which are arranged in the Y direction; the diffuser 18b disposed in the Z direction; and the like. The LED collimator 15 condenses the light beams of the Y-directional optical axis a1 from the LED element 14 and converts them into parallel light. The polarization conversion element 21 optically converts the incident light from the LED collimator 15 so as to polarize a light flux direction and widen (enlarge) a light flux width, and emits the converted light. The light guide 17 guides a direction of the Y-directional optical axis a1 from the LED element 14 so as to be converted to a direction of the Z-directional optical axis a2 that irradiates the liquid crystal display element 50. In Embodiment 2, the light guide 17 has a substantially trapezoidal columnar cross-section, and converts a light's direction from the Y direction (horizontal direction) to the Z direction (vertical direction). Specifically, the light emitted from the light guide 17 becomes an optical axis inclined at a predetermined angle with respect to the Z direction through the free-form surface shape of the emission surface (a slope having a predetermined angle with respect to the horizontal plane) of the light guide 17.

The optical axes of the lighting light and image light and the axes (normal inclination angles) of the liquid crystal display element 50 and refraction element 43 have predetermined angles (e.g., 10°) as described above. Lighting light that is the emitted light from the light guide 17 is incident on the liquid crystal display element 50 disposed on the horizontal plane (X-Y plane), thereby generating image light. The image light from the liquid crystal display element 50 has an optical axis inclined at a predetermined angle with respect to the Z direction. The image light is incident on the refraction element 43 disposed on the horizontal plane (X-Y plane). The image light is refracted through the refraction element 43, is then incident on the point Q2 of the reflection mirror 42, and is reflected thereat. The reflected light on the optical axis a3 is incident on the point Q1 of the reflection mirror 41 and is reflected thereat. The optical axis a4 of the reflected light is incident on the point Q3 in the display area 4 of the windshield 3 through the opening 81 and is reflected thereat. The optical axis a5 of the reflected light is incident on the driver's eyes 5.

For example, a driver 44 for changing an angle of the reflection mirror 42 is connected to the adjustment optical system 40. The driver 44 changes the angle θ1 (having a predetermined correspondence relationship with the optical axis direction) of the reflection mirror 41 by driving a motor etc. The driver 44 changes the angle θ1 of the reflection mirror 41 based on control by the controller 1A of the HUD apparatus 1 or on a driver's manual input operation. The change of the angle θ1 of the reflection mirror 41 brings a change of a projection direction (optical axis a4) of the image light from the HUD apparatus 1. Consequently, a projection position of the image light to the windshield 3 is changed, and a position of the display area 4 is changed. Therefore, the position of the display area 4 in the windshield 3 as viewed from the driver can be adjusted so as to move upward and downward in the Z direction, for example. The position of the display area 4 can be suitably adjusted in accordance with the position etc. of the driver's eyes 5.

In the light source apparatus 10 according to Embodiment 2, the LED substrate 12, LED collimator 15, and polarization conversion element 21, etc. are devised, thereby ensuring the light utilization efficiency, achieving the reduction in the size of the apparatus, and further reducing the size in the Y direction. In the light source apparatus 10 and the adjustment optical system 40 in the HUD apparatus 1 according to Embodiment 2, light distribution control that realizes a predetermined convergence angle is necessary for generating suitable image light. Then, the HUD apparatus 1 according to Embodiment 2 also requires predetermined light distribution control for a return-external-light prevention function. In order to realize light distribution control that satisfies both of them, the HUD apparatus 1 of Embodiment 2 adopts a configuration as shown in FIG. 19. In this configuration, the axis (normal inclination angle) of the optical element such as the refraction element 43 is different with a predetermined angle (10° or more) with respect to the optical axes of the lighting light from the light source apparatus 10 and the image light from the liquid crystal display element 50 (see angles φ2 etc. in FIG. 20 described later).

Optical paths in FIG. 19 when external light is incident on the HUD apparatus 1 are as follows. As in the comparative example, optical axes b1 to b4 at an incident time of external light are shown. An optical axis b4 indicates light that is reflected at the point Q2 of the reflection mirror 42 and is incident on the refraction element 43 etc. The optical axis b4 is different with an angle with respect to the axes (normal inclination angles) of the refraction element 43 and liquid crystal display element 50. Consequently, the light of the optical path b4 is reflected by the refraction element 43 and the liquid crystal display element 50, and the reflected light travels in a direction different from this of the optical axis b5 described above. Since the reflected external light strikes on the casing 80 and attenuates etc., its diffusion outward from the opening 81 is prevented or reduced. This brings prevention or reduction of the return external light being incident on the driver's eyes 5.

2-5: HUD Apparatus—Light Distribution Control (2)

Figure 20:
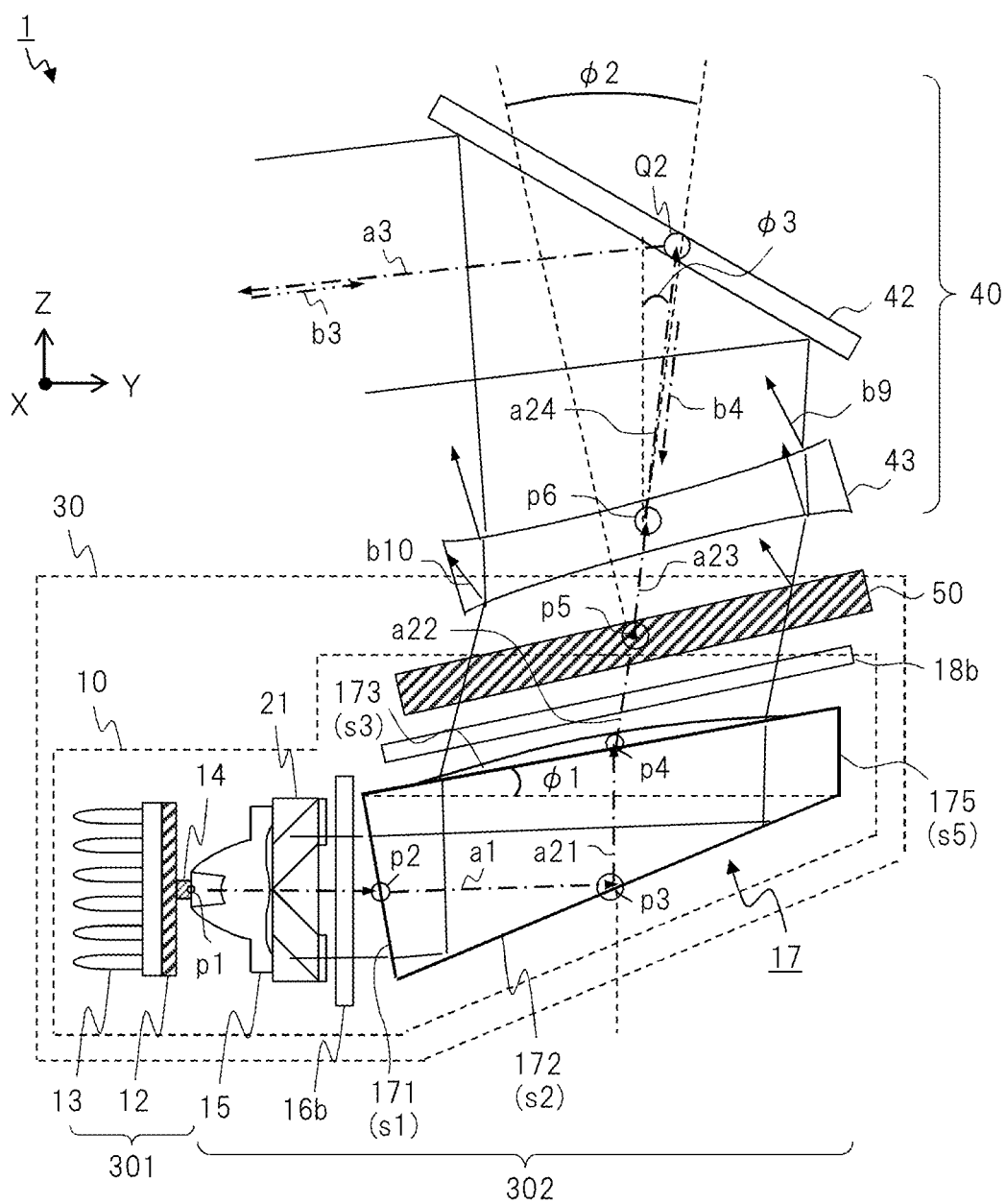
FIG. 20 is a view showing configurational outlines of the image display apparatus and an adjustment optical system, etc.

FIG. 20 shows a configuration outline of the light source apparatus 10, image display apparatus 30, and adjustment optical system 40, etc. of Embodiment 2. FIG. 20 shows a more detailed configuration example than that of FIG. 19. In FIG. 20, the light source apparatus 10 includes the heat sink 13, the LED substrate 12 (LED element 14), the LED collimator 15, the polarization conversion element 21, a light distribution control plate 16b, and the light guide 17, which are disposed in order from left to right in the Y direction. The plurality of LED elements 14 are arranged in the X direction of the LED substrate 14 (FIG. 22 etc.). A light emission surface of the LED element 14 is disposed so as to contact with and diffuse from a top surface of a concave part of the LED collimator 15. The plurality of collimator elements 15A are arranged in the X direction of the LED collimator 15 so as to be correspondingly associated with positions of the plural LED elements 14 (FIG. 22 etc.). In the polarization conversion element 21, an extension direction of a member such as a PBS film is set in the X direction, and an arrangement direction(s) of a plurality of members is set in the Z direction. With respect to the Y-directional optical axis a1 from the LED element 14, a plurality of members are arranged at positions and with shapes that are vertically symmetrical in the Z direction. An incidence part 171 (incidence surface s1) of the light guide 17 is disposed on the emission side of the light distribution control plate 16b.

Consequently, in a form of arranging parts such as the plural LED elements 14 in parallel in the X direction, the plural parts can be arranged compactly in the X direction and the X-directional size of the apparatus can be reduced, which can contribute to downsizing etc. Alternatively, more parts can be arranged within a predetermined size in the X direction of the apparatus and, for example, a larger amount of light can be ensured by arranging a large number of LED elements 14. Additionally, since a degree of freedom of arrangement of the X-directional parts is increased, it is easy to deal with various mountings of the HUD apparatus 1. For example, facilitated are the mountings according to sizes of various display areas 4.

The light guide 17 has a substantially trapezoidal shape in its illustrated Y-Z cross-section. The light guide 17 has an incidence part 171 (including an incidence surface s1), a reflection part 172 (including a reflection surface s2), an emission part 173 (including an emission surface s3), and a top part 175 (including a top surface s5). In this example, the incidence surface s1 of the incidence part 171 is disposed with a predetermined angle with respect to the vertical Z direction, but may be a plane in the Z direction. The reflection surface s2 of the reflection part 172 has, similarly to Embodiment 1, a configuration in which a plurality of reflection surfaces and connection surfaces are alternately repeated. On an opposite side of the incidence surface s1 in the Y direction, the light guide has a top surface s5. By providing the top part 175, the emission surface s3 of the emission part 173 is basically configured as a slope having a predetermined angle φ1 with respect to the horizontal Y direction. Further, the emission surface s3 has a free-form surface shape. This free-form surface shape is a shape for realizing predetermined light distribution control. Incidentally, although the free-form surface shape of the emission surface s3 is shown as a convex shape, it is not limited to this and its details will be described later.

The refraction element 43 is configured by an optical element such as a lens having a predetermined refractive index and has, as detailed shapes, concave shapes on its incidence and emission sides, for example, as shown in FIG. 20. An inclination (slope) of the concave surface of the refraction element 43 is more gradual than an inclination of a concave surface of the refraction element 43 in the comparative example of FIG. 18. In other words, a difference in height between a center and a periphery of the concave surface is relatively small. The refraction element 43 is not limited thereto and may have a shape whose incidence side is concave and whose emission side is convex, for example, as shown in FIG. 1.

The optical paths etc. of the image light are as follows. Schematically, the Y-directional optical axis a1 from the LED element 14 becomes the Z-directional optical axis a2 through the reflection at the light guide 17. The optical axis a2 of the emitted light from the light guide 17 is converted into a direction (optical axes a22, a23) having a predetermined angle φ2 with respect to the Z direction through the action of the emission surface s3. With respect to the converted optical axis, the axes of the liquid crystal display element 50 and refraction element 43 form a predetermined angle φ2. In this example, a panel surface of the liquid crystal display element 50 and the refraction element 43 are each arranged with a certain degree of inclination in the X-Y plane. As described above, optical axes a23, a24, and a25 are non-orthogonal to the axes of the liquid crystal display element 50 and the refraction element 43, and each have the angle φ2.

A light emission point of the LED element 14 is indicated by a point p1. Shown is the Y-directional optical axis a1 from the point p1. Shown is a point p2 through which the optical axis a1 passes on the incidence surface s1 of the light guide 17. Shown is a point p3 where the optical axis a1 strikes on the reflection surface s2 of the light guide 17. By the reflection at the point p3, the optical axis a1 is converted to a Z-directional optical axis a21. Shown is a point p4 through which the optical axis a21 passes on the emission surface s3. Shown is an optical axis a22 after the refraction through a point p4 on the emission surface s3. The optical axis a22 is incident on a point p5 of the liquid crystal display element 50 via the diffuser 18b. Shown is the optical axis a23 of the image light from the point p5 of the liquid crystal display element 50. The optical axes a22, a23 have the above-described angles φ2. The image light of the optical axis a23 is incident on a point p6 of the refraction element 43, and is subjected to the action of refraction to become an optical axis a24. The optical axis a24 has a predetermined angle φ3 with respect to the Z direction. The image light of the optical axis a24 is incident on and reflected at the point Q2 of the reflection mirror 42 to become the above-described optical axis a3.

Additionally, when the above-described external light is incident on the inside of the HUD apparatus 1, an optical axis b3 of the external light from the reflection mirror 41 is reflected at the point Q2 of the reflection mirror 42, and becomes an optical axis b4 (opposite direction of the optical axis a24). The external light of the optical axis b4 is incident on the point p6 of the refraction element 43. In Embodiment 2, the configuration having the angle φ2 on the optical axis has characteristics of hardly generating return external light. Some external light beams reflected by the refraction element 43 among the external light beams of the optical axis b4 travel in a direction different from those of the comparative example. Shown as a ray b9 is a ray of the reflected exterior light beams, which correspond to the outermost part of a range corresponding to the display area 4, among the exterior light beams of the optical axis b4. The ray b9 is shifted from the optical axis b4 by an angle corresponding to twice the angle φ2. The ray b9 of the reflected external light strikes on the casing 80 etc. and is attenuated, thereby making it difficult to return (diffuse) outside from the opening 81. Similarly, shown as a ray b10 is a ray of the reflected external light beams, which pass through the refraction element 43 and are incident on the liquid crystal display element 50, among the external light beams of the optical axis b4. Similarly, the ray b10 travels along an optical axis different from that of the image light, and hardly returns outside from the opening 81 due to attenuation etc. Almost no return-external-light component exists on the optical axis a5 of the sightline 6. Thus, the return external light being incident on the driver's eyes 5 is prevented and reduced. This brings suitably visual recognition of the virtual image 7 when the driver views the virtual image 7 through the point Q3 of the display area 4 with the sightline 6.

As described above, Embodiment 2 makes it possible to: downsize the apparatuses; also prevent or reduce the return external light while ensuring the suitable image light of the HUD; and suppress the deterioration in the quality of the virtual image 7 due to the external light. Incidentally, it can have another configuration without being limited to the configuration of the optical axis etc. in FIG. 20, and may adopt a configuration of having a free-form surface shape on the incidence surface s1 or emission surface s3 and a configuration of having a predetermined angle φ2 on the optical axis. As a configuration of another form, it may adopt such a configuration that the optical axis a22 of the emitted light from the light guide 17 has a predetermined angle φ2 so as to be tilted leftward in the Y direction with respect to the Z direction. Providing a free-form surface shape on the incidence surface s1 or emission surface s2 of the light guide 17 also makes it possible to design light distribution characteristics different for each position or area in a plane corresponding to the panel surface of the liquid crystal display element 50. Thus, realized can be the characteristics of efficiently suppressing the return external light.

2-6: Light Source Module

Figure 21:
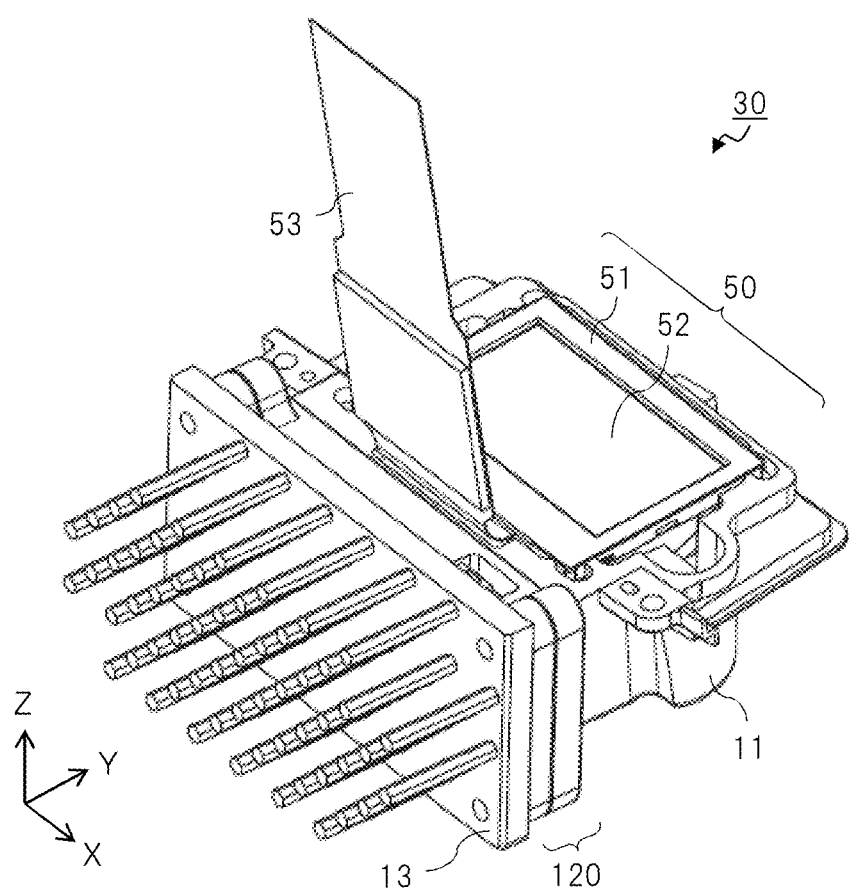
FIG. 21 is a perspective view showing external appearance of the image display apparatus.

FIG. 21 is a perspective view showing an appearance of a mounting configuration example as a light source module of the light source apparatus 10 of Embodiment 2. In this mounting configuration example, the LED substrate 12 provided with the LED elements 14 etc. is mounted as an LED module 120. The heat sink 13 is fixed on a back side of the LED module 120 in the Y direction. The heat sink 13 is disposed in a state in which a plurality of radiation fins come out of the light-source-apparatus case 11. The aforementioned light-source-apparatus case 11 is fixed on a front side of the LED module 120 in the Y direction, and accommodates the LED collimator 15, polarization conversion element 21, and light guide 17, etc. therein. The liquid crystal display element 50 is attached to a top surface of the light-source-apparatus case 11 in the Z direction. The liquid crystal display element 50 includes a liquid crystal display panel frame 51, a liquid crystal display panel 52, and an FPC 53. By their component parts, the image display apparatus 30 is configured as a module. Incidentally, the panel surface of the liquid crystal display element 50 and the display area 4 of the HUD apparatus 1 form a horizontally long screen that is relatively long in the X direction and short in the Z direction. Therefore, the light source apparatus 10 has a mounting means corresponding to the shape.

Respective components such as the LED substrate 12 and the LED collimator 15 in the light source apparatus 10 are positioned (located) and mutually fixed at positions such their outer peripheries by means such as screws, positioning pins, and uneven (concave-convex) shapes, thereby being configured as a module. The LED substrate 12 and the LED collimator 15 are fixed by, for example, a fit between a positioning pin and a positioning hole and sandwich between front and back parts, thereby being positioned and fixed with high accuracy. Respective components of the light source apparatus 10 and the image display apparatus 30 are fixed to the casing 80 of the HUD apparatus 1.

2-7: Light Source Module—Inside of Casing

FIG. 22 shows an internal configuration of the light-source-apparatus case 11 of the above-described light source apparatus 10. The LED substrate 12 is omitted in the drawing, and the light source apparatus has a plurality of (six in this example) LED elements 14 (14a, 14b, 14c, 14d, 14e, 14f) in the X direction, they being arranged per predetermined pitch. The LED collimator 15, which is composed of plural (six) collimator elements 15A corresponding to the plural LED elements 14, is disposed at rear stages of the elements in the Y direction. Individual collimator portions having the above-described concave part 153 and outer peripheral surface 156 are referred to as a collimator element 15A. The LED element 14 is disposed at a central portion of a top surface of each collimator element 15A. The plural collimator elements 15A are integrally formed with respect to a common substrate portion by using, for example, a translucent resin. A polarization conversion element 21 is disposed at a rear stage of the LED collimator 15.

The polarization conversion element 21 has, as a whole, a plate shape that is relatively long in the X direction and short in the Z direction. In the polarization conversion element 21, components such as the above-describe PBS film 211 and translucent member 214 extend in the X direction, and a plurality of components are arranged symmetrically in the Z direction. The polarization conversion element 21 may be accommodated in a not-shown polarization-conversion-element holder. A light distribution control plate 16b is disposed at a rear stage of a phase plate of the polarization conversion element 21. The incidence part 171 of the light guide 17 is disposed at a rear stage of the light distribution control plate 16b. An X-directional side part 174 and the top part 175 of the light guide 171 are provided with attachment portions to the casing 80. The emission surface s3 of the emission part 173, which is a top surface of the light guide 171, has a free-form surface as shown in the figure. The diffuser 18b is disposed above the emission part 173 in the Z direction. Incidentally, adopted may be also a form in which the light distribution control plate 16b and the diffuser 18b are not provided.

In this example, the optical diffusion block 16 is not provided, and the size in the Y direction can be reduced accordingly.

2-8: Light Source Unit, LED Collimator, Polarization Conversion Element

FIG. 23 is an enlarged Y-Z sectional view, as viewed from an apparatus-side-surface direction (X direction), the enlarged Y-Z sectional view schematically showing structures and rays, etc. of: the LED substrate 12 and LED element 14 in the light source unit 301; the LED collimator 15; and the polarization conversion element 21. A concave part 153 of the LED collimator 15 is disposed at a position facing (opposing) a light emission surface that includes a point p1 of the LED element 14 protruding from a main surface of the LED substrate 12 in the Y direction. An apex surface of the concave part 153 is disposed so as to contact with the light emission surface of the LED element 14. As described above, the collimator element 15A includes: the concave part 153 that is a lens portion on its incidence side; an outer peripheral surface 156 that is a reflector portion; and an emission surface 154 that is a lens portion on its emission side. The concave part 153 has an incidence surface 157 on its bottom surface side in the Y direction, and has a convex-shaped curved surface on its incidence side. A convex-shaped portion 155 that is convex on the emission side is formed at a portion opposing the emission surface 157 of the concave part 153 on the emission surface 154. The incidence surface 157 and the convex-shaped portion 155 constitute a convex lens function having a light condensing action.

The emitted light from the point p1 of the LED element 14 passes through air in the concave part 153 of the collimator element 15A, travels like ray examples as illustrated, and is emitted outside the concave part 153. The rays emitted from the convex part 153 are condensed while some of the rays are reflected by the substantially conical outer peripheral surface 156 (reflector portion). The light beams traveling in a peripheral direction of the optical axis a1 are totally reflected by a paraboloid of the outer peripheral surface 156. These rays are emitted as parallel light in the Z direction through the emission surface 154. The polarization conversion element 21 is disposed so that its incidence surface contacts with the emission surface 154.

The parallel light from the plural (six) LED elements 14 and collimator elements 15A arranged in the X direction is incident on the polarization conversion element 21. Cross-sections of the optical axes a1 of the respective LED elements 14 are the same as shown in FIG. 23. Similarly to the foregoing, the polarization conversion element 21 is configured by the parallelogram-pillar translucent member 214, triangular-prism translucent member 215, PBS film 211, reflection film 212, and half wave plate 213, etc. The translucent member 214 is a parallelogram in a Y-Z section, and the translucent member 215 is a triangle in the Y-Z section. The respective components are arranged symmetrically with respect to the Y-directional optical axis a1. The PBS film 211 is provided at an interface between the translucent member 215 disposed on the optical axis a1 and each of the translucent members 214 disposed above and below the translucent member 215. The reflection film 212 is provided at an interface between the translucent member 214 and the translucent member 215 that is disposed further outside therefrom. The half wave plate 213 is provided on a surface of the translucent member 214 on the Y-directional emission side.

The light (P-polarized wave), which has passed through the translucent member 214 and transmitted the PBS film 211, among the light incident on the polarization conversion element 21 is emitted from the emission surface through the translucent member 215. The light (S-polarized wave), which has passed through the translucent member 214 and been reflected at the PBS film 211, among the light incident on the polarization conversion element 21 is reflected in the Y direction by the reflection film 212. The reflected light is emitted, as light (P-polarized wave) whose phase has been adjusted, from the emission surface of the translucent member 214 through the half wave plate 213. Namely, in the polarization conversion element 21, all the light beams from the plural LED elements 14 are emitted as P-polarized waves. Thus, since the optical path length difference therebetween is small, surface uniformity of a luminance distribution is high.

As described above, the polarization conversion element 21 in Embodiment 2 is disposed in a 90-degree rotated state in the X-Z plane with respect to the arrangement of the polarization conversion element 21 in Embodiment 1 (a state in which the horizontal and vertical directions are transposed). Consequently, degrees of tolerance and freedom of the arrangement positions of the plural LED elements 14 and collimator elements 15A with respect to the polarization conversion element 21 in Embodiment 2 are higher than those in Embodiment 1 (described later). Thus, various designs and mountings of the light source apparatus 10 according to specifications etc. of the HUD apparatus 1 can be facilitated, which brings improvement in manufacturing yield.

The incidence surface of the polarization conversion element 21 has a limiting width 21w of an incident light flux which corresponds to the translucent member 214 etc. As in Embodiment 1, the collimator element 15A is designed in accordance with the limiting width 21w of the incident light flux of the polarization conversion element 21. Diameters (distance D2 in FIG. 26 described later) of the outer peripheral surface 156 and the emission surface 154 of the collimator element 15A are larger in dimension than the limiting width 21w. The convex-shaped portion 155 is provided inside the limiting width 21w.

In the light source apparatus 10 according to Embodiment 2, the image display apparatus 30 using the liquid crystal display element 50, and the HUD apparatus 1, to realize a predetermined high output and high efficiency of the LED light source, the number of LEDs etc. to be arranged per unit area is set as many as possible, which brings realization of a large amount of light and brightness, high light utilization efficiency, and uniformity of an in-plane light intensity. Alternatively, even when the number of LED elements 14 is the same as that of the conventional one, an area and a size etc. required for the apparatus can be downsized (reduced) In this case, the components such as the LED element 14, LED collimator 15, and polarization conversion element 21 in Embodiment 2 need to satisfy predetermined conditions about dimensions and arrangement relationships. FIG. 24 shows the conditions.

2-9: LED Element, LED Collimator

FIG. 24 is an explanatory diagram about the conditions such as the sizes of the LED element 14 and LED collimator 15 of FIG. 23 in Embodiment 2 and its modification example. FIG. 24(a) shows a schematic Y-Z cross-section of a portion of one LED element 14 and one collimator element 15A. A width (diameter) in the Z and X directions on a surface 14p that includes the point p1 as a light emission point of the LED element 14 is defined as a width W1. A width (diameter) in the Z and X directions in the concave part 153 (circle of an apex portion) of the collimator element 15A is defined as a width W2. The width W2 is larger than the width W1 (W2>W1). A half of a difference between the width W1 of the LED element 14 and the width W2 of the convex part 153 is indicated by a width W3 (W3=(W2−W1)/2). The width W3 is greater than 0 (W3>0). Additionally, a distance (thickness of the LED element 14) of the LED element 14 protruding from a surface 12p of the LED substrate 12 in the Y direction is defined as a distance H1. The surface 12p is a substrate surface on which the LED element 14 is mounted. A distance between the surface 14p of the LED element 14 and the convex part of the incidence surface 157 of the bottom surface in the concave part 153 of the collimator element 15 is defined as a distance H2. A distance between the surface 12b of the LED substrate 12 and an apex surface 153p of the concave part 153 of the collimator element 15A is defined a distance H3.

In Embodiment 2, at least a part of the LED element 14 is disposed outside the concave part 153 (H3>0). In this example, in the Y direction, a relatively thin part that includes the surface 14p having the light emission point of the LED element 14 is disposed in the concave part 153, and the other relatively thick parts are disposed outside the concave part 153. As a condition, the width W2 of the convex part 153 is larger than the width W1 of the LED element 14, and has the width W3 that is the diametrical difference.

The concave part 153 has the predetermined width W2 of the apex surface 153p and the distance H2 so that a received amount of emitted light from the LED element 14 can be secured. In Embodiment 2, the shape of the collimator element 15A is defined so as to have a predetermined size relationship with the shape of the LED element 14. Specifically, as a condition, the distance H2 is larger than twice the width W1 ((2×W1)<H2). By this configuration, an absolute value of a tangent value of an inclination (gradient) of the ray, which is emitted from the LED element 14 and is incident on the incidence surface 157, becomes ¼ or less (corresponding to a range of ±14°), and parallelism of the rays, which are refracted at the incidence surface 157 of the collimator element 15A and are incident on the polarization conversion element 21, can nearly fall within an incidence-angle allowable range of ±15°, which is capable of realizing an efficient light source.

FIG. 24(b) shows an arrangement of the LED elements 14 and collimator elements 15A in a modification example of Embodiment 2. In this modification example, the surface 14p including the point p1 of the LED element 14 and the apex surface 153p of the convex part 153 are separated in the Y direction. In other words, a relationship between the distance H3 and the distance H1 of the thickness of the LED element 14 is H3>H1, the distance H3 being a distance between the surface 12p of the LED substrate 12 and the apex surface 153p of the convex part 153. Since airflow paths are formed in the X and Z directions by the distance H3, the radiation performance can be enhanced. As the distance H3 increases, the cooling efficiency increases and as the distance H3 decreases, the light utilization efficiency increases. The LED element 14 of the LED substrate 12 and the collimator element 15A of the LED collimator 15 are fixed by the aforementioned LED module 120 etc. so as to form the distance H3. As a mounting example, shapes satisfying the condition (2×W1<H2) are W1=1.15 mm and H2=3.1 mm.

With the configuration satisfying the above conditions, the light utilization efficiency and cooling performance of the LED light source can be enhanced.

2-10: Polarization Conversion Element

FIG. 25(a) is a perspective view showing a configuration of a part arrangement (layout) etc. about a set of polarization-conversion-element parts of the polarization conversion element 21. Also shown by broken lines are schematic (rough) positions of the plural LED elements 14 and plural collimator elements 15A arranged correspondingly to the polarization conversion element 21. It is assumed that N is the number of LED elements 14 etc. arranged in the X direction. Here, a case of N=3 is shown. In the X-Z plane on a Y-directional front side of the polarization conversion element 21, each of plural points q indicates a point through which the optical axis a1 from the point p1 of each LED element 14 passes. A circle around the point q corresponds to an end of the outer peripheral surface 156. The substantially conical outer peripheral surface 156 is indicated by a broken line.

The PBS film 211, reflection film 212, half wave plate 213, translucent member 214, and translucent member 215, which are components configuring the polarization conversion element 21, extend in the X direction. The respective components are arranged in parallel to a plane (X-Z plane)

orthogonal to the optical axis a1. The respective components are arranged at positions and with shapes, the positions and shape being vertically symmetrical in the Z direction with respect to the X-Y plane (virtual plane) formed by the X direction and the Y direction corresponding to the optical axis a1 and the central axis of the collimator element 15A. The translucent member 215 disposed at a position on the optical axis a1 in the Z direction has a triangular-prism shape. The two translucent members 214 arranged vertically symmetrically with respect to the translucent member 215 have quadrangular-prism shapes. Each of two translucent members 215b further arranged outside them has a triangular-prism shape whose cross-section is a right triangle. The PBS film 211 and reflection film 212 are arranged as slopes having a predetermined positive/negative angle ε with respect to the Y-directional optical axis a1. Incidentally, as shown in FIG. 25(b), the polarization conversion element 21 may have a configuration in which an upper component part 21u and a lower component part 21d are bonded to each other on a bonding surface 216. Additionally, the bonding surface 216 preferably has an optically transparent configuration after the bonding. In this configuration, the upper component part 21u and the lower component part 21d can be composed of the same component. Namely, if the upper component part is rotated by 180° around the Z axis shown in the figure and is further rotated by 180° around the Y axis, its placement overlaps with that of the lower component part. Commonalization and simplification of the components due to this configuration can be achieved, which bring further reduction in cost.

2-11: Plural LED Elements, Collimator, Polarization Conversion Element

FIG. 26 relates to a configuration example in which the plural (N) LED elements 14 and the plural collimator elements 15A are arranged in the X direction with respect to the polarization conversion element 21, and shows the X-Z plane of the configuration viewed from the Y direction. Additionally, FIG. 26 shows, as a modification example, a configuration example in a case where two sets of polarization conversion elements 21 are arranged in the Z direction. In FIG. 26(a), a first polarization conversion element unit 21-1 and a second polarization conversion element unit 21-2 are arranged on an upside and a downside in the Z direction, respectively. Respective structures of the polarization conversion element units are the same as shown in FIG. 26.

Points q corresponding to the plural LED elements 14 and the plural collimator elements 15A are spaced apart a distance D1 that has a predetermined pitch. In FIG. 26(a), positions of the respective points q are the same in the upper and lower polarization conversion element units. In the X-Z plane, the points q corresponding to the light emission axes of the plural LED elements 14 are arranged rectangularly. Additionally, a diameter of a circular area corresponding to the outer peripheral surface 156 of each collimator element 15A is shown by a distance D2. In this example, the plural collimator elements 15A in the X direction are arranged as close as possible while the distance D2 therebetween is maintained. The collimator elements are arranged so that a surface of each LED element 14 may fall within the apex surface of each concave part 153.

FIG. 26(b) shows, as another configuration example, a case where arrangement (layout) positions of the points q of the plural LED elements 14 etc. are shifted in the upper and lower polarization conversion element units 21-1, 21-2 in the Z direction. Positions of the LED elements 14 etc. of the lower polarization conversion element unit 21-2 are shifted half the pitch (distance D2) with respect to the upper polarization conversion element unit 21-1. In the X-Z plane, the points q corresponding to the light emission axes of the plural LED elements 14 etc. are arranged triangularly. Similarly, the number of arrangements of a plurality of sets of polarization conversion element units in the Z direction is not limited to two rows as necessary.

As described above, regarding the arrangement configuration of the polarization conversion element 21 in Embodiment 2, restriction of arranging the plural LED elements 14 etc. in the X direction is few, so that a freedom degree of the arrangement increases. In Embodiment 1 described above, for example, as shown in FIG. 4(a), the polarization conversion element 21 has the plural components extending in the Z direction and arranged in the X direction. Consequently, the polarization conversion element 21 is configured as plural (two) sets of polarization conversion element units divided in the X direction, and has the positions on the optical axis 15c in the X direction and the limiting width 21w correspondingly to the respective sets. The LED element 14 and the collimator unit need to be arranged at predetermined positions correspondingly to such a configuration of the polarization conversion element 21. For this reason, for example, a large number of LED elements 14 etc. cannot be arranged only at a predetermined distance or more due to some restriction in arranging them within a predetermined size in the X direction.

Meanwhile, restriction on arrangements of components such as the LED elements 14 in the X direction as shown in FIGS. 25 and 26 in Embodiment 2 is less than that of Embodiment 1, so that a freedom degree of the arrangement increases. The polarization conversion element 21 is not divided into a plurality of parts (sets) in the X direction, and its components extend continuously. Consequently, the LED element 14 etc. can be arranged at somewhat free positions in the X direction. For example, as shown in FIG. 26(a), the plural (N) LED elements 14 etc. can be closer arranged in the X direction with a pitch (distance D1) as short as possible. Arranging a large number of LED elements 14 etc. within a predetermined size in the X direction makes it possible to increase light quantity of the light source and contribute to a reduction of the apparatus in size.

2-12: Plural LED Elements (N=5)

Figure 27:
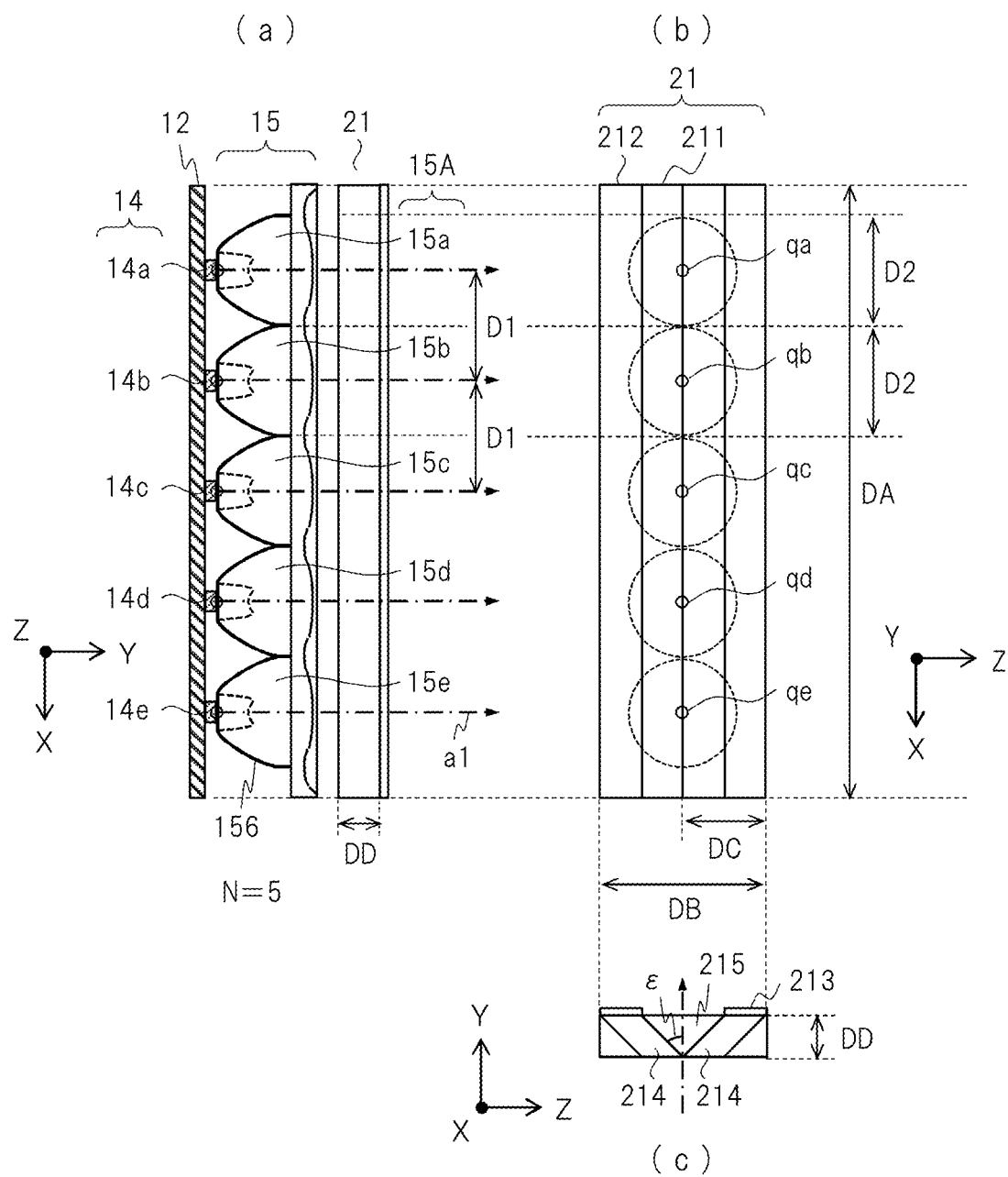
FIG. 27 is a view showing an arrangement configuration example of a plurality of LED elements etc. of the light source apparatus.

FIG. 27 is an explanatory diagram about an arrangement configuration etc. of the plural LED elements 14, plural collimator elements 15A, and polarization conversion element 21 in Embodiment 2. In this example, shown is a case of N=5 as the number of LED elements 14 etc. arranged in the X direction. FIG. 27(a) shows its configuration on the X-Y plane; FIG. 27(b) shows, on the X-Z plane, a configuration of the corresponding polarization conversion element 21; and FIG. 27(c) shows, on the Y-Z plane, a configuration of the corresponding polarization conversion element 21. This example includes collimator elements 15a to 15e as the collimator elements 15A correspondingly to the LED elements 14 (14a to 14e).

Each width of the LED collimator 15 and the polarization conversion element 21 in the X direction is indicated by a distance DA. A height of the polarization conversion element 21 in the Z direction is indicated by a distance DB. A width between the units vertically symmetrical to the optical axis a1 is indicated by a distance DC, which is half the distance DB. A thickness of the polarization conversion element 21 (excluding the half wave plate 213) in the Y direction is indicated by a distance DD.

In this example, the distance DB of the polarization conversion element 21 is, e.g., 17.6±0.2 mm, the distance DC is 8.8±0.1 mm, and the distance DD is 4.4±0.1 mm. An angle ε of each incline of the PBS film 211 and the reflection film 212 is (45°±20') if it is assumed that the angular unit is degrees (°) and minutes ('). The half wave plate (½λ phase plate) 213 has a shape that does not depart from a range of a boundary; its length in the X direction is the same as those of the translucent member 214 etc.; and its width in the Z direction is the same as that of the emission surface of the translucent member 214. The distance DA of the polarization conversion element 21 is, e.g., 44±0.2 mm in a first type example that is relatively small, and 74±0.2 mm in a second type example that is relatively large.

2-13: Comparative Example

Figure 28:
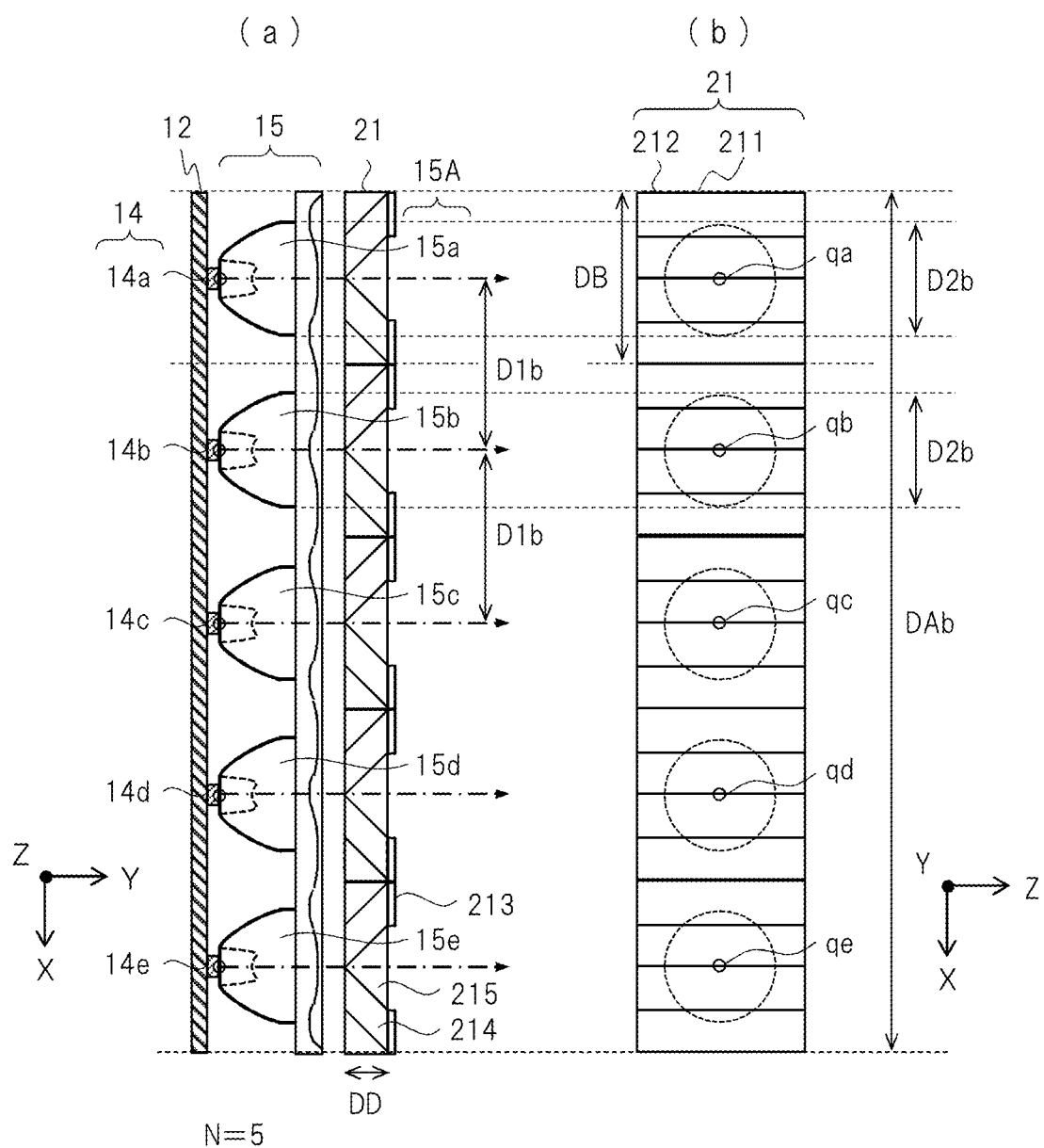
FIG. 28 is a view showing a configuration of a comparative example with respect to the arrangement configuration example of the plural LED elements etc. of the light source apparatus.

FIG. 28 similarly shows a configuration of a comparative example for the configuration of N=5 in FIG. 27. In this comparative example, as N=5, five LED elements 14 and five collimator elements 15A are similarly arranged in the X direction. In this comparative example, the polarization conversion element 21 is configured by using five sets of polarization conversion element units in the X direction. A distance DB of a width of one set of polarization conversion element units is the same as the width of FIG. 27. In this comparative example, due to the restriction corresponding to the configuration of the polarization conversion element 21, a pitch (distance D1b) between the arrangements of the LED element 14 and the collimator element 15A is larger than a pitch (distance D1) in FIG. 27, and a side (distance DAb) of the entire apparatus in the X direction is larger than a size (distance DA) in FIG. 27.

As described above, Embodiment 2 has a higher possibility of realization in miniaturization etc. of the apparatus than that of the comparative example. Alternatively, if being set at the same predetermined size (distance DAb) as that of the comparative example, Embodiment 2 can arrange more LED elements 14 etc. within its range to increase the light amount (quantity). In the light source apparatus 10 according to Embodiment 2, the number of LED elements 14 capable of being arranged within a predetermined width in the X direction can be increased (by N), so that the light source apparatus can generate brighter lighting light. Alternatively, the width in the X direction can be further reduced in the light source unit 301 etc. in which the predetermined number of LED elements 14 is provided.

According to Embodiment 2, the plural LED elements 14 etc. can be relatively freely arranged in the X direction with respect to the polarization conversion element 21 within the predetermined conditions. Consequently, in accordance with specifications etc. (e.g., the size etc. of the display area 4) of the HUD apparatus 1, mounting the light source apparatus 10 thereon is easily variable by changing the arrangement (layout) numbers and/or positions etc. of the LED elements 14 etc. In the various mountings, the configurations of the polarization conversion elements 21 can be made common, and their components (parts) can be used in common, so that the light source apparatus can be manufactured at low cost.

2-14: Mounting Example of Plural LED Elements (N=5)

FIG. 29 shows, as a mounting example including arrangement of the plural LED elements 14 etc., a case of N=5 corresponding to FIG. 27 in the light source apparatus 10 of Embodiment 2. FIG. 29(a) shows a top view in the X-Y plane, and FIG. 29(b) shows a side view in the corresponding Y-Z plane. In the X direction, each approximate width of the LED substrate 12, LED collimator 15, polarization conversion element 21, polarization control plate 16b, and light guide 17, etc. is indicated by a distance DA1. The five LED elements 14 and the corresponding five collimator elements 15A (15a to 15e) in the X direction within a width of the distance DA1 are arranged per distance D11 having a predetermined pitch. For example, when small size, low cost, and low power consumption, etc. have precedence over all others in mounting the light source apparatus 10, the five LED elements 14 etc. as N=5 are arranged within the predetermined distance DA1 as in the mounting example of FIG. 29.

2-15: Mounting Example of Plural LED Elements (N=6)

FIG. 30 shows, as a modification example of the light source apparatus 10, a case of N=6 that is a mounting example including arrangement of the plural LED elements 14 etc. similarly to the case of FIG. 29. Each approximate size of the LED substrate 12 etc. in the X direction is indicated by a distance DA2. Within a width of the distance DA2, six LED elements 14 (14a to 14f) and corresponding six collimator elements 15A (15a to 15f) are arranged in the X direction per predetermined pitch (distance D12). For example, in a mounting case of intending to increase the light amount of the light source by increasing the number of LEDs in the X direction as much as possible, as shown in FIG. 30, the six LED elements 14 etc. as N=6 are arranged per predetermined pitch D12 as short as possible within the predetermined distance DA2.

As described above, since the freedom degree of arrangement of the plural LED elements 14 etc. in the X direction is high with respect to the configuration of the polarization conversion element 21, both the examples of FIGS. 29 and 30 in Embodiment 2 can be easily realized. Namely, the mounting capable of changing the number of LED elements 14 (by N) in accordance with the specifications etc. of the HUD apparatus 1 can be realized relatively easily. For example, it is easy to reduce the number of LEDs (by N) from the configuration of FIG. 30 to change it to the configuration of FIG. 29.

2-16: Light Guide

Figure 31:
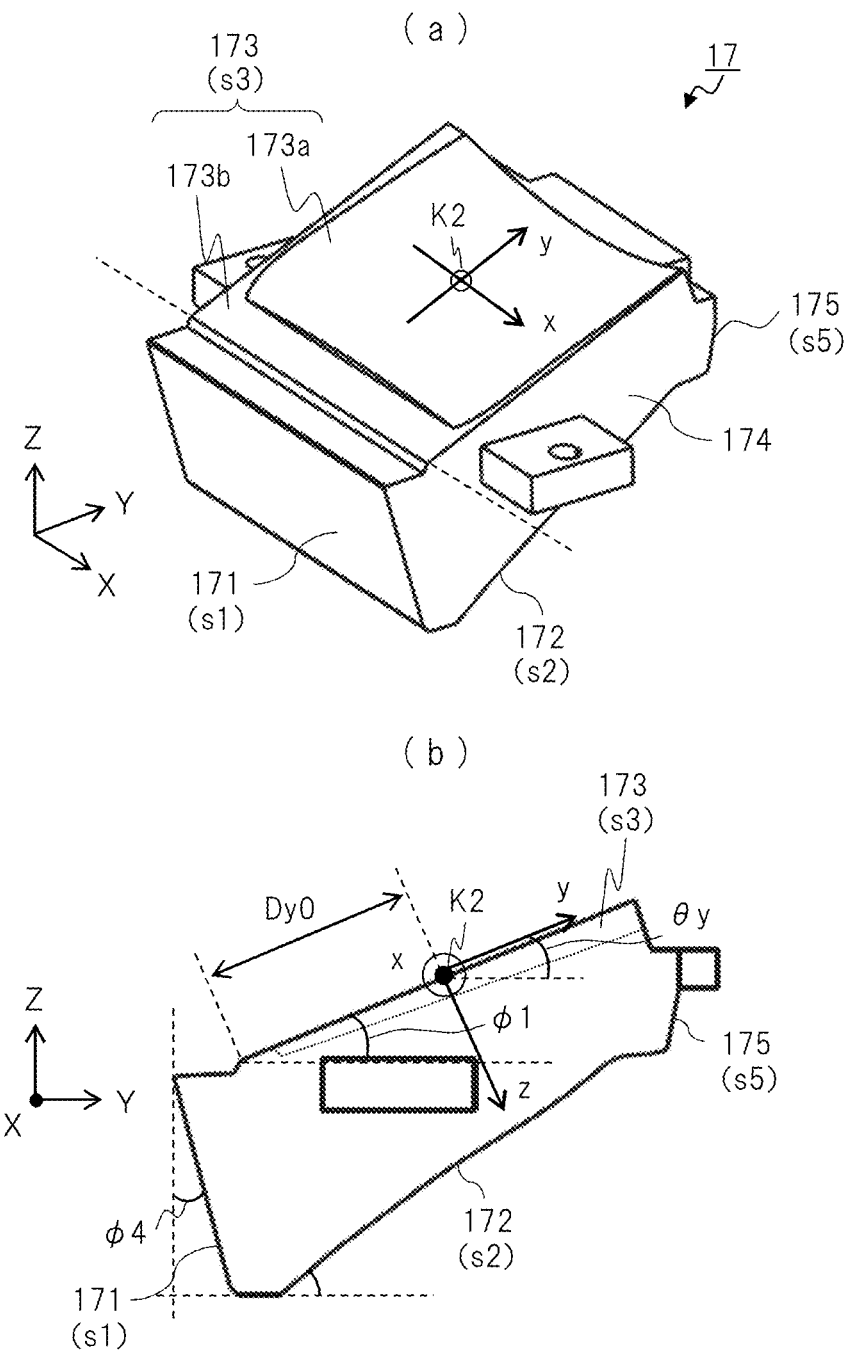
FIG. 31 is a perspective view and a side view which show the entire detailed configuration of a light guide of the light source apparatus.

FIG. 31 is a perspective view showing a free-form surface shape etc. of the emission surface s3 of the emission part 173 of the light guide 17. FIG. 31(a) shows a perspective view and FIG. 31(b) shows a configuration of the side surface portion 174 as viewed from on the Y-Z plane. In FIG. 31(a), the emission surface s3 of the emission part 173 has a free-form surface portion 173a inside an outer-peripheral plane portion 173b. In FIG. 31(b), the incidence surface s1 of the incidence part 171 is set as a slope having an angle φ4 of an inclination with respect to the Z direction that is vertical. The top surface s5 of the top part 175 also has an attachment portion to the casing. The emission surface s3 is set as a slope having an angle φ1 with respect to the horizontal plane. Its slope has a free-form surface portion 173a.

FIG. 32 shows a structure of the reflection part 172 etc. of the light guide 17. FIG. 32(a) shows a configuration on the Y-Z plane, and FIG. 32(b) shows the reflection surface s2 partially enlarged. In FIG. 32(a), a distance between the emission surface s3 and the reflection surface s2 is shown as an inter-surface distance Dt. The inter-surface distance Dt has the maximum distance Dtmax near the incidence surface s1, and has the minimum distance Dtmin near the top surface s5 (Dtmax>Dtmin). A height of the top surface s5 corresponding to the distance Dtmin is lower than a height of the incidence surface s1 corresponding to the distance Dtmax. This example meets Dtmax/Dtmin≈2.

The reflection surface s2 is basically disposed as a slope having a predetermined angle with respect to the horizontal plane. Specifically, the reflection surface s2 has a serrate shape (step-like shape) in which the reflection surface 172a and the connection surface 172b are alternately repeated similarly to Embodiment 1. FIG. 32(b) shows respective portions of the reflection surfaces 172a and connection surfaces 172b that meet n=1 to 9, the portions being close to the incidence surface s1. FIG. 32(c) shows respective portions of the reflection surfaces 172a and connection surfaces 172b that meets n=64 to 75, the portions being close to the top surface s5. Incidentally, similarly to the foregoing, a Y-directional pitch between the plural reflection surfaces 172a is indicated by P1 etc.; an angle of the reflection surface 172a with respect to the horizontal plane is indicated by an angle αn; and an angle of the connection surface 172b with respect to the reflection surface 172a is indicated by an angle βn.

Thus, the structure of the light guide 17 including the incidence part 171, reflection part 172, emission part 173, and top part 175 brings: realization of the predetermined light distribution control; and forming of the optical axis a22 that has the angle ϕ3 of an inclination of the emitted light with respect to the Z direction and the angle ϕ2 of the inclination with respect to the axes of the refraction element 43 etc. (corresponding to the configuration in FIG. 20).

Additionally, such a shape of the light guide 17 also has an advantage of being easily manufactured at a time of manufacture. In producing the light guide 17 in large quantities at low cost, it is effective to produce the light guide by using a manufacturing method such as injection molding. In a case of the light guide 17 having the substantially triangular cross-section shown in FIG. 9 as the comparative example in using the manufacturing method, there arise some problems in a side portion corresponding to an acute vertex of the triangle, the problems making it relatively difficult to ensure the accuracy of the injection molding and needing high cost. Specifically, since non-uniformity according to a difference between portions (incidence surface and side portion opposite thereto) of the light guide 17 exists about a cooling rate of a molten resin in each mold at the time of the injection molding, high-precision molding (shaping) is relatively difficult. Since the shape of the light guide 17 is designed to have the predetermined light distribution control characteristics, the quality of the light distribution control characteristics degrades when the shape of the light guide 17 after the injection molding is largely deviated from the designed shape.

Meanwhile, as shown in FIG. 32 in Embodiment 2, the light guide 17 has a substantially trapezoidal cross-section and has a top part 175. A difference in shape between the incidence part 171 and the top part 175 in Embodiment 2 is smaller than that in the comparative example. Consequently, at the manufacturing time by the manufacturing method of injection-molding the light guide 17, the non-uniformity according to the difference between the portions (incidence surface 71 and top part 175) is suppressed about the cooling rate of the molten resin in the mold at the injection-molding time. Thus, the light guide 17 has advantages of making it possible to: be realized with higher-accuracy molding; improve the quality of the light distribution control characteristics; and be mass-produced at low cost.

Figure 33:
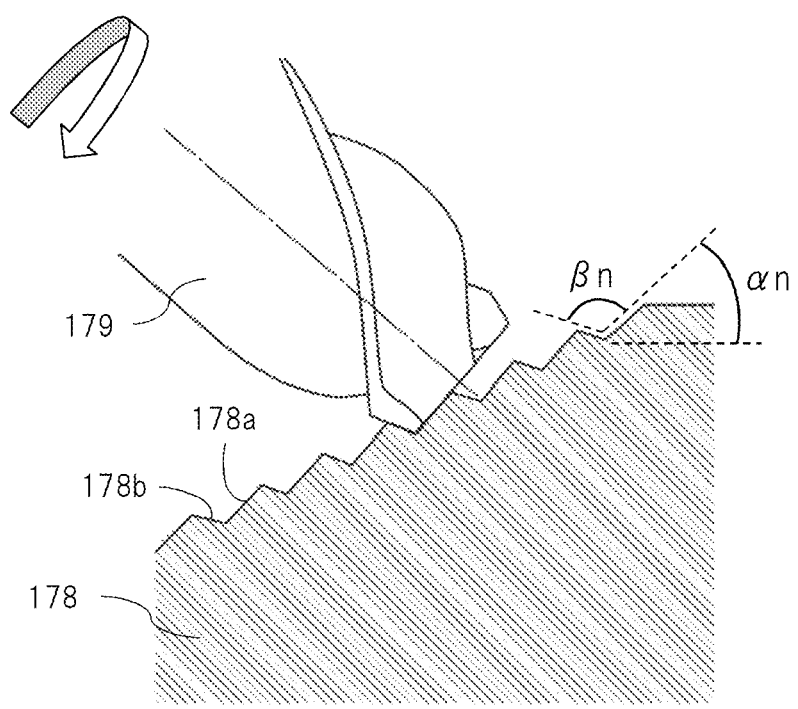
FIG. 33 is an explanatory drawing of a machining state of a die as an example of a manufacturing method of the light guide.

FIG. 33 is an explanatory diagram showing an example of machining a mold(s) at a time of manufacturing the light guide 17, particularly, its reflection part 172. As a method of manufacturing the light guide 17, a method of injection-molding a resin into a mold(s) is used. FIG. 33 shows a state in which a mold 178 for the reflection part 172 (reflection surface s2) of the light guide 17 is cut and machined by a tip of a drill 179. The machined surface of the mold 178 has reflection surfaces 178a and connection surfaces 178b corresponding to the n reflection surfaces 172a and connection surfaces 172b, respectively. An angle βn is formed between the reflection surface 178a and the connection surface 178b. Such a manufacturing method can simultaneously machine and form the two surfaces of the reflection surface 172a and connection surface 172b, so that the light guide 17 having suitable characteristics can be efficiently manufactured and the light source apparatus can be realized at low cost.

2-17: Light Distribution Control

Figure 34:
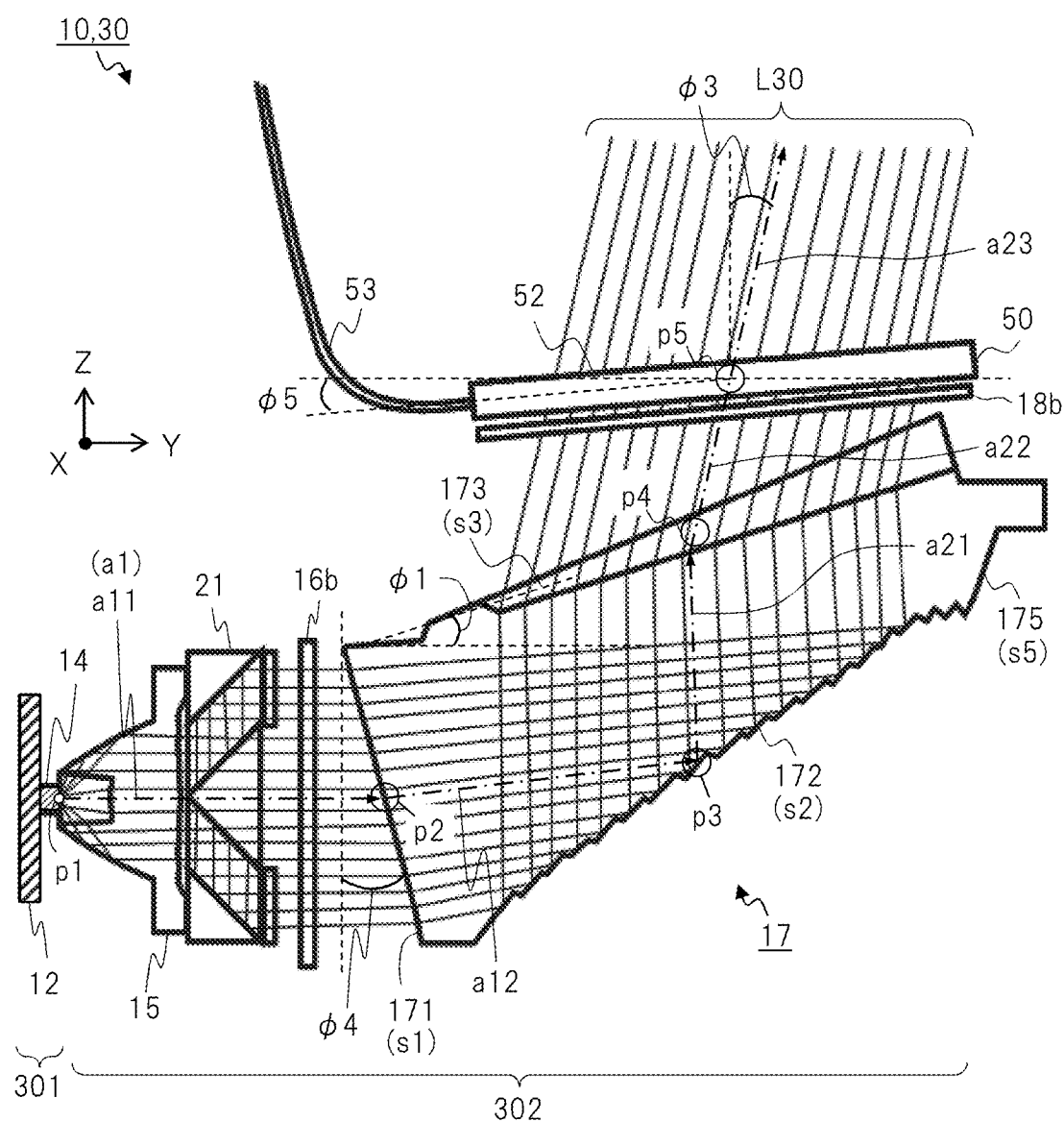
FIG. 34 is a sectional view showing a configuration of light distribution control in the light source apparatus of Embodiment 2.

FIG. 34 shows a configuration of light distribution control of the light source apparatus 10 and image display apparatus 30 of Embodiment 2 and shows, on the Y-Z cross-section viewed from the X direction, optical axes and respective rays of lighting light of the light source apparatus 10 and image light of the image display apparatus 30. Incidentally, the reflection surface 172a and connection surface 172b of the light guide 17 are schematically illustrated by enlarging their real sizes. In this example, the incidence surface s1 of the light guide 17 becomes a plane (flat surface) that is disposed with an angle ϕ4 with respect to the Z direction. An optical axis a11 in the Y direction from the point p1 of the LED element 14 is incident on the point p2 on the incidence surface s1 of the light guide 17 and is subjected to predetermined refraction, thereby becoming an optical axis a12. The optical axis α12 is reflected at the point p3 on the reflection surface s2, and becomes an optical axis a21 in the Z direction. The emission surface s3 has a free-form surface shape that is obliquely disposed with an angle ϕ1 with respect to the Y direction, and has predetermined refraction characteristics. The optical axis a21 in the Z direction from the reflection surface s3 is refracted through a point p4 on the free-form surface of the emission surface s3, and becomes an optical axis a22 with an angle ϕ3 with respect to the Z direction (angle ϕ2 with respect to the axes of the liquid crystal display element 50 etc.). Lighting light of the optical axis a22 is incident on a point p5 on the panel surface of the liquid crystal display element 50. Similarly, image light generated by the liquid crystal display element 50 becomes an optical axis a23 with an angle ϕ3 etc. Rays L30 of the image light along the optical axis a23 are incident on the above-described refraction element 43.

Additionally, in this example, the diffuser 18 b is disposed near the back surface of the liquid crystal display element 50 and above the emission part 173 of the light guide 17 in the Z direction. The diffuser 18b and the liquid crystal display element 50 are roughly arranged on the horizontal plane. Specifically, the diffuser 18b and the liquid crystal display element 50 are disposed on a plane having an angle ϕ5 with respect to the horizontal plane.

The lighting optical system 302 requires complicated light distribution control for obtaining the above-mentioned suitable lighting light and for realizing prevention of the return external light. This light distribution control has been realized by the light distribution control of FIG. 34. The light distribution control along the Y-Z plane in FIG. 34 is represented by the optical axes a11, a12, a21, a22, and a23, etc. This light distribution control is realized by: a refraction angle of the incidence surface s1 of the light guide 17; a reflection angle of the reflection surface s2; a refraction angle due to the free-form surface shape of the emission surface s3; and the like. Additionally, the light distribution control in the X direction is realized by a refraction angle etc. due to the free-form surface shape of the emission surface s3. The light distribution control plate 16b controls light diffusion etc. in the X direction. The diffuser 18b controls light diffusion etc. in the X and Y directions. Characteristics of such light distribution control of the light source apparatus 10 according to Embodiment 2 make it possible to improve a freedom degree corresponding to the orientation angle of the lighting light greater than that of a convention technique (s), and improve suitable image light characteristics required for the HUD apparatus 1. In accordance with the characteristics of the adjustment optical system 40 and liquid crystal display element 50 of the HUD apparatus 1, the mounting of the light source apparatus 10 having the predetermined light distribution control characteristics is made easy. For example, the characteristics of the lighting light can be adjusted by designing the free-form surface shape of the emission part 173 of the light guide 17. Additionally, the characteristics of the suitable image light and of the light distribution control for preventing the return external light can be adjusted.

2-18: Light Distribution Control Plate

FIG. 35 shows a cross-sectional configuration of the light distribution control plate 16b in the light source apparatus 10 of Embodiment 2. FIG. 35(a) shows an X-Y cross-section of the light distribution control plate 16b. In the Y direction, the light distribution control plate 16b has a plane on its incidence side and a serrate surface on its emission side. FIG. 35(b) shows a partial enlargement of the emission surface of the light distribution control plate 16b. A plurality of triangular cross-sections are repeatedly formed as a texture on the emission surface in the X direction. On a plurality of triangular slopes, a first slope having a positive angle γ with respect to the X direction and a second slope having a negative angle γ with respect to the X direction are alternately repeated. A pitch between the triangle arrangements in the X direction is indicated by a distance D35. In this example, the angle γ=30 degrees and the pitch distance D35=0.5 mm. The light from the polarization conversion element 21 is diffused in the X direction of the incidence part 171 by action of the texture of the emission surface. For example, the light distribution control plate 1/6b may be a diffuser having an elliptical distribution of diffusion angles.

The light distribution control plate 16b has light diffusibility in the X direction. The diffuser 18b has light diffusibility in the Y direction. By operations (actions) of the light distribution control plate 16b and the diffuser 18b, an in-plane intensity distribution of the light emitted from the light guide 17 is uniformized, and suitable planar lighting light is obtained. Incidentally, Embodiment 2 can arrange the plural LED elements 14 etc. at positions closer to one another in the X direction than Embodiment 1, so that the uniformity in the X direction is further improved in combination with the diffusibility of the light distribution control plate 16b. Incidentally, the uniformity in the Z direction can be realized by controlling a ratio of the reflection surface 172a and the connection portion 172b that are formed in the reflection part 172 of the light guide 17, as described with reference to FIG. 10 in Embodiment 1. As a result, it is possible to realize the minimum diffusibility, improve the light utilization efficiency, and generate the suitable planar lighting light.

2-19: Functional Scattering Surface

FIG. 36 shows, as a modification example, a spatial frequency distribution of a machined surface in a case where at least one of the light distribution control plate 16b, the diffuser 18b, and the incidence surface s1 or emission surface s3 of the light guide 17 is provided with a predetermined functional scattering surface. On this functional scattering surface, predetermined light distribution control is performed so as to diffuse light and make a light intensity uniform. This functional scattering surface reduces unnecessary diverging light components by reducing surface roughness of components having a high spatial frequency. This functional scattering surface is formed by predetermined machining onto a target surface. The light distribution control plate and/or the diffuser are provided at least between the polarization conversion elements 21 and the incidence part 171 of the light guide 17 or between the emission part 173 of the light guide 17 and the liquid crystal display element 50. The example of FIG. 34 is provided with the light distribution control plate 16b on the incidence side and with the diffuser 18b on the emission side. FIG. 36(a) shows a distribution where the functional scattering surface is provided, and FIG. 36(b) shows a distribution of a comparative example where no functional scattering surface is provided. In each graph of FIG. 36, a transverse axis indicates spatial frequencies, a longitudinal axis indicates amplitudes, and a dash-single-dot line indicates a 1/f distribution. For example, a solid line indicates a surface roughness spatial frequency component measured in the Z direction when the functional scattering surface is provided on the incidence surface s1, and a broken line indicates a surface roughness spatial frequency component measured in the X direction. Thus, the light source apparatus 10 provided with the functional scattering surface realizes light distribution control characteristics more suitable than the comparative example.

2-20: Light Guide—Light Diffuseness

Figure 37:
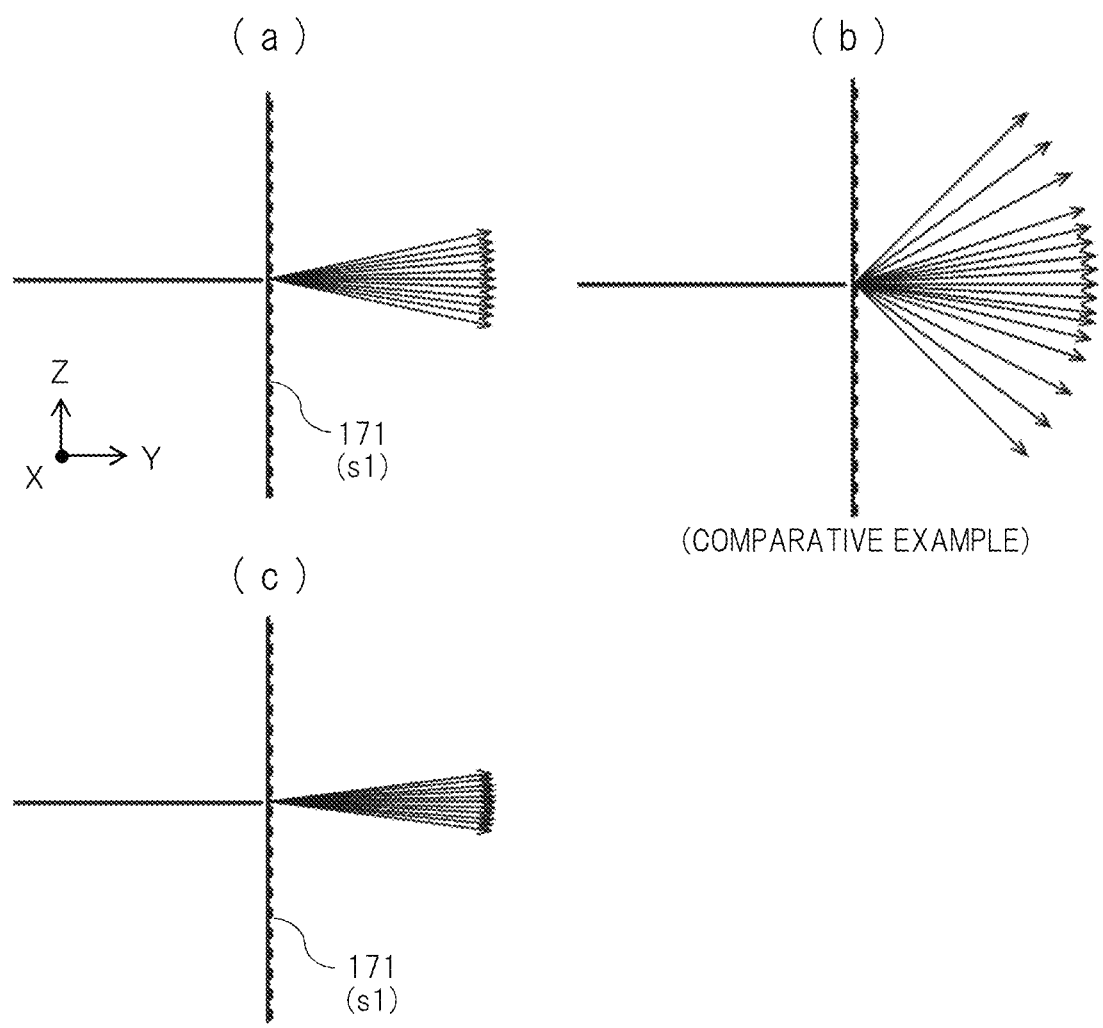
FIG. 37 is an explanatory drawing regarding a light scattering effect due to the light scattering surface of the diffuser.

FIG. 37 shows, on the Y-Z plane, light diffuseness (diffusivity) in the Z direction on the incidence surface s1 of the incidence part 171 of the light guide 17. FIG. 37(a) shows the characteristics of Embodiment 2. A light flux to be incident correspondingly to the Y-directional optical axis a1 diffuses into a plurality of rays in the Z direction on the incidence surface s1. FIG. 37(b) shows the characteristics of the comparative example. The characteristics in FIG. 37(a) have less light diffusibility in the Z direction than the characteristics in FIG. 37(b). FIG. 37(C) shows the characteristics of the modification example of Embodiment 2, and shows a case where the light diffuseness in the Z direction is made smaller.

Figure 38:
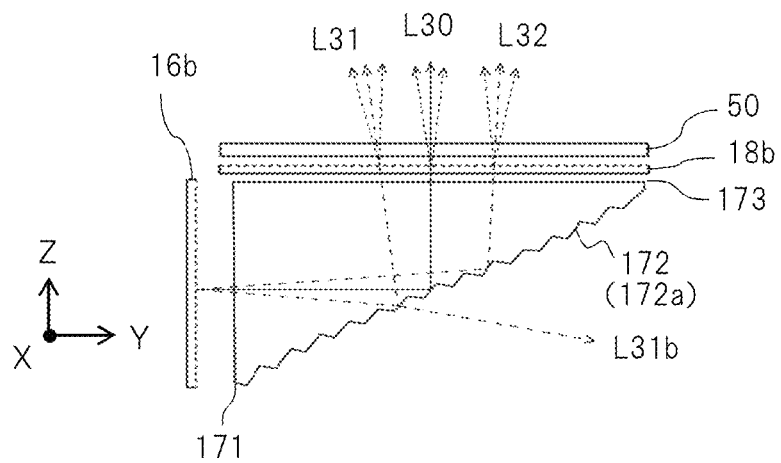
FIG. 38 is a side view showing light scatters of a light guide and a diffuser of a comparative example.

FIG. 38 shows characteristics of light diffuseness of the light guide and diffuser of the comparative example. This light guide is formed into a substantially triangular-prism shape, and structurally has a reflection surface s2 (plural reflection surfaces 172a) in the reflection part 172, its incidence surface s1 and emission surface s3 being planes (flat surfaces). In this light guide, the diffused light having the diffuseness in the Z direction from the light distribution control plate 16b is divided by and reflected at each reflection surface 172a of the reflection part 172 on the Y-directional optical axis on the incidence side. The reflected light in the Z direction is divided, e.g., like the rays L30, L31, L32, and becomes light having the diffuseness in the Y direction. Each reflected light beam is further diffused in the Y direction by the diffuser 18b, and is incident on the panel surface of the liquid crystal display element 50.

However, in the above-described light guide, some (e.g., light corresponding to the ray L31b) of the incident light beams cannot be totally reflected by the reflection surface 172a, so that light loss occurs. Consequently, it is difficult to ensure a larger amount of lighting light for compensating for the loss, which leads to insufficient brightness. Alternatively, if it is attempted to deal with this lack of brightness by an increase etc. in number of the light source, the attempt leads to an increase in size and/or power consumption of the apparatus. Therefore, if the configuration of Embodiment 2 is adopted, the light distribution control etc. due to the free-form surface shape of the light guide 17 make it easy to ensure the larger light amount as lighting light and possible to contribute to the downsizing and/or power consumption suppression of the apparatus.

2-21: Light Guide—Free-Form Surface Shape

The free-form surface shape of the emission part 173 of the light guide 17 in Embodiment 2 will be detailed with reference to FIGS. 31 and 39. Incidentally, the free-form surface is one of surfaces capable of being handled as a three-dimensional object such as CAD, and is a curved surface capable of being expressed by a higher-order equation(s) through setting of several intersections and curvatures in a space.

First, in FIG. 31(a) described above, the light guide has, in the emission surface s3 of the emission part 173, a free-form surface portion 173a inside the plane portion 173b of an outer frame. An example of how to set a reference coordinate system on this free-form surface is shown by (x, y, z). It has an x-axis and a y-axis that pass a central point K2 (corresponding to point p4) of the free-form surface and are orthogonal to each other. The x and y axes have correspondence relationships with the X and Y directions, respectively. A reference position of the emission part 173 of the light guide 17 is indicated by a broken line. In this example, the reference position is set as a position at the beginning of a slope close to an incidence surface s1 side. In FIG. 31(b), a distance from the reference position of the emission part 173 of the light guide 17 to the x-axis (point K2) of the reference coordinate system on the free-form surface is indicated by a distance Dy0. In this example, Dy0=18 mm. The center of the y-axis is set at the center of the light guide 17. Additionally, an angle between the horizontal plane and the y-axis is an angle θy and, in this example, θy=17°. The z-axis of the reference coordinate system is perpendicular to the x-axis and y-axis from the point K2, and indicates, as positive, an inner direction of the emission surface s3.

A range of the free-form surface has been set to −21 mm≤x≤21 mm and −15 mm≤y≤16 mm. Roughly, a width in the X direction is 42 mm and a width in the Y direction is 31 mm. Additionally, in this example, when a value of z(x, y) is negative, it is forcibly set to 0 (zero). In other words, as shown in FIG. 31(b), on the emission surface s3, its outside is cut as a plane, and a concave part of the free-form surface exists outside from the plane as shown by a dotted line(s). Incidentally, another example may have a structure in which a convex part of the free-form surface exists outside (emission direction) from the emission surface.

FIG. 39 shows an equation defining the free-form surface shape of the emission part 173 of the light guide 17 of Embodiment 2 and shows its coefficients. FIG. 39(a) shows Equation 1 which is a generally expressed free-form surface equation. As shown by Equation 1, the free-form surface is represented by $z(x, y) = \Sigma\{ai \cdot bi(x, y)\}$. $\Sigma$ means an addition from the subscript i=0 to 14. The term ai·bi represents a coefficient and a variable. The term z(x, y) represents a z value corresponding to values of position coordinates of (x, y). Their units are mm.

FIG. 39(b) shows coefficients and variables of Equation 1 in tabular form. For example, when i=0, b0=1 and a0≈1.0269. When i=1, b1=x and a1≈0.0015. When i=2, b2=y and a2≈−0.0032. When i=3, b3=x^2 and a3≈−0.0052. When i=14, b14=y 4 and a14=5.3049E-06. E is an exponent and, for example, the expression E-06 indicates 1/10 to the sixth power. The others are shown in the table. The equation $z(x, y) = a1 \cdot b1(x, y) + a2 \cdot b2(x, y) + \ldots + a14 \cdot b14(x, y) \approx 1.0269 - 0.0015x - 0.0032y - 0.0052x^2 + \ldots + 5.3049/(10^6) \times y^4$.

2-22: Effects Etc.

As described above, according to the main configuration of the light source apparatus 10 of Embodiment 2, as in Embodiment 1, provided can be the light source apparatus that is small in size and light in weight, has high light utilization efficiency, and is modularized to be easily utilizable as a planar light source. More specifically, the light utilization efficiency from the LED light source and the uniform lighting characteristics can be further improved. Additionally, provided can be the light source apparatus suitable as a lighting light source manufacturable at low cost. Further, provided in accordance with the respective characteristics of the HUD apparatus 1 and the liquid crystal display element 50 can be: the image display apparatus 30 which generates suitable image light; and the light source apparatus 10 which generates suitable lighting light. Additionally, provided can be the HUD apparatus 1 that prevents return external light and has good display characteristics of the virtual images. By the light distribution control in the light source apparatus 10, facilitated are the mounting etc. through which the area of the image light with respect to the lighting light is enlarged.

(1) In the light source apparatus 10 of Embodiment 2, the parts of the polarization conversion element 21 extend in the X direction, and are arranged symmetrically with respect to the optical axis. The plural LED elements 14 etc. are arranged in the X direction with respect to the polarization conversion element 21. Those bring the increase in the freedom degree of arrangement of the LED element 14 etc., and the facilitation of the various mountings in accordance with the specifications of the liquid crystal display element 50 and HUD apparatus 1. Positioning tolerance of the components like the LED element 14 etc. with respect to the polarization conversion element 21 may be large, so that the product yield can be improved.

(2) In the light source apparatus 10, a size relationship between the LED element 14 and the LED collimator 15 satisfies the condition (2×H2<W1) as shown in FIG. 24. Therefore, the parallelism of the parallel light of the LED collimator 15 is improved, and wavelength variation of the transmission and reflectance of the PBS is improved. Consequently, effects like color-unevenness generation prevention etc. of transmitted light can be obtained.

(3) In the light source apparatus 10, as shown in FIG. 24, the distance H3 between the LED element 14 and the concave part 153 of the collimator element 15A is set at 0 or more. This brings the increase in the heat dissipation efficiency in the LED element 14 and collimator element 15A, and the suppression of a rise in temperatures.

(4) In the light source apparatus 10 of Embodiment 2, the emission side of the polarization conversion element 21 is provided with the light guide 17 etc. that realize the predetermined light distribution control in addition to the configuration of the above-described polarization conversion element 21. Thus, the predetermined light distribution control in the light source apparatus 10 makes it possible to reduce loads (burdens) of the light distribution control required by the liquid crystal display element 50 and adjustment optical system 40 (refraction element 43 etc.), and makes it easy to take measures against external light flare.

2-23: First Modification Example

Figure 40:
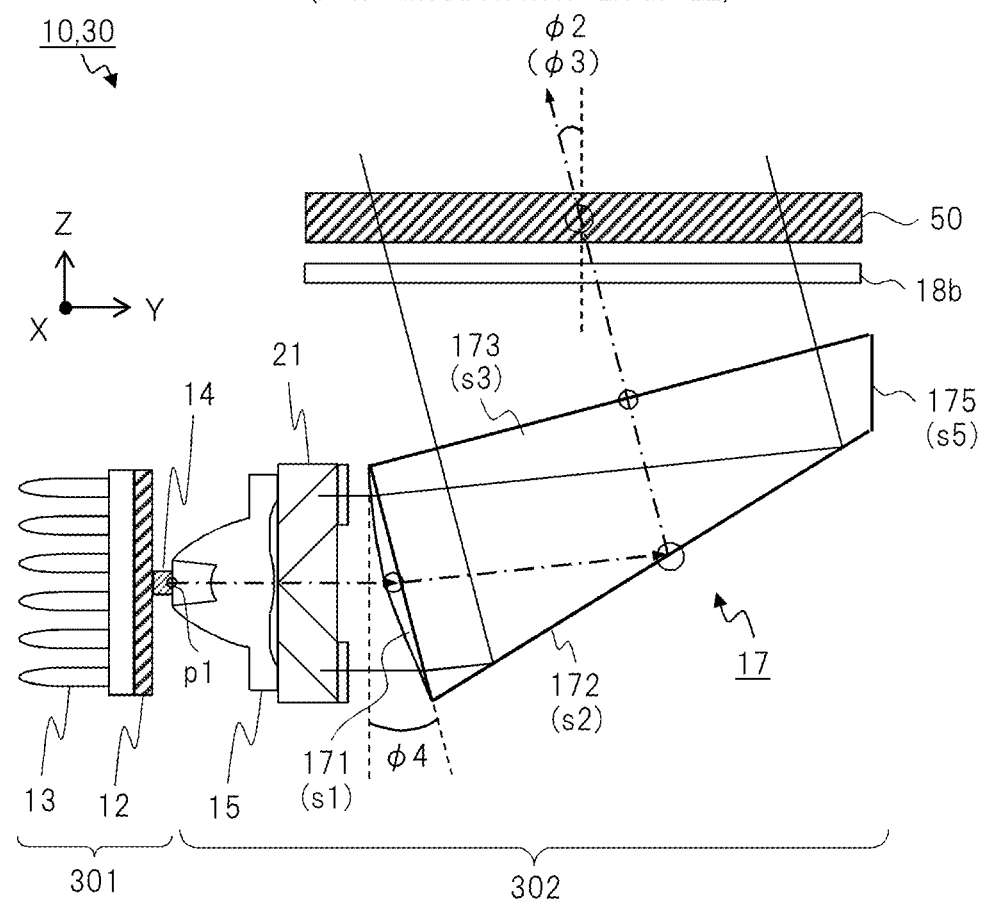
FIG. 40 is a sectional view showing a schematic configuration of a light guide etc. in a light source apparatus and an image display apparatus of a first modification example of Embodiment 2.

FIG. 40 shows, on the Y-Z plane, a configuration of a light source apparatus 10 of a first modification example of Embodiment 2. In this first modification example, the incidence surface s1 of the incidence part 171 of the light guide 17 has a free-form surface shape, and the emission surface s3 of the emission part 173 has a planar shape. The predetermined light distribution control characteristics are realized by a structure that includes the free-form surface shape of the incidence surface s1. The incidence surface s1 of the incidence part 171 has, as a reference plane, an angle φ4 of an inclination with respect to the Z direction. The reference plane of the incidence surface s1 has a free-form surface shape. Additionally, in the configuration example of FIG. 40, the optical axis from the reflection part 172 and the optical axis from the emission surface s3 are inclined at an angle φ3 leftward in the Y direction with respect to the Z direction, and are inclined at an angle φ2 with respect to the axes of the display element 50 etc. arranged on the horizontal plane.

2-24: Second Modification Example

Figure 41:
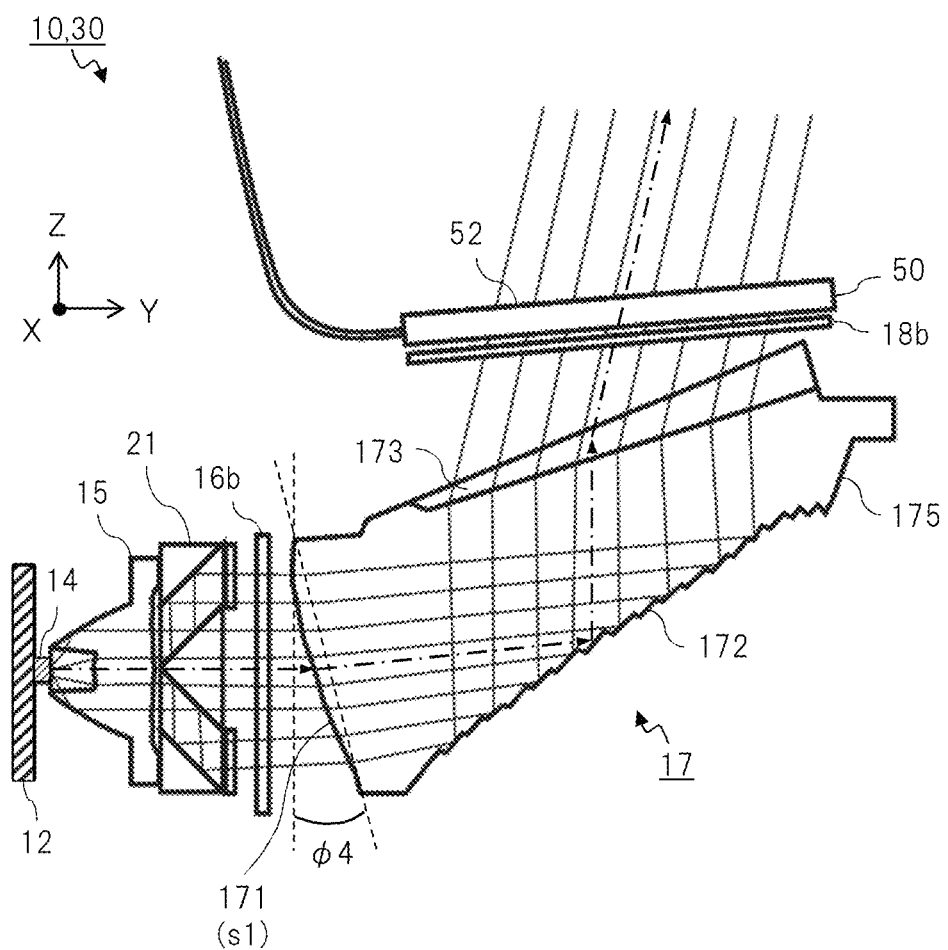
FIG. 41 is a sectional view showing a schematic configuration of a light guide etc. in a light source apparatus and an image display apparatus of a second modification example of Embodiment 2.

FIG. 41 shows, on the Y-Z plane, configurations of the light source apparatus 10 and image display apparatus 30 of a second modification example of Embodiment 2. This second modification example is different from the examples shown in FIGS. 34 and 40 in that not only the emission part 173 of the light guide 17 but also the incidence surface s1 of the incidence part 171 has a free-form surface shape. Similarly, the incidence surface s1 of the incidence part 171 has, as a reference plane, an angle φ4 of an inclination with respect to the Z direction. The light guide has a free-form surface shape that is convex on the incidence side with respect to the reference plane of the incidence surface s1. The light guide 17 is designed so as to have the predetermined light distribution control characteristics thereof by combining the characteristics of the free-form surface of the incidence surface s1 and the characteristics of the free-form surface of the emission surface s3. Thus, forming both the incidence part 171 and emission part 173 into the free-form surface shapes brings the increase in the freedom degree of the light distribution control, and makes it possible to realize more precise and complicated light distribution control. Consequently, more accurately realized can be the characteristics of the suitable image light and return external light prevention, etc.

2-25: Third Modification Example

FIG. 42 shows a perspective view of, as the light source apparatus 10 and image display apparatus 30 of a third modification example of Embodiment 2, an example of a relatively large light source apparatus 10 that realizes a large area light source. Similarly to the above-described example of FIG. 14, this third modification example has a linear optical axis or axes in the Z direction corresponding to the vertical. Correspondingly thereto, the third modification example includes a light guide 19 that guides light in the Z direction. The light guide 19 is a light distribution control member that realizes predetermined light distribution control characteristics.

FIG. 42(a) shows arrangement of components in a case, and omits the LED substrate 12 etc. therein. The plural LED elements 14, LED collimator 15, polarization conversion element 21, light distribution control plate 16b, light guide 19, and liquid crystal display element 50 are arranged in order from bottom to top in the Z direction. Each of these components is roughly a flat plate shape on the X-Y plane, and a side in the X direction is longer than a side in the Y direction. The sides in the X direction correspond to transversally long sides of the liquid crystal display element 50 and the display area 4 of the HUD apparatus 1.

The polarization conversion element 21 is configured by using two sets of polarization conversion element units 21a, 21b arranged in the Y direction. It has a first polarization conversion element unit 21a and a second polarization conversion element unit 21b leftward and rightward in the Y direction in the drawing, respectively, and their units are arranged adjacent to each other. The respective sets of polarization conversion element units have the same structure, and their components extend in the X direction.

The plural LED elements 14 and collimator elements 15A are arranged in the X direction correspondingly to the configuration of the polarization conversion element 21. For example, the nine LED elements 14 (14-1, 14-2, . . . , 14-9) as N=9 are spaced a predetermined pitch apart in the X direction with respect to the one polarization conversion element unit 21a. The nine collimator elements 15A are arranged in the X direction correspondingly to the LED elements 14. Similarly, the nine LED elements 14 (14-10, 14-11, . . . , 14-18) as N=9 and the corresponding collimator elements 15A in the X direction are spaced a predetermined pitch apart with respect to the other polarization conversion element unit 21b. Namely, in this example, eighteen (18) LED elements 14 and collimator elements 15A are arranged in total on the X-Y plane, the eighteen units being composed of one row of nine units in the X direction and two rows thereof in the Y direction. Consequently, a planar light source having a relatively large area is configured.

In the Z direction, the light guide 19 is disposed in a space between the light distribution control plate 16b and the liquid crystal display element 50. The light guide 19 has a roughly saddle shape as illustrated. Above the light guide 19, the panel surface of the liquid crystal display element 50 is roughly placed on the horizontal plane.

FIG. 42(b) is a partially sectional view of FIG. 42(a), and shows a Y-Z cross-section at a position of the LED element 14-5 near the X-directional center. The light guide 19 has an incidence part 191 (including incidence surface) on a Z-directional downside, and an emission part 192 (including emission surface) on a Z-directional upside. Each of the incidence and emission surfaces has a free-form surface shape. Each free-form surface of the incidence and emission surfaces has a convex-shaped curve over (above) the Z direction (emission side) when viewed on the Y-Z section. Each free-form surface of the incidence and emission surfaces has a concave-shaped curve in the Z direction when viewed in the X-Z section. Shown are optical axes a31, a32 passing through the polarization conversion element 21 and the light guide 19. The optical axes a31, a32 are subjected to predetermined refraction and light diffusion, etc. by the free-form surfaces. The predetermined light distribution control characteristics are designed by such a free-form surface shape of the light guide 19. Thus, according to the light source apparatus 10 of the third modification example, the characteristics of the suitable image light and the return external light prevention etc. are realized.

Figure 43:
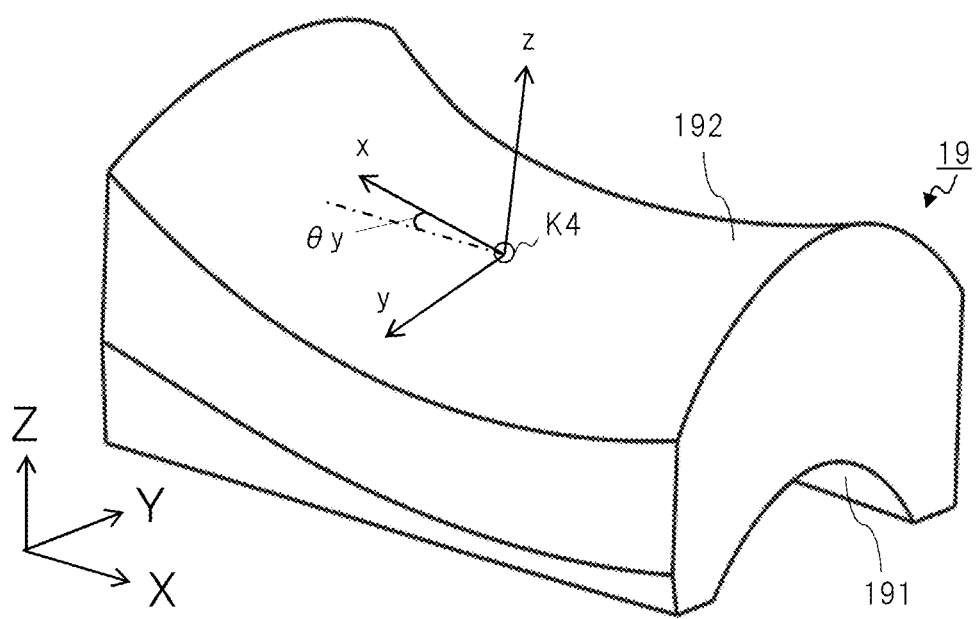
FIG. 43 is a perspective view showing the entire light guide in the third modification example.

The free-form surface shape of the light guide 19 in FIG. 42 will be described with reference to FIGS. 43 and 44. FIG. 43 is a perspective view of the light guide 19, and shows an example of how to take a reference coordinate system (x, y, z) of the free-form surface. The reference coordinates of the emission surface of an emission part 192 are coordinates inclined at an angle θy (e.g., θy=1°) with respect to a horizontal-plane direction indicated by dash-single-dot line. The y-axis adopts, as a reference, coordinates of a position (point K4) offset by a predetermined distance (e.g., −1.2 mm) with respect to a central position of the light guide 19. It is assumed that no offset of reference coordinates of the incidence surface exists on both the angles θy and y-axis.

FIG. 44 shows a free-form surface equation and its coefficients. FIG. 44(a) shows a free-form surface equation similar to the foregoing; FIG. 44(b) shows an example of coefficients and variables of the emission surface of the emission par 192; and FIG. 4(c) shows an example of coefficients and variables of the incidence surface of the incidence part 191. A range of the free-form surface of the light guide 19 is set to −40 mm≤x≤40 mm and −22 mm≤y≤2 mm. Roughly (Generally), a width in the X direction is 80 mm and a width in the Y direction is 24 mm. Further, when a value of z(x, y) is smaller than −8 mm on the incidence surface, the value is forcibly set to −8 mm. In other words, portions (vicinity of both ends in the Y direction in the figure) to greatly protrude downward in the Z direction are cut at a position of −8 mm to obtain planes (flat surfaces).

2-26: Fourth Modification Example

FIG. 45 shows, as the light source apparatus 10 and image display apparatus 30 of a fourth modification example of Embodiment 2, an example of realizing a compact light source with a relatively small area. FIG. 45(a) is a perspective view showing an internal configuration of the case of the light source apparatus 10 in a state of attaching the liquid crystal display element 50 thereto. FIG. 45(b) shows a perspective view including a partial cross-section of the light source apparatus 10 in a state of removing the liquid crystal display element 50 therefrom, and shows light distribution etc. In the light source apparatus 10, the optical axis a1 of the LED element 14 is in the Y direction. In the Y direction, the LED substrate 12, plural LED elements 14, LED collimator 15, polarization conversion element 21, and light distribution control plate 16b are arranged in this order. A light guide 19b is disposed subsequently to the light distribution control plate 16b. In other words, the light guide 19b is a light distribution control plate, and has the predetermined light distribution control characteristics of guiding the light roughly in the Y direction. The light guide 19b has an incidence part 19b1 and an emission part 19b2. Because of its characteristics, the light guide 19b has free-form surfaces on both the incidence and emission surfaces. In the Y-Z cross-section of the light guide 19b, each of the incidence and emission surfaces has a free-form surface that includes a convex-shaped curve on a Y-directional incidence side.

A reflection mirror 450 is further disposed on the emission side of the light guide 19b in the Y direction in a state of having an angle of an inclination oblique to the horizontal plane. The Y-directional optical axis is roughly converted into a Z-directional optical axis through the reflection by the reflection mirror 450. Above the reflection mirror 450 in the Z direction, the diffuser 18b and the liquid crystal display element 50 are arranged on the X-Y plane.

The plural LED elements 14 are arranged so that the five LED elements 14 (14a to 14e) as N=5 in the X direction are spaced a predetermined pitch apparat as densely as possible. The LED collimator 15 has the plural collimator elements 15A similarly arranged in the X direction. This configures the planar light source unit 301 having a comparatively small area. The light in the Y direction from the LED element 14 passes through the light distribution control plate 16b, and is then incident on the incidence surface of the incidence part 19b1 of the light guide 19b. The light incident on the incidence surface of the incidence part 19b1 is guided while being refracted along the free-form surface shape, and is emitted from the emission surface of the emission part 19b2. Specifically, as in an example of rays shown in FIG. 45(b), the emitted light is condensed toward the reflection mirror 45, and a range of the rays in the Z direction is narrowed. For example, the ray passing through an upper position of the central optical axis in the Z direction is converted into a ray that points diagonally downward, and the ray passing through a lower position in the Z direction is converted into a ray that points diagonally upward.

The light that has passed through the light guide 19b is reflected upward in the Z direction by the reflection mirror 450. The reflected light is incident, as lighting light, on the panel surface of the liquid crystal display element 60 while being diffused through the diffuser 18b. The lighting light is condensed through the light guide 19b and reflection mirror 450, and is converted into lighting light having a relatively small area. In the plane of the diffuser 18b, a lighting area 451 by the condensation is indicated by a dotted line. The lighting light passes through this lighting area 451. The lighting area 451 has a smaller area than the area of the panel surface of the liquid crystal display element 50. In this example, planar lighting light with a small area as shown by the lighting area 451 may be adopted as the lighting light to the liquid crystal display element 50. This corresponds to, for example, where the display area 4 of the HUD apparatus 1 has a relatively small area. In a case of such a use application, the configuration of the light source apparatus 10 like the fourth modification example is suitable (preferable).

2-27: Fifth Modification Example

Figure 46:
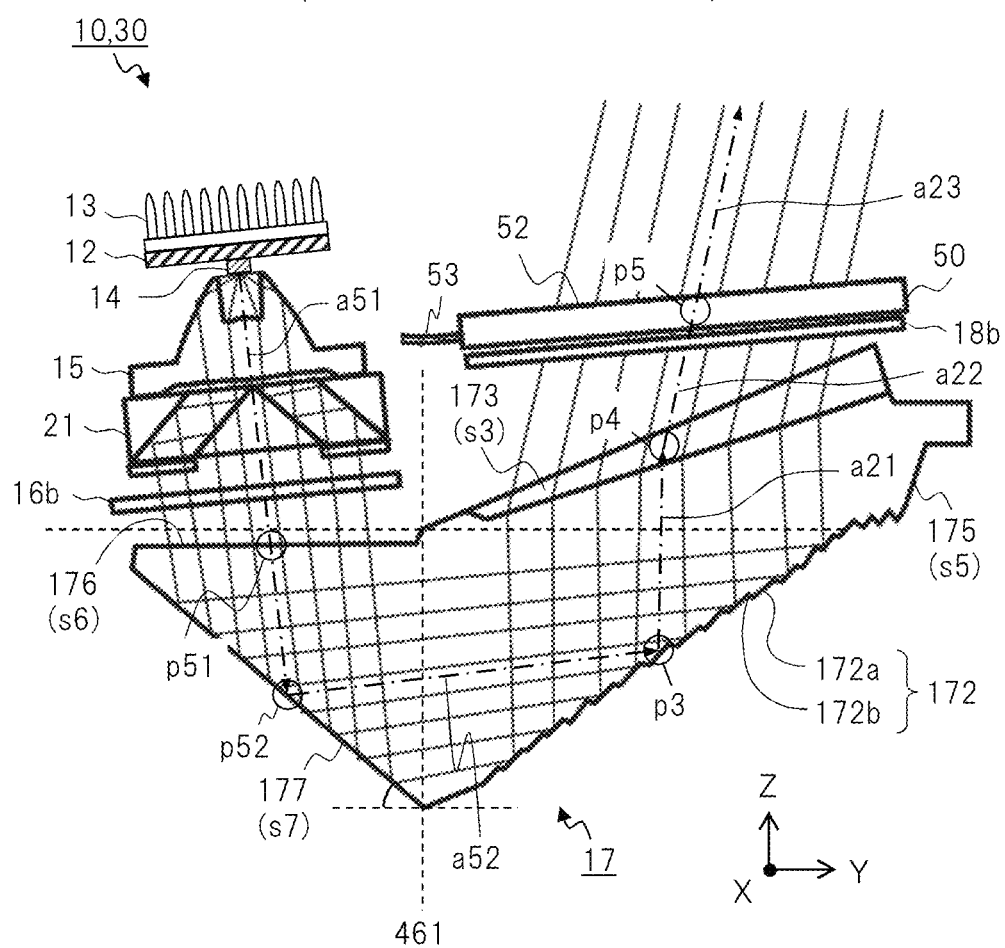
FIG. 46 is a perspective view showing configurations of a light source apparatus and an image display apparatus of a fifth modification example of Embodiment 2.

FIG. 46 is a perspective view showing configurations of the light source apparatus 10 and image display apparatus 30 of a fifth modification example of Embodiment 2. In FIG. 46, a configuration of a right part(s) in the Y direction with respect to a Z-directional broken line 461 is almost the same as the above-described configurations of FIG. 33 etc., and has the reflection part 173, emission part 172, and top part 175. A configuration of a left part(s) in the Y direction with respect to the broken line 461 is different from those. In this configuration, an optical axis a51 of the LED element 14 is substantially along the vertical Z direction, and runs from top to bottom. The structures of the heat sink 13, LED substrate 12, LED element 14, LED collimator 15, polarization conversion element 21, and light distribution control plate 16b are almost the same as those described above, but are different therefrom in arrangement (array) directions.

The light guide 17 has a structure in which an incidence part 176 (including an incidence surface s6) and a reflection part 177 (including a reflection surface s7) are further added on the incidence side. A shape of a left part in the Y direction with respect to the broken line 461 of the light guide 17 has a roughly triangular-prism shape, extends in the X direction, and its Y-Z cross-section is a substantially triangular shape. An incidence surface s6 of the incidence part 176 is roughly disposed on the horizontal plane (X-Y plane). A reflection surface s7 of the reflection part 177 become a slope (inclination) having a predetermined angle with respect to the horizontal plane. A reflection surface s7 of the reflection part 177 may be formed as a repetition of the reflection and connection surfaces similarly to the right reflection part 173 and, without being limited thereto, may be formed of a reflection film etc.

The optical axis a51 from the LED element 14 etc. is incident on a point p51 on the incidence surface s6 after passing through the light distribution control plate 16b. Its optical axis a56 is reflected by a point p52 on the reflection surface s7 of the reflection part 177, and becomes an optical axis a52 that travels roughly rightward in the Y direction. The optical axis a52 is reflected at the point p3 on the reflection surface s3 of the reflection part 173, and becomes the optical axis a2 (a21, a22, a23, etc.) that travels roughly upward in the Z direction similarly to the above-described optical axis a1.

In the configuration of the fifth modification example, the components like the light source unit 301 etc. are arranged in the Z direction by using the incidence part 176 and the reflection part 177 of the light guide 17, so that a dimension in the Y direction (depth direction) can be kept relatively small (short) in comparison with the configurations of Embodiments 1, 2. This configuration is suitable, e.g., when a depth direction of an arrangement (layout) space in the dashboard of the vehicle is limited. In the configuration of the fifth modification example, the incidence surface s6 of the incidence part 176 is set at a plane, but is not limited thereto, and may be set at a free-form surface shape for realizing the predetermined light distribution control characteristics.

2-28: Sixth Modification Example

FIG. 47 shows a plan view a configuration of a texture of the incidence surface s1 of the incidence part 171 or the emission surface s3 of the emission part 173 on the light guide 17 in a light source apparatus 10 of a sixth modification example of Embodiment 2. For example, a texture(s) like those in FIG. 47 is provided on the incidence surface s1 (roughly on X-Z plane) of the incidence part 171 and the emission surface s3 (roughly on X-Y plane) of the emission part 173 in the light guide 17 of FIG. 20 or 34 that shows Embodiment 2 as described above. Similarly, a texture(s) like those in FIG. 47 may be provided on the incidence surface s1 and/or the emission surface s3 of each modification example of FIG. 40 etc.

FIG. 47(a) schematically shows a first example of the texture of a target surface (incidence surface s1 or emission surface s3). FIG. 47(b) schematically shows a second example of the texture of the target surface. In the texture of FIG. 47(a), boundaries among plural reflection surfaces and connection surfaces are linearly arranged and formed. An extension direction of the straight line corresponds to the X direction in which the plural LED elements 14 etc. are arranged. Such a texture performs light distribution control of light diffusion etc. in a direction in which the plural boundaries are arranged (e.g., the Z direction on the incidence surface s1 and the Y direction on the emission surface s3). In the texture of FIG. 47 (b), the boundaries among the plural reflection and connection surfaces are curvedly arranged and formed. This curved shape is formed, e.g., correspondingly to positions etc. where the plural LED elements 14 and collimator elements 15A are arranged. Thus, more precise light distribution control is possible.

In the foregoing, the invention made by the inventors of the present invention has been specifically described based on the embodiments. However, it is needless to say that the present invention is not limited to the foregoing embodiments and various modifications and alterations can be made within a range of not departing from the scope of the present invention. Components of each embodiment may be added or deleted, separated or merged, replaced, combined, or the like.

EXPLANATION OF SYMBOLS

1 . . . Head up display (HUD) apparatus; 3 . . . Windshield; 4 . . . Display area; 5 . . . Eye; 6 . . . Sightline; 7 . . . Virtual image; 10 . . . Light source apparatus; 12 . . . LED substrate; 13 . . . Heat sink; 14 . . . LED element; 15 . . . LED collimator; 16b . . . Light distribution control plate; 17 . . . Light guide; 18b . . . diffuser; 21 . . . Polarization conversion element; 30 . . . Image display apparatus; 41, 42 . . . Reflection mirror; 43 . . . Refraction element; 50 . . . Liquid crystal Display element; 80 . . . Casing; 81 . . . Opening; 171 . . . Incidence part; 172 . . . Reflection part; and 173 . . . Emission part.

The invention claimed is:

1. A light source apparatus comprising:
a light source unit including a plurality of semiconductor light source elements for generating light;
a collimator including a plurality of collimator elements, each of the plural collimator elements being disposed on a light emission axis of each of the plural semiconductor light source elements;
a polarization conversion element disposed on an emission side of the collimator; and
a light guide disposed on an emission side of the polarization conversion element,
wherein the plural semiconductor light source elements and the plural collimator elements are arranged in a first direction orthogonal to the light emission axis, and
wherein the polarization conversion element extends in the first direction, and includes a polarizing beam splitter and a phase plate, which are arranged at symmetrical positions with respect to a plane, the plane being formed by the first direction and a second direction corresponding to the light emission axis, and
wherein the light guide has, on at least one of an incidence surface or an emission surface, a free-form surface shape for realizing predetermined light distribution control.

2. The light source apparatus according to claim 1, wherein the collimator element has, on an incidence side of a central portion corresponding to the light emission axis, a concave part for condensing light emitted from the semiconductor light source elements, and
wherein a distance between a bottom surface of the concave part in the second direction and a light emission surface of each of the semiconductor light source elements is greater than twice a width of each of the semiconductor light source elements in a third direction orthogonal to the first and second directions.

3. The light source apparatus according to claim 1,
wherein each of the collimator elements has, on an incidence side of a central portion corresponding to the light emission axis, a concave part for condensing light emitted from the semiconductor light source elements, and
wherein, in the first direction and in a third direction orthogonal to the first and second directions, a width of the concave part is larger than a width of each of the semiconductor light source elements.

4. The light source apparatus according to claim 1,
wherein each of the collimator elements has, on an incidence side of a central portion corresponding to the light emission axis, a concave part for condensing light emitted from the semiconductor light source elements, and
wherein, in the second direction, a substrate surface on which the semiconductor light source elements are mounted and a top surface of the concave part have predetermined distances.

5. The light source apparatus according to claim 1,
wherein each of the collimator elements has, on an incidence side of a central portion corresponding to the light emission axis, a concave part for condensing light emitted from the semiconductor light source elements, and
wherein an outer periphery portion with respect to the central portion has a reflector portion, and a central portion corresponding to the concave part on an emission surface side has a lens portion for condensing, as parallel light, light from the concave part and the reflector portion.

6. The light source apparatus according to claim 1,
wherein the plural semiconductor light source elements and the plural collimator elements are arranged in a first direction orthogonal to the light emission axis,
wherein the light source unit, the collimator, the polarization conversion element, and the light guide are arranged in a second direction corresponding to the light emission axis, and
wherein the light guide has a columnar shape extending in the first direction, and includes a reflection part, the reflection part having such a reflection surface that light incident from the incidence surface and traveling in the second direction is reflected in a third direction orthogonal to the first and second directions and is emitted from the emission surface.

7. The light source apparatus according to claim 6,
wherein the light guide has, on an opposite side to the incidence surface, a top part having a top surface that contacts with one side of the emission surface and one side of the reflection part, and the emission surface is a slope having a predetermined angle with respect to the second direction.

8. The light source apparatus according to claim 1,
wherein the plural semiconductor light source elements and the plural collimator elements are arranged in a first direction orthogonal to the light emission axis,
wherein the light source unit, the collimator, the polarization conversion element, and the light guide are arranged in a second direction corresponding to the light emission axis, and the light guide is configured so that light incident from the incidence surface and traveling in the second direction is guided in the second direction and is emitted from the emission surface.

9. The light source apparatus according to claim 1,
wherein a light distribution control plate or a diffuser for performing predetermined light distribution control is disposed on an emission side of the polarization conversion element in the second direction.

10. A head up display apparatus projecting image light onto a display area of a windshield or combiner of a vehicle and providing a virtual image to a driver by reflected light, the head up display apparatus comprising:
an image display apparatus including a light source apparatus and a display element, the light source apparatus being configured to generate and emit lighting light, and the display element being configured to generate and emit the image light based on the lighting light; and
an adjustment optical system including an optical element for guiding the image light into the display area of the windshield or combiner while reflecting the image light,
wherein the light source apparatus includes:
a light source unit including a plurality of semiconductor light source elements generating light;
a collimator including a plurality of collimator elements, each of the collimator elements being arranged on a light emission axis of each of the plural semiconductor light source elements;
a polarization conversion element disposed on an emission side of the collimator; and
a light guide disposed on an emission side of the polarization conversion element,
wherein the plural semiconductor light source elements and the plural collimator elements are arranged in a first direction orthogonal to the light emission axis,
wherein the polarization conversion element extends in the first direction, and includes a polarizing beam splitter and a phase plate that are arranged at symmetrical positions with respect to a plane formed by the first direction and a second direction, the second direction corresponding to the light emission axis, and
wherein the light guide has, on at least one of an incidence surface or an emission surface, a free-form surface shape for realizing predetermined light distribution control.

11. The head up display apparatus according to claim 10,
wherein a normal direction of a display surface of the display element and a normal direction of the optical element form an angle of 10° or more with respect to a direction of an optical axis of emitted light from the light source apparatus.

12. The head up display apparatus according to claim 11, further comprising, as the optical element of the adjustment optical system, a refraction element and one or more reflection mirrors, the refraction element refracting the image light from the display element, the one or more reflection mirrors reflecting light that is subjected to the refraction,
wherein the normal direction of the refraction element forms an angle of 10° or more with respect to a direction of an optical axis of emitted light from the light source apparatus.

* * * * *